United States Patent
Ortiz et al.

(10) Patent No.: US 11,687,928 B2
(45) Date of Patent: *Jun. 27, 2023

(54) SECURE PROCESSING OF ELECTRONIC PAYMENTS

(71) Applicant: ROYAL BANK OF CANADA, Toronto (CA)

(72) Inventors: Edison U. Ortiz, Orlando, FL (US); Terry W. Lee, Toronto (CA); Gabriel Y. Woo, Toronto (CA); Stephen James Scott, Oakville (CA); Weiqiang Yin, Mississauga (CA); Judy Dinn, Toronto (CA); Chai Lam, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 65 days.

This patent is subject to a terminal disclaimer.

(21) Appl. No.: 17/387,711

(22) Filed: Jul. 28, 2021

(65) Prior Publication Data

US 2022/0020015 A1    Jan. 20, 2022

Related U.S. Application Data

(63) Continuation of application No. 15/000,685, filed on Jan. 19, 2016, now Pat. No. 11,080,700.
(Continued)

(51) Int. Cl.
*G06Q 20/40*  (2012.01)
*G06Q 20/12*  (2012.01)
*G06Q 20/02*  (2012.01)

(52) U.S. Cl.
CPC .......... *G06Q 20/40* (2013.01); *G06Q 20/023* (2013.01); *G06Q 20/12* (2013.01)

(58) Field of Classification Search
None
See application file for complete search history.

(56) References Cited

U.S. PATENT DOCUMENTS 9,336,519 B2    5/2016  Young
9,424,574 B2 *  8/2016  Bondesen .......... G06Q 20/3821
(Continued)

FOREIGN PATENT DOCUMENTS

| EP | 2587432 A1 | 5/2013 | |
| WO | 2012158419 A1 | 11/2012 | |
| WO | WO-2014049136 A1 * | 4/2014 | ............. G06F 21/44 |

OTHER PUBLICATIONS

Summons to Oral Proceedings dated Jul. 1, 2021 issued in EP 17762362.6.
(Continued)

*Primary Examiner* — Gregory S Cunningham, II
(74) *Attorney, Agent, or Firm* — Norton Rose Fulbright Canada LLP

(57) ABSTRACT

Systems (100), methods, and machine-executable data structures for the processing of data for the secure creation, administration, manipulation, processing, and storage of electronic data useful in the processing of electronic payment transactions and other secure data processes. Aspects of such systems (100) include trusted platforms (120) by which networked communication devices (110) and merchant systems (130) may registered as trusted entities 110', 130. Information associated with particular payment means, such as accounts or payment tokens, can be stored on device(s) secure data sets known as virtual or electronic wallets (112), or in the form of secure payment tokens. Common application programming interfaces executed by devices (110) may facilitate push and pull processes between electronic wallets (112) and other secure data stores (136,
(Continued)

120, 160). Users (190) may thereby initiate and complete electronic transactions directly from within applications on trusted devices (110').

15 Claims, 23 Drawing Sheets

Related U.S. Application Data

(60) Provisional application No. 62/200,859, filed on Aug. 4, 2015, provisional application No. 62/188,067, filed on Jul. 2, 2015, provisional application No. 62/105,061, filed on Jan. 19, 2015.

(56) References Cited

U.S. PATENT DOCUMENTS

| | | | |
|---|---|---|---|
| 11,232,456 | B2 | 1/2022 | Hyun |
| 2008/0072064 | A1 | 3/2008 | Franchi |
| 2008/0133350 | A1 | 6/2008 | White |
| 2010/0122274 | A1* | 5/2010 | Gillies ............ H04N 21/41407 725/23 |
| 2010/0241867 | A1 | 9/2010 | Brown |
| 2012/0036042 | A1 | 2/2012 | Graylin |
| 2012/0209657 | A1 | 8/2012 | Connolly |
| 2012/0290376 | A1 | 11/2012 | Dryer |
| 2013/0124346 | A1 | 5/2013 | Baldwin et al. |
| 2013/0214898 | A1 | 8/2013 | Pineau et al. |
| 2013/0218769 | A1 | 8/2013 | Pourfallah et al. |
| 2013/0268687 | A1 | 10/2013 | Schrecker |
| 2013/0311313 | A1 | 11/2013 | Laracey |
| 2014/0019358 | A1 | 1/2014 | Priebatsch |
| 2014/0025581 | A1 | 1/2014 | Calman |
| 2014/0025958 | A1 | 1/2014 | Calman |
| 2014/0108263 | A1* | 4/2014 | Ortiz ..................... G06Q 20/36 705/44 |
| 2014/0108785 | A1 | 4/2014 | Lindteigen |
| 2014/0278894 | A1 | 9/2014 | Toumayan |
| 2015/0046330 | A1 | 2/2015 | Hanafi |
| 2015/0262170 | A1 | 9/2015 | Bouda |
| 2016/0073263 | A1 | 3/2016 | Wolosewicz |
| 2017/0270524 | A1 | 9/2017 | Kim |
| 2019/0156326 | A1 | 5/2019 | Todasco |

OTHER PUBLICATIONS

Office Action dated Jun. 30, 2021 issued in CN 201780028338.X.
Notice of Allowance dated Aug. 19, 2021 issued in U.S. Appl. No. 15/453,193.
Office Action dated Aug. 30, 2021 issued in U.S. Appl. No. 15/648,942.
Office Action dated Oct. 13, 2021 issued in U.S. Appl. No. 15/884,847.
Office Action dated Oct. 25, 2021 issued in CA 2963287.
Office Action dated Oct. 5, 2021 issued in CA2961916.
Office Action dated Nov. 26, 2021 issued in U.S. Appl. No. 14/879,913.
Summons to Oral Proceedings dated Dec. 14, 2021 issued in EP 15846067.5.
Office Action dated Nov. 29, 2021 issued in CN 201580067059.5.
Office Action dated Dec. 27, 2021 issued in U.S. Appl. No. 14/869,186.
Notice of Allowance dated Nov. 15, 2021 issued in AU 2016208989.
Office Action dated Jul. 14, 2022 issued in CA 2961916.
Office Action dated Sep. 2, 2022 issued in CA 3126471.
Office Action dated Sep. 14, 2022 issued in CA 2963287.
Office Action dated Sep. 21, 2022 issued in U.S. Appl. No. 14/869,186.
Office Action dated Sep. 30, 2022 issued in U.S. Appl. No. 14/879,913.
Office Action dated Sep. 2, 2022 issued in CN 201780028338.X.
European Extended Search Report dated Oct. 21, 2022 issued in EP 22173329.8.
Notice of allowance dated Dec. 29, 2022 issued in U.S. Appl. No. 17/080,197.
Lampropoulos et al. "Identity Management Directions in Future Internet", IEEE Communications Magazine, Dec. 2011, pp. 74-83 (Year 2011).
Notice of acceptance dated Dec. 22, 2023 issued in AU 2017231106.
European Extended Search Report dated Jan. 19, 2023 issued in EP 22187813.5.
Office Action dated Oct. 27, 2022 issued in CA 2991073.
Notice of allowance dated Nov. 3, 2022 issued in U.S. Appl. No. 15/648,942.
Office Action dated Nov. 8, 2022 issued in U.S. Appl. No. 15/884,847.
Office Action dated Dec. 15, 2022 issued in U.S. Appl. No. 17/352,174.
Office Action dated Jun. 13, 2022 issued in U.S. Appl. No. 17/352,174.
De, P. et al., Towards an interoperable mobile wallet service, 2013 10th International Conference and Expo on Emerging Technologies for a Smarter Worid (CEWIT), 2013, pp. 1-6, doi: 10.1109/CEWIT.2013.6713767.
Office Action dated Jun. 17, 2022 issued in U.S. Appl. No. 15/648,942.
Office Action dated Jun. 2, 2022 issued in U.S. Appl. No. 14/869,186.
Office Action dated Mar. 2, 2022 issued in CN 201780028338.X.
Office Action dated Jul. 26, 2022 issued in AU 2021203226.
Office Action dated Aug. 2, 2022 issued in AU 2021203623.
Office Action dated Aug. 2, 2022 issued in EP 16739695.1.
Office Action dated Mar. 30, 2022 issued in U.S. Appl. No. 14/879,913.
Office Action dated Mar. 1, 2022 issued in CA 2974151.
Office Action dated Mar. 4, 2022 issued in U.S. Appl. No. 15/648,942.
Office Action dated Mar. 21, 2022 issued in U.S. Appl. No. 15/884,847.
Office Action dated Jan. 20, 2022 issued in AU 2017231106.
Notice of Allowance dated Feb. 7, 2022 issued in U.S. Appl. No. 16/007,955.
Balan, R.K. et al., "The Digital Wallet: Opportunities and Prototypes", in Computer, vol. 42, No. 4, pp. 100-102, Apr. 2009, doi: 10.1109/MC.2009.134 (Year: 2009).
Office Action dated Mar. 14, 2023 issued in U.S. Appl. No. 14/869,186.
Notice of allowance dated Feb. 27, 2023 issued in U.S. Appl. No. 17/389,984.
Office Action dated Jan. 31, 2023 issued in KR 10-2018-7003235.
Ex Parte Quayle Action dated Mar. 23, 2023 issued in U.S. Appl. No. 17/561,638.
Office Action dated Mar. 9, 2023 issued in AU 2022201325.

\* cited by examiner

FIG. 16

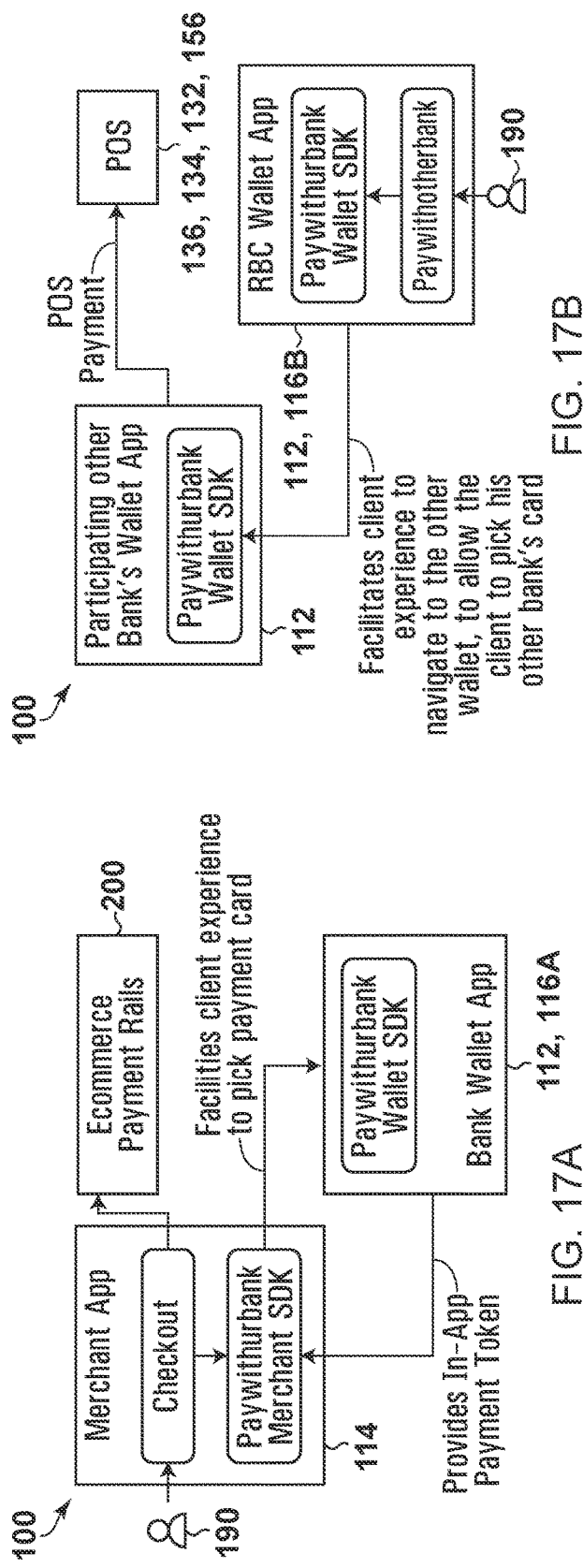
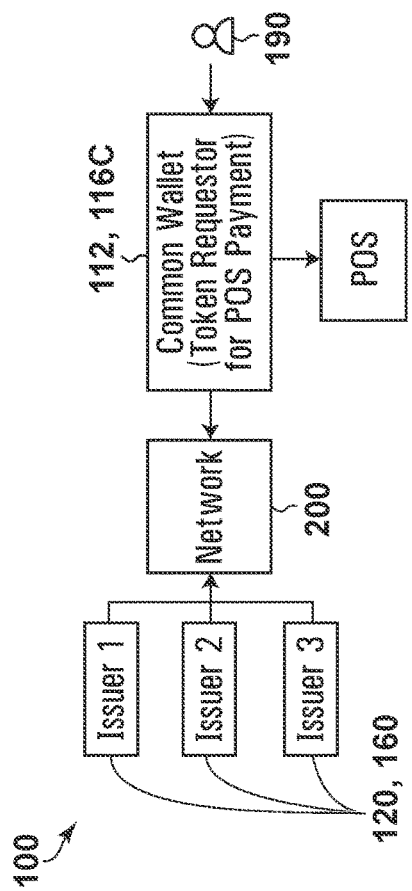
FIG. 17A
FIG. 17B
FIG. 17C

SECURE PROCESSING OF ELECTRONIC PAYMENTS

CROSS-REFERENCE TO RELATED APPLICATIONS

This application is a continuation of U.S. application Ser. No. 15/000,685, filed Jan. 19, 2016, entitled SECURE PROCESSING OF ELECTRONIC PAYMENTS which claims all right and benefit, including priority, of each of U.S. Provisional Application No. 62/105,061, filed Jan. 19, 2015, and entitled "HOST CARD EMULATION FOR IN-APP PROCESSING OF MOBILE PAYMENTS", U.S. Provisional Application No. 62/188,067, filed Jul. 2, 2015, and entitled "SECURE PROCESSING OF ELECTRONIC PAYMENTS", and U.S. Provisional Application No. 62/200,859, filed Aug. 4, 2015, and entitled "SECURE PROCESSING OF ELECTRONIC PAYMENTS", the entire contents of each of which are incorporated herein by this reference.

DISCLAIMER

Aspects of the material disclosed in this application relate to the creation, administration, manipulation, processing, and storage of data useful in processing of payment transactions. Aspects of such creation, administration, manipulation, processing, and storage may be subject to regulation by governmental and other agencies. The disclosure herein is made solely in terms of logical, functional, economic, and communications possibilities, without regard to statutory, regulatory, or other legal considerations. Nothing herein is intended as a statement or representation that any of the materials proposed or discussed herein, or the use thereof, does or does not comply with any statute, law, regulation, or other legal requirement in any jurisdiction.

TECHNICAL FIELD

The present disclosure relates generally to the secure execution of electronic signal exchanges, and more particularly to improved systems, methods, and programming structures for the secure negotiation, authorization, execution, and confirmation of multi-party data processes.

BACKGROUND

Electronic payments are a type of electronic signal exchange, or electronic data transaction, that have provided significant benefits to human kind. In addition to numerous benefits, such transactions are associated with numerous risks. Although many different forms of such transactions have been proposed, there is still significant room for improvement, including for example in terms of security, efficiency, and usability.

Mobile and other e-commerce payments are categories of electronic payment transacted using mobile, desktop, or other devices, as opposed to more conventional forms of payments, such as cash, debit cards, and credit cards. Some mobile and e-commerce payment transactions utilize mobile or other virtual wallets, which are programs or applications on a user's device that store the user's personal information, including credentials for one or more authorized payment methods. For example, the user may input and store multiple credit card numbers, bank account numbers, coupons, loyalty, gift, and reward program account numbers, and others, and, using logical functionality built into the wallet(s), select which of several payment forms to use in association with a transaction, designate and confirm payment amounts and other transaction details, and otherwise manage or control transactions and accounts to be used in transactions. The use of secure elements, encryption, tokenization, and other techniques can be used to enhance the security of mobile and other virtual wallets and protect the user's payment credentials and other sensitive information stored inside.

A significant limitation of such virtual wallets is that to date such wallets have been tied to individual account administrators, such as issuing financial institutions (FIs) for credit cards, banks for demand/deposit accounts, etc. This can result in significant inconvenience for the consumer, or other purchaser, who is authorized to complete transactions by drawing on accounts administered by more than one FI.

To initiate many types of transaction using a virtual wallet, a user can approach a merchant point-of-sale (POS) terminal and present the mobile device for scanning or some other type of data exchange. For example, in a Near Field Communication (NFC) transaction, an NFC reader will request payment credentials and/or other transaction-specific information from the mobile device when the two are brought into close proximity with one another. Similarly, payment credentials and transaction information can be exchanged between the mobile wallet and merchant POS terminal using visual patterns, such as barcodes and QR codes, which are displayed on the mobile device for scanning by the merchant POS terminal. Mobile payment transactions may also require some type of user authentication, such as the inputting of a PIN or identifying biometric, before they will be processed, although user authentication is not always required.

Alternatively, electronic transactions may be initiated using mobile or stationary computing devices to navigate to or otherwise access merchant e-commerce websites and/or applications, and thereafter using input devices such as keyboards, keypads, touchscreens, etc., to enter commands adapted to initiate communications sessions with associated merchant transaction systems.

Thus, in addition to contactless transactions completed between a mobile device and merchant POS terminal, another type of mobile or desktop-initiated payment can occur where a user directly initiates a transaction with a merchant from within a website, application or program associated with the merchant. Such transactions are sometimes referred to as card not present (CNP) transactions because neither the user nor the user's payment card (or anything functionally equivalent) is physically present at a merchant establishment or POS terminal to initiate the transaction. Originally, CNP transactions were most commonly initiated over the telephone or by mail, but may now also take place over computer communication networks, such as the Internet, the public switched telephone system (PSTN), or otherwise using network-enabled transaction request communication devices.

In the processing of transactions and transaction data through the use of computer communication networks, the provision of a user's credit card information, such as the card issuer, credit card number, expiry date, etc., directly into a merchant application or other interface to initiate payment can be insecure. This poses a risk of such sensitive information being shared with an unwanted party. For example, such unwanted sharing can leave the credit card information susceptible to malicious attacks instigated against the user's mobile device, the merchant's servers, or elsewhere within a payment network. In addition to potential security issues, the necessity of providing credit card information in a mobile or desktop application, or possibly in many different applications, repeatedly each time the user wishes to initiate a purchase, can be cumbersome, time consuming, and irritating. Being able to transact within an application without having to re-enter credit card information each time, and without the potential to reveal sensitive personal information, would address or ameliorate these and other shortcomings of CNP transactions.

Whether initiated at a merchant POS terminal or from a networked mobile or desktop user request communication device accessing a website, application or other program associated with a merchant, transaction data may also be transmitted via one of potentially many different payment networks for processing, authorization, and settlement with a bank or financial institution. However, as each merchant or merchant program or application may be associated with a different payment network, the user may be left limited in the types and/or methods of payment that are available from that merchant or application. For example, one merchant may not accept a certain type of payment, and/or one or more demand deposit accounts may not have adequate funds (or other payment resources) available to complete a transaction. As another example, a certificate or secure cryptogram associated with one merchant or FI may not be accepted by another, with the result that secure payment tokens stored in virtual wallet on a mobile or desktop device may not necessarily being useful to complete transactions.

BRIEF DESCRIPTION OF THE DRAWINGS

Reference will be made herein to the accompanying drawings, in which:

FIG. 16 shows further embodiments of graphical user interfaces adapted for use in implementing various aspects and embodiments of the invention.

FIGS. 17A-17C show schematic diagrams illustrating further aspects of systems in accordance with the invention.

For clarity and ease of description, like reference numerals will be used in the drawings to describe the same or like parts.

DETAILED DESCRIPTION

Figure 1:
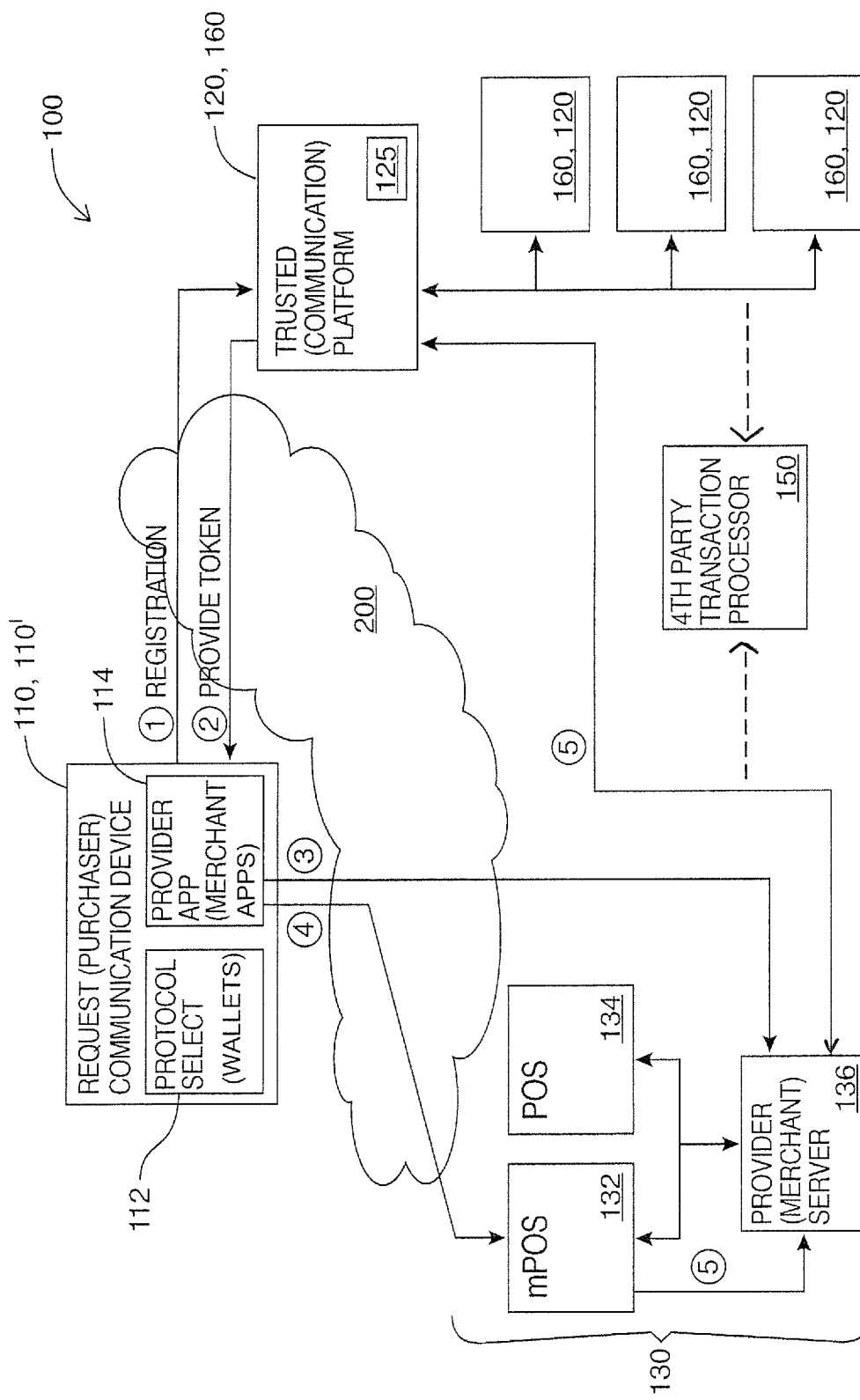
FIG. 1 shows a schematic representation of an example system suitable for use in processing data in accordance with aspects of the disclosure.

Aspects of the disclosure herein provide systems, methods, and machine-executable programming structures stored in persistent (i.e., non-transitory), computer-readable media for the secure execution of electronic signal exchanges, and more particularly improved systems, methods, and programming structures for the rapid and secure negotiation, authorization, execution, and confirmation of multi-party data processes. In various embodiments, the disclosure provides systems, methods, and programming structures which are particularly well suited for the negotiation, authorization, execution, and confirmation of purchases and other electronic resource (including funds) transfers.

Systems and devices in accordance with the disclosure can comprise a wide variety of components, including for example trusted authentication servers, or platforms, for use in simplifying, expediting, and improving the security of data processes such as purchases and other financial transactions. In embodiments of the invention adapted for use in the processing of financial transactions, such trusted platform(s) may, for example, be implemented by banks, credit card, loyalty, gift, rewards, or other account administrators; payment processing services; or other financial service providers. Suitably-configured request communications devices, such as mobile, desktop, and/or other network communication devices for use by consumers, institutional purchasers, and others, and suitably-configured merchant and payment processing devices, may also be included.

In addition to improved transaction security; faster authentication, adjudication, or other processing; and improved efficiency in the use of communications equipment (e.g., data transmission bandwidth), the use of systems, devices, and methods in accordance with the disclosure offers a number of advantages, including more convenient or less burdensome user interfaces, particularly with respect to the ability to draw on funds and/or other payment sources held, administered or otherwise controlled by multiple financial institutions and/or other financial services providers, and increased ability on the part of purchasers, merchants, and FIs to complete transactions, which in some circumstances may be critical to their physical and/or economic health or well-being. Many further advantages will be apparent to those skilled in the relevant arts from the disclosure herein.

Among the numerous advantages provided by implementation of systems, methods, and programming structures disclosed herein are the use of trusted platforms and improvements in 'in-app' processing of purchases and other transactions using applications or other programming structures provided by merchants, FIs, and other service or goods providers.

For example, a request communications device such as a purchaser's or other user's mobile or desktop computer, and/or one or more applications installed thereon, including for example one or more virtual wallet and/or merchant applications, may be registered with a trusted authentication platform, or 'trusted platform,' such as a server operated by or on behalf of a central registration or certification authority, over a communications network such as the internet. Upon completion of registration, or at any time(s) thereafter, such device(s) and/or application(s) may be provided with one or more secure electronic tokens useable by the trusted platform and other devices, such as payment account administration servers, to verify or otherwise identify the request communication device as, e.g., a 'trusted device', which is pre-authorized for the completion of various form(s) of electronic transactions, such as purchases. As described herein, such tokens may be the included with, or distinct from, secure tokens that can be provisioned to such request communication devices for use in the processing and completion of mobile payments.

Such a trusted device may then be used, for example, by a consumer or other user to pay for goods or services through a direct Internet connection such as a merchant's application running on the trusted device (an 'in-app payment'). As a further example, such a trusted device may be used to communicate locally with a merchant system, such as a mobile point of sale or transaction processor ("mPOS") bound to a merchant, which itself may be registered as a trusted device with the server. The mPOS can in such circumstances be enabled to also communicate directly with the trusted server with respect to a transaction or other data process relating to the trusted user, without having to communicate with any further transaction processing intermediaries, such as—in the example of a purchase or other financial transaction—VisaNet or an equivalent proprietary payment network. This can be advantageous, as communications with such intermediaries typically require the exchange of sensitive data in order to authenticate the parties and/or otherwise authorize the transaction; and such exchanges can be costly in terms of time and processing resources, as well as risky.

It will be appreciated that aspects and embodiments of the invention, as described throughout this disclosure, may be advantageously implemented or optimized for either mobile or non-mobile platforms. It is specifically noted, however, that in some cases, while efficiencies and other possibilities are opened for both mobile and non-mobile applications, such possibilities are particularly well adapted to increase possibilities for the initiation and execution of payments and other transactions using mobile devices, without in any way taking anything away from their utility for non-mobile applications.

Trusted platforms in accordance with the invention may be used in authenticating, expediting the processing of, and increasing the security of many types of data processing transactions, in addition to purchases or other transactions involving payments. For example, such systems may be used for the verification of identities of individuals, entities, etc. For example, if a trusted platform in accordance with the invention is implemented by, or on behalf of, a bank or other financial services provider (FSP), and the FSP (a) administers a bank, credit, loyalty, gift, reward or other account on behalf of a user, or otherwise trusts a user, and (b) trusts a merchant or other service provider with whom the user wishes to do business, then indirect verification/authorization may be made as a result of the aggregated individual trust relationships.

Trust between multiple banks or other FSPs cooperating in the administration of a single trusted platform (including distributed virtual platforms) may be established and used in a similar manner. For example, each bank may be validated and verified with the other banks authenticated by the trusted platform. Trusted relationships between any or all of request communication devices, merchant systems, and FIs and/or other FSPs in accordance with the invention can be implemented through the use of trusted network communication protocols as disclosed herein.

In further embodiments, trusted platform(s) in accordance with the invention may be used to authenticate and/or otherwise complete transactions based on identity, such that for example users may in effect be enabled to pay for transactions with their personal identity(ies). In such transactions signal data representing such a user's identity can be received and registered, or otherwise validated and verified, through a strict onboarding process and maintained at a server in the trusted platform, and thereafter relied upon as pre-authorized for purposes of adjudicating transactions. Each individual purchaser or other transaction initiator (human or juristic) may have or be associated with multiple identities, for example in different jurisdictions or in different transactional contexts, for different social media platforms, for particular online services (iTunes), etc. Such verification can be implemented and employed through provision of a token or other representation of, or a link to, data representing a validated identity for storage on an ID card, on the user's smart phone, wearable device, or other mobile device, desktop device, or other request communication device. Such card/device may be tapped to, or otherwise caused to communicate with, a POS or another mobile device. The identity may be forwarded by the POS/device to a server which will verify that the ID is trusted to pay or meet other obligation. The form of payment can be agreed upon between the user and the merchant, communicated to the bank by the POS. The methods of payment are all registered with the bank so no other information need by transmitted.

In various aspects and embodiments, the invention provides methods and further components, including persistently-stored machine executable instruction sets, for implementing the various functions and processes described herein on automatic data processing systems (computers).

According to various further aspects and embodiments of the disclosure, there are provided systems and methods for completing in-app payments quickly and securely within mobile or desktop device environments. For example, in some embodiments, one or more virtual wallet applications may be installed on a mobile or desktop user request communication device, and configured to securely store one or more payment credentials, such as host card emulation ("HCE") tokens, each wallet being associated with one or more methods of payment a user has chosen to provision the device with. Tokens and other payment credentials stored within (i.e., under the control of) such virtual wallet(s) may be available generally to complete transactions according to various different payment protocols, such as by way of NFC readers located at merchant POS terminals, merchant websites, etc.

As will be appreciated by those skilled in the relevant arts, once they have been made familiar with this disclosure, in-app, in-browser, and other payment transaction processes, including mobile- or cloud-based processes reliant on use of virtual wallets and/or other features disclosed herein, may be implemented advantageously through the use of, or otherwise in conjunction with, trusted platform architectures, using for example trusted devices and device relationships as disclosed herein. However, in various embodiments it may be advantageous to dispense with, or to rely partially or wholly on processes which do not include, the establishment of trusted relationships between user request communication devices, merchant devices, and other devices such as trusted platforms, payment processors, and/or card or issuer systems. In some embodiments it may, for example, be sufficiently advantageous to provide alternative means of enabling secure access to payment or other tokens, and of communicating such tokens between purchaser devices, merchant devices, and devices controlled by payment processors and other parties.

As will be further appreciated by those skilled in the relevant arts, once they have been made familiar with this disclosure, various aspects, components, and embodiments of the invention(s) disclosed herein may be implemented on desktop, server class, and other non-mobile devices, in addition to or in lieu of mobile devices. Any type of communications device suitable for use in communication transaction requests or otherwise implementing the objects and processes disclosed herein may be used. These can, for example, include any or all of smart phones, tablet computers, wearable devices such as wrist phones and smart watches or jewellery, laptop computers, desktop computers, server-class and mainframe computers, etc.

Additionally, HCE tokens or other payment credentials stored in mobile wallets may further be made accessible to other applications installed on a request communication device, such as those provided by or otherwise associated with a given merchant, in addition to virtual wallet application(s) issued by FSPs. To access tokens or payment credentials stored in such "merchant wallets," a merchant application may be authorized, by means of suitable prior signal exchanges, to access information from within the virtual wallet application through implementation of a pull architecture. This may, in some cases, be facilitated by the provision on the user communication request device of a system level application programming interface (API) that is common to both the wallet(s) and merchant application(s). Such an API can, for example, be provided through use of a separate API (sometimes referred to as a "software development kit" or "SDK") or other programming feature made accessible by the trusted user request device and adapted to communicate with separate, stand-alone wallet and merchant APIs provided on the trusted device. Because tokens already stored in FI-based wallets may, in such implementations, be pulled by the merchant application, the user may be relieved of the requirement of inputting any credit card information directly into the merchant application in order to complete a transaction.

The merchant's identity and/or individual merchant application(s) may be registered with a trusted platform, such as a certification authority, which authenticates the merchant and/or trusted user request communication device(s) during transactions. In some cases, a common central certification authority may be provided so that multiple merchants or merchant applications can be registered for completion of secure in-app transactions according to the embodiments described herein. For example, a common central certification authority may be established or operated by one or more financial institutions, such as one or more banks, acting in cooperation or association. To facilitate in-app payments by multiple different users of multiple different merchant applications, an industry-wide standard for the issuance of certificates used to authorize the merchant and/or the merchant application can be agreed upon and implemented. In some cases, a user's request communication device and/or one or more virtual wallet applications on the request communication device may also be registered with the certification authority.

As a part of completing a mobile or other payment that has been initiated from within a registered merchant application, a data representing a certificate (e.g., a token) issued to the merchant or merchant application may be transmitted to the merchant application, for storage under the control of such application on the user's request communication device and subsequent presentation by the user's request communication device to the central certification authority, and/or other transaction processors, for use in verifying or otherwise authenticating a transaction. For example, as part of a checkout or payment sequence, the merchant application may send a request to a merchant server or some other networked system or resource where the merchant's certificate has been stored. The merchant application may then use the merchant's certificate to query a user's mobile wallet through the common API. Such a query may be initiated automatically by the merchant application in response to receipt of the merchant's certificate or, alternatively, following a manual confirmation prompt presented to the user on the mobile device.

In response to being queried by the merchant application, in some cases, a virtual wallet application may cause presentation on an output screen of the requesting communication device of a user interface soliciting authorization to proceed (a 'prompt' for confirmation of authorization). Where the virtual wallet is storing tokens or payment credentials for more than one method of payment, the virtual wallet may also prompt the user for a selection of one of the stored payment options for use with the current transaction. If only a single method of payment is stored, the virtual wallet may or may not prompt the user for selection of a payment method. In some cases, a user may specify a default method of payment in the virtual wallet, which the virtual wallet may then automatically select for use in the current transaction, and cause presentation of an overidable (or non-overidable prompt to confirm the default selection, even though multiple different payment options may be stored. Such default may be specified for all merchant applications or only certain merchant applications and, in some cases, may also be disabled.

Following selection by the user of the requesting device, or by the virtual wallet, of a payment option, the virtual wallet may respond to the merchant application, via communications subsystems of the requesting device, with a token or credential representing the selected method of payment of the user. The merchant application may then transmit the received token or credential to the merchant server along with other information needed to complete the transaction. In some cases, the payment information sent to the merchant server may be encrypted so that the merchant may not be able to view any of the user's sensitive information. Encryption of the payment information may be performed by the virtual wallet prior to transmission to the merchant application, by the merchant application, or by some other application or program on the requesting communication device. To complete transactions and process the selected payment, the merchant server may forward the token or payment credential received from the virtual device and other required transaction information to a payment gateway or other transaction processor.

In some cases, a payment credential sent to a merchant server may be an exact copy of a token previously stored in the mobile wallet in association with a particular payment method. Alternatively, or in addition, the virtual wallet application may generate a single-use token for the transaction that is wholly or partially derived from, or otherwise associated with, the token permanently stored in the virtual wallet and respond to the merchant application with the single-use token rather than the permanent token. In some cases, the payment credential used to complete the transaction (either directly or through generation of a single-use token) can be generated in advance, and stored in the virtual wallet prior to commencement of the transaction. In such a case, it may not be necessary for the virtual wallet to communicate with any trusted servers at the time of the transaction so as to obtain the required payment token. Although in some cases, the virtual wallet may also be configured to obtain or validate payment tokens generated by other systems and/or applications at the time of each transaction.

In some embodiments, tokens stored in, or otherwise accessible to or controlled by, a virtual wallet application may represent different types of payment. For example, in addition to one or more separate credit card types, or protocols, payment tokens linked to individual or multiple bank accounts, and/or lines of credit may be generated and stored by the mobile wallet for use in mobile payments, including secure in-app payments. In general, each authorized method of payment may be associated with one or more different payment tokens. In some cases, payment tokens for still other asset types, such as coupons and/or loyalty programs, may be utilized, alone or in addition to demand, deposit, or credit account funds. Whichever type of payment(s) are selected, the merchant application and the virtual wallet may configure the transaction so as to be suitably identifiable by the payment gateway. Depending on the type of transaction, once identified, the payment gateway may then route the token or payment credential to an appropriate FSP server for processing.

In addition to different types of payment, tokens stored in or otherwise accessible to or controlled by, virtual wallet applications in accordance with various aspects and embodiments of the invention can include multiple tokens useful for completing payments of the same type (e.g., credit, debit, rewards, or loyalty), but drawn or otherwise provided from accounts held, controlled, or otherwise administered by independent FIs or FSPs, i.e., by FIs or FSPs subject to independent legal rights and obligations, and/or independent owners or administrators. Such independent FIs or FSPs can impose may different distinct requirements, including successful submission of unique security codes and/or compliance with other secure features procedures, which are all accounted for by various aspects and embodiments of the invention.

In some further aspects, embodiments of the inventions described herein may also incorporate a trusted platform into a mobile and/or non-mobile environment to process electronic payments. For example, after a user's request communication device has been authenticated as a trusted device, when a payment with a merchant is initiated, the user's device may cause a payment token, a reference to such a token, and/or other encrypted data stored in a mobile wallet application or elsewhere on the mobile device, or in a secure cloud, to be transmitted to the merchant system, along with any other data desired or required to complete a payment transaction. The merchant or merchant application may electronically sign or otherwise evidence or confirm authorization of the token by adding to or associating with the token data representing, or otherwise associated with, the merchant's certificate status (using data signals recognizable as such by a certification authority or trusted platform), and may forward the 'signed' message to a payment network.

Because the merchant and/or the user's device has been authenticated as trusted, the payment message (e.g., a transaction authorization data set) may be configured, by either the mobile device or the merchant, to resemble a payment data set in accordance with a recognized payment protocol such as Interac™, or any other suitable type of payment protocol, regardless of the form of payment selected by the purchaser. In such a case an acquirer within the payment network may receive the message and, identifying it as an Interac™ or other type of transaction, forward the message to an issuing FI, such as a bank, instead of to another destination. The issuing FI may then verify/decrypt the message and process payment to the merchant, directly or indirectly. In some cases, the issuing FI may arrange for payment directly from the selected method of payment indicated in the message. Optionally, the issuing FI may instead pay the merchant from the FI's own funds, and the issuing FI may thereafter settle separately with the user by any payment methods that the user has registered with the trusted platform. In some cases circumstances, as will be understood by those skilled in the relevant arts, it can be more efficient and secure, and/or otherwise advantageous, for such a payment message to be forwarded directly to the issuing FI, instead of to a third-party acquirer by way of a payment network, for 'in-house' settlement. For example, transaction adjudication processing times may be decreased, and payments to third party processors may be eliminated or reduced.

As will be understood by those skilled in the relevant arts, a 'token', as used in this disclosure, is a secure data device adapted for communication of sensitive information. Such a device may comprise data any such sensitive information, substitute data adapted to serve as a proxy for such data, and/or pointers to resources such as IP addresses at which data is stored and may be securely accessed. A particular type or item of data that may be included in such tokens, and/or in such token references, is a security key tied to a server, such as a server (120, 160) which is used to control access to the sensitive data. Such a security key can include any data, including any identifier(s), sufficient to evidence or gain authority to access the information. Such a security key is not limited, for example, to PKI keys or certificates, etc.

As noted, a variety of different payment methods may be represented through suitable implementation of an electronic ('virtual') wallet application, including for example lines of credit, cash accounts, loyalty, gift, and/or rewards point balances, etc. As described, the selected method(s) of payment may be designated in a message in a manner that will be routed by the merchant to an acquirer or other authorized FSP using existing payment networks and/or infrastructure, and for routing by the acquirer or FSP to issuing FI. Each method of payment represented in the electronic wallet may correspond to a method of payment registered with a corresponding issuing FI and/or trusted platform. A merchant does not need to know or care which method(s) of payment the user has selected for the transactions, nor does the merchant need to be provided with systems or applications configured to accept any particular method(s) of payment. The issuing FI(s) may pay the merchant from the FIs' funds, and settle with the purchaser or other requesting user through reimbursement from the user's selected method(s) of payment. Consequently, no or only minimal changes to a merchant or other payment processor backend entity to implement aspects of the invention(s) described herein, and thereby reduce processing times and the need for additional payment systems and/or applications. In some cases, all that may be required is for a merchant to receive a certificate data set from an FI or trusted platform, which may be used to electronically sign payment tokens provided from users or their mobile or non-mobile devices.

In some embodiments, systems, methods, and instruction sets described herein may be utilized to initiate and transact payments from within general purpose browsers installed on a mobile or other device, rather than from within an application or program that is provided by or otherwise associated with a merchant. For example, when a user navigates to a web page or site that requires a payment, an option may appear to enable selection of payment using a virtual or electronic wallet installed on the user's request communication device. Such an option may be presented in addition to other types and/or method(s) of payment that may be available, and may appear in any desirable or otherwise suitable location, such as in a list of payments options or as a graphically or functionally distinct user interface object, such as a selectable 'button.' When a requesting user selects to pay via a virtual wallet, the user's browser application may interface with a corresponding wallet application present on or otherwise accessible by the requesting device, obtain a payment token from the wallet, and include the token in a payment message to be processed through the merchant backend. Processing of the electronic payment through a payment network or other entities may then proceed according to any of the applicable embodiments described herein.

A significant advantage offered by the invention is that the user experience of implementing a payment transaction can be substantially the same, regardless of platform. For example, in each case, when selecting to pay with an electronic wallet, a list or other visual representation of multiple applicable payment cards/accounts may be presented to the user for selection, as previously described. The requesting user may select the method of payment, and the mobile device or personal computer may transmit a suitably-configured token to the merchant or, in the case of a cloud wallet, the bank may route the respective token to the merchant or directly to the merchant's acquirer.

As previously noted, according to various aspects of the invention, electronic transactions may be initiated and completed from within applications or other programming devices on non-mobile devices, such as personal computers. For example, in some cases, a user may navigate to a website on which a good or service may be purchased, leased, etc., from a merchant. A login or other prompt allowing selection of a virtual wallet payment option may be displayed to the user on the merchant's checkout/payment web page. Upon selection of the virtual wallet payment option by the requesting user, the merchant's web page may present a secure login, for example, rendered in a nested browsing context (e.g. an iframe or other graphical overlay or insert) with interactive fields adapted to enable the requesting user to log in to the user's authorized bank, credit, loyalty, rewards, and/or other payment account(s). Upon successful log-in or other authorization, FI(s) associated with the designated payment accounts may respond by providing one or more payment tokens to the merchant, or to an acquirer or other third party payment processor designated by or otherwise associated with the merchant, the token representing one or more method(s) of payment identified within the user's electronic wallet and adequate for satisfying the transaction payment. Such payment token(s) may be stored on the user's device and/or in a secure cloud resource. After the merchant or merchant backend has received the payment token(s), the transaction may be processed according to any of the method described herein.

Accordingly, in some embodiments, regardless of how or from what program or application a user has initiated a transaction (in-app, mobile or non-mobile browser), the user's device may not even store a virtual wallet application or payment token(s). Instead, in such cases, the device may provide means for securely authenticating the device/user to the FI(s) administering the user's payment accounts, such as by way of trusted platform. Once the user and/or device have been authenticated, the user's FI(s) may transmit electronic payment token(s) to the merchant/acquirer for processing of the transaction. A variety of secure authentication methods may be used as described herein, including fingerprint or other biometric verification, including for example voice or facial recognition, login/password, or any other secure verification means supported by particular capabilities of the user's device.

Further details of various embodiments of the invention(s), including at least one preferred embodiment, will now be provided with reference to the drawings. Headings or sub-headings used herein are intended for convenience only, to organize the disclosure into logical groupings of subject matter without limitation of any kind to the scope of the described embodiments. As will be appreciated by those skilled in the relevant arts, many of the features disclosed herein may be employed in a very wide variety of combinations and alternatives, depending upon payment network configurations; user, merchant, and/or FSP preferences, etc.

Trusted Platform

Reference is initially made to FIG. 1, which shows a schematic diagram of a system 100 suitable for use in implementing various aspects and embodiments of the invention. In the example shown, a system 100 includes at least a user or request communication device 110 (also a "network transaction communication device" and/or a "network communication device"), for use by purchasers or other users 190 (FIG. 3; FIGS. 14A-14F); a trusted authentication platform (or 'trusted platform') 120; and a merchant system 130 comprising merchant point of sale (POS) and/or other transaction device(s) 132, 134, and merchant or other FSP server 136.

While only one of each of devices 110, 120, 130, 132, 134, 136 is shown in FIG. 1, those skilled in the relevant arts will readily understand that a system 100 can include any desired or otherwise advantageous numbers of such devices.

In some embodiments, user or request communication device(s) 110 may comprise or consist of any suitably-configured smart phone, tablet, wearable, laptop, or other mobile devices; desktop or other stationary computer(s) or terminals, etc. A large number and variety of suitable devices are now available commercially, and doubtless others will be developed subsequent to the preparation of this specification. Further details of request or user communication device(s) 110 are provided below with reference to FIG. 6-8.

Trusted platform(s) 120 may comprise or consist of any enterprise, server, desktop, laptop, or other suitably-configured types or class(es) of electronic data processing (computer) systems. A large number and variety of suitable devices are now available commercially, and doubtless others will be developed subsequent to the preparation of this specification. Further details of trusted platform(s) 120 are provided below with reference to FIGS. 9-11.

Merchant system(s) 130 and device(s) 132, 134, 136 may comprise or consist of any suitably-configured POS, mPOS, and backend data processing devices. A large number and variety of suitable devices are now available commercially, and doubtless others will be developed subsequent to the preparation of this specification. Further details of merchant system(s) 130 and device(s) 132, 134, 136 are provided below with reference to FIG. 9-11.

Devices 110, 120, 130, 132, 134, 136, or any of them, may communicate between themselves by wireless (including optical, RFID, and infrared), wireline, or other means, using for example suitably-configured signal processors, transmitters, and receivers configured to communicate via the internet, the PSTN, and/or other communications networks, using any suitable protocols or combinations of protocols. Very commonly, such devices incorporated one or more dedicated communication subsystems, operating under the control of one or more central processing units (CPUs) and/or other processors, for such purposes.

As a part of implementing the processes enabled herein, as shown at (1) in FIG. 1, a user 190's mobile device 110 may be registered with a trusted platform server 120 by means of suitably-configured signal exchanges over a communications network 200 (e.g., the Internet and/or PSTN), and at (2) be provided by the trusted platform 120 with a secure data set, representing a certificate or other token, to be stored in volatile (persistent) or non-volatile (i.e., transitory or non-transitory) memory of the device 110 and thereby make the device 110 a trusted device 110'. Once received and stored in device 110, such certificate or token may be used by the device 110 and trusted platform 120 for rapidly and securely identifying the device 110 as a "trusted device" 110', for example for transmission to and interpretation by the trusted platform 120, for use in rapidly authorizing and/or otherwise verifying data processes such as purchases or other financial transactions with third parties such as one or more merchant systems 130.

Registration of a device 110 with a trusted platform 120 to create a trusted device 110' can comprise any means of establishing means for suitably unambiguous and secure communications that are consistent with the purposes herein. For example, one or more unique and secure identifiers of the device 110, and/or one or more authorized users 190 thereof, may be used, in a wide variety of alternatives and combinations. These can include for example, names, 'secret' personal information, serial numbers, random or pseudo-random codes, account numbers, etc.

Such a trusted device 110' may then, for example at (3), be used to negotiate and complete one or more 'in-app' payments or other data processing transactions through a direct Internet connection such as a merchant, game, or other application ('app') provided by a merchant/provider 130 or some other entity, including general purpose web browsers and the like, using suitably configured hypertext links, provided to a user display screen or other I/O component 610 (see, e.g., FIG. 6) of the trusted device 110', and transfer of touchscreen, keyboard/keypad and/or other user-generated inputs, signal transmitters and receivers, etc.

In the same and other embodiments, at (4) a trusted device 110' may communicate locally with a mobile POS ("mPOS") device 132 logically bound to a merchant system 130, 136, which itself may be registered with the trusted platform 120 as a trusted entity, for what is sometimes called direct, or "off the rails" of the conventional payments systems, processing. In other words, the mPOS 132 and/or bound merchant processor 136 may be enabled by such means to communicate, as shown at (5), directly with the same or another trusted platform 120 without having to negotiate, by means of suitable signal exchanges, with a fourth-party transaction processor 150 such as a payment processor such as VisaNet or equivalent proprietary payment network. By obviating the necessity of involving fourth-parties 150 such as payment processors for "on the rails" processing by more conventional means a number of advantages, including faster and more secure processing of often sensitive transaction data such as identities, account identifiers, etc., may be realized.

In some embodiments, such an mPOS 132 and/or bound merchant processor 136 may be enabled to also and/or alternatively communicate, instead of directly with a platform 120, by means of suitable signal exchanges, with such fourth-party transaction processor 150, which as noted could be a payment processor such as VisaNet or other proprietary payment network. Transactions negotiated between an mPOS 132 and/or bound merchant processor 136 and a fourth party transaction processor 150 may then be settled subsequently with an issuer bank 160 and/or with a trusted platform 120 so that a merchant is paid and a user is debited a corresponding amount. One possible advantage of such configuration is that an mPOS 132 and/or bound merchant processor 136 may be already configured for communication and/or transaction processing with a fourth party processor 150. Thus, any and all benefits of authentication with a trusted platform 120 may be realized in mobile transactions, while taking advantage of existing merchant system architectures.

In addition to payments and other financial transactions, trusted platform architectures 100 may be used for a variety of other purposes. For example, as noted above, identity verification is another possible application (e.g., the bank trusts me, you trust the bank, so you, arbitrary third party, trust me). Trust between banks or other account administrators or trustees 160 associated with a trusted platform 120 may work in a similar manner. Each bank or FSP 160 may be validated and verified with the other banks or FSPs 160 in the trusted platform system 100.

In various embodiments, a trusted platform 120 may be used to enable users of devices 110' to consummate purchases and/or process other transactions based on personal, device, or other non-payment identity(ies) or identifier(s) associated with one or more accounts to be used to effect payment, rather than account numbers and the like. Data representing a user's true identity, or other identity acceptable to a trusted platform 120 as a guarantee of completion of payment or other obligation(s) associated with a transaction, such as an employer's or other institution's identify, may be received, validated, and verified through an onboarding process or other process, and maintained at one or more servers 120 in the trusted platform architecture 100; and one or more suitable tokens, comprising data representing authenticating identifier(s), may be returned to the user device 110 for storage in memory associated with the device 11, so that it may be thereafter be used to return to the issuing trusted platform 120 data (which may be or include the token) suitable for use in establishing and/or re-establishing the device 110 as a trusted device 110'.

As will be appreciated by those skilled in the relevant arts, any user or request device 110 may be associated with multiple authorized human and/or juristic users, and/or with multiple accounts associated with such user(s). For example, each such device may be used by different authorized users and/or entities in different jurisdictions, or in different data processing contexts, as for example different social media platforms vs inside a brick-and-mortar merchant premises or particular online services (e.g., an online music or media source). A representation of, link to, and/or other data or instruction associated with each validated identity may be stored on or in an ID card, such as a physical credit or debit card, or in separate or general memory of a device 110, 110', such as an SD card or other removable device, or in general memory or memory otherwise associated with or accessible by such a device, as for example in one or more virtual wallet application(s) 112, dedicated software, firmware, or hardware, or a separate device of similar functionality, such as a USB key. A card or device 110, 110' comprising such trusted identifier(s) can be tapped to or otherwise caused to interact with a POS device 132, 134, or another mobile device 110, 110', etc.; and at any suitable point in the process any one of the multiple identifiers may be selected for use in connection with a transaction, using for example suitably-configured I/O devices of the device 110, 110'. Identifier(s) associated with the selected identity may be forwarded by the POS/device 110, 110' to a server 120 which will verify that the ID is trusted for completion of the transaction.

In embodiments adapted for completion of purchases and other transactions involving payments, one or more forms of payment to be used in completing a transaction can be agreed upon in advance, at the time of a transaction, and/or after the transaction has been confirmed, between the user 110' and the merchant system 130, and communicated to the bank/trusted platform 120, 160, for example, by the POS 132, 134, or server 136, etc. Such methods of payment may be registered with or otherwise authenticated by the bank 160 or other trusted platform 120, so that the need for transmitting and interpreting information identifying such methods may be obviated or otherwise reduced. In this manner, for example, payment may be completed with use of an instruction to the bank 160 or other trusted platform 120 to process payment according to the agreed upon method of payment, without having to provide any details (which may be of a sensitive nature) related to the selected source or method of payment in the payment message itself.

Thus, for example, a novel variety of types or modes of payment settlement processing are enabled by the invention. For example, at the time of a transaction, both the user of a device 110' and the merchant system 130 may agree on a type, mode, or protocol of payment protocol to use (e.g. credit, debit, cash bank transfer, loyalty point redemption, including one or more specific accounts associated with each such type of payment), and identifier(s) associated with the selected protocol can be transmitted to the trusted platform server 120. Such protocol may be agreed and designated for use in processing, irrespective of the type(s) of payment accounts to be used in completing the transaction. The server 120 can itself have the ability to process the payment with the selected protocol, particularly where the server 120 is associated with a bank or other account-controlling FSP 160. From the perspective of the merchant' 130, the transaction data flow can be the same, or essentially the same, regardless of the payment protocol selected, in accordance with the preferences of itself or its payment systems service providers.

The ability of a trusted platform 120 to communicate with any one or more merchant systems 130 and/or FSPs 160, or to act as a bank or FSP in its own right in completing a transaction, and to complete such transaction using any one or more of a wide variety of payment types or protocols, without any requirement for differences in processing by merchant system(s) 130, is one of the significant advantages offered by the invention.

Optionally, or in addition, a trusted platform 120 may associate a default account, or other payment protocol or method, with transaction requests generated by user device(s) 110' associated with specific transaction requests, based on a variety of criteria, including for example user identity, account characteristics (including the identity of any FIs associated with the account(s), and/or user preference(s).

Any or all of the above options may be controlled and/or otherwise implemented by a trusted payment application operating on a user device 110'. For example, a virtual wallet application 112 may be associated with a specific user identity, as for example an individual, one or more of the individual's accounts, one or more distinct FIs or FSPs, and/or one or more user/merchant application combinations; and a specific authorized user of a device 110' may be enabled, for example by means of suitably-configured user interfaces, to select which identity/app/account or combination thereof is to be used to conduct transaction(s); and any one or more of such selections may be identified as overridable or non-overidable default selections under desired conditions. Such pre-selection by means of defaults can, for example, eliminate the need for a user to select, and a trusted platform 120 and/or merchant 130 to accept, a specific payment method at the time of a transaction.

Optionally, a trusted platform 120 acting as or on behalf of an FSP 160 may offer to the user, either through the user's device 110, 110' and/or through an mPOS 132/POS 134, opportunity(ies) to open or otherwise access or create a new or existing line of credit or other new funding source at the time of payment, through the use of suitably-configured user interfaces and data exchanges. A wide variety of further possibilities are enabled by the invention, including the creation of loyalty, reward, gift, and other types of accounts.

As will be appreciated by those skilled in the relevant arts, a trusted platform 120 can be used to assure a merchant associated with a merchant system 130 (which may for example be operated by or on behalf of an association of merchants) that the merchant will be paid an amount owing to the merchant as a result of a transaction in accordance with the disclosure. From the merchant's perspective, where the money comes from on the user's side is generally not important, so long as the merchant is paid. This is a further significant advantage offered by the invention. For example, a user of a device 110' can be enabled to pay with any method acceptable to the trusted platform 120 and/or an associated FSP 160, without having to consider the merchant's preferences for payment. For example, in many prior art systems, when a merchant does not accept a specific form of payment such as AMEX™, then the user is required to find another, acceptable method of payment. A trusted platform 120 can, for example, be adapted to accept and make payments in accordance with such preferred protocol(s), and to cause payment to be transferred to the merchant in accordance therewith, and subsequent settlement between the trusted platform 120 and the purchaser using the device 110' to take place according to any desired, mutually-acceptable form of payment. This can, for example, be accomplished by advancing payment to the merchant system 130 from funds controlled by the trusted platform 120 itself in the AMEX or any other desired protocol, and collecting reimbursement from the paying user separately. Without authenticating the merchant system 130 as a trusted entity, settlement by the trusted platform 120 first with the merchant and then separately with the user may be more difficult or not even possible at all.

In further embodiments, including those in which a trusted platform 120 settles with the purchasing user separately from the merchant, a trusted platform 120 or other FSP 160 may provide for payment using a combination of funding sources associated with one or more users or device(s) 110', without identifying the designated the sources to merchant system 130. For example, a user can pay for half of a transaction with one credit card account, and the other half using a debit or loyalty account.

In various embodiments, a trusted platform 120 or other FSP 160 may allow for a user of a device 110' to wholly or partially pay for a transaction using loyalty points registered with the trusted platform 120, 160, whether or not the merchant would otherwise be willing to receive points as a form of payment. This is possible in any circumstance where the points may be redeemed by or upon authorization of the trusted platform, 120, 160, without necessity for considering the preferences or requirements of the merchant system 130. Thus, the trusted platform 120, 160 is enabled to pay the merchant in the merchant's preferred format (including choice of currency, such as dollars, euros, pounds, rubles, or yen, or electronic currency such as bitcoin) using suitably-configured signals and data exchanges. For example, a trusted platform 120, 160 can provide to a merchant system 130 signals representing payment of $50 when the user of the device 110' has settled, or has agreed to settle, with the trusted platform/FSP 160 for $25 plus points associated with or otherwise acknowledged by the FSP, in an amount sufficient to compensate the remaining $25, either before or after settlement. The merchant system will only see that it received $50.

When a user taps the user's mobile or other transaction communication device 110', or otherwise puts the device 110' into an operating state configured for payment to complete a transaction, the trusted platform 120 may directly communicate with the mobile device 110' to determine payment options. Real-time offers, including coupon, redemption, discount, credit, and other options may be presented to the user, optionally in conjunction with opportunities to pay by various methods, including for example new credit, loyalty, or other accounts. Again, a wide variety of such options and communications can be handled through a virtual wallet or other payment app 112, 114.

Among the many advantages offered by the trusted data processing relationships that may be established between devices in accordance with the invention, particularly where a trusted platform 120 is operated by or on behalf of a bank or other FSP 160, is the ability to enable a user of a device 110' to change a selected method of payment following completion of the transaction, and even after the merchant system 130 has received and processed final payment data from the trusted platform/FSP 120, 160. Since the merchant is paid by the trusted platform/FSP 120, 160 regardless, the trusted platform/FSP (the bank) may allow the user, through the user's trusted device 110', to select new or revised form(s) of payment, optionally within a specified time limit (e.g. during the same business day, within 24 hours or a standard transaction clearance period, or within some other predefined cutoff). In such embodiments the trusted platform/FSP 120, 160 may be configured to send a reminder to the trusted device 110' regarding the pending expiry of the time limit to change the method of payment. Before this cutoff time, the trusted platform 120, 160 can settle with the merchant system 130, regardless of payment status as between the trusted platform/FSP 120, 160 and the user of the device 110'.

Among the advantages offered by various embodiments of the invention is that, at the time of payment, a trusted request communication device 110' may not require a network connection with the trusted platform 120 and/or FSP 160, because the trusted device 110' is configured (see e.g., (1) in FIG. 1) with a token which, among other possibilities, may be forwarded via the merchant system 130, including for example an mPOS 132, to the trusted platform 120 for payment and/or other settlement, without need for communication between the device 110' and platform 120 at the time of the transaction.

A trusted platform 120 also may facilitate payments between parties without a merchant mPOS 132, including for example between pairs or other multiples of user communication devices 110'. For example, a pair of parties may each have a mobile device 110 registered as a trusted device 110' with a trusted platform 120. As long as the trusted platform 120 has established a trusted data interchange relationship with each party's device 110', the trusted platform 120 will trust commands received from each device 110'. Instant money transfers between parties may therefore be possible since the trusted platform 120 trusts both parties individually, especially where both parties are customers of the same bank 160.

A trusted platform 120 may also facilitate the transfer of tokens representing pre-authorized transaction values (e.g., pre-paid value) between user devices 110'. Where network communications are available, this can be handled using processes described above. Where network communications are not available, it may for example be accomplished by associating such a prepaid token with trusted identifiers associated uniquely with each of the transferring and receiving devices 110'. Where necessary, transfer may be confirmed when network communications are restored. Alternatively a payment token can be deleted from the first device 110', and a new but financially equivalent one be generated on, by, or for the recipient device 110'.

Figure 2:
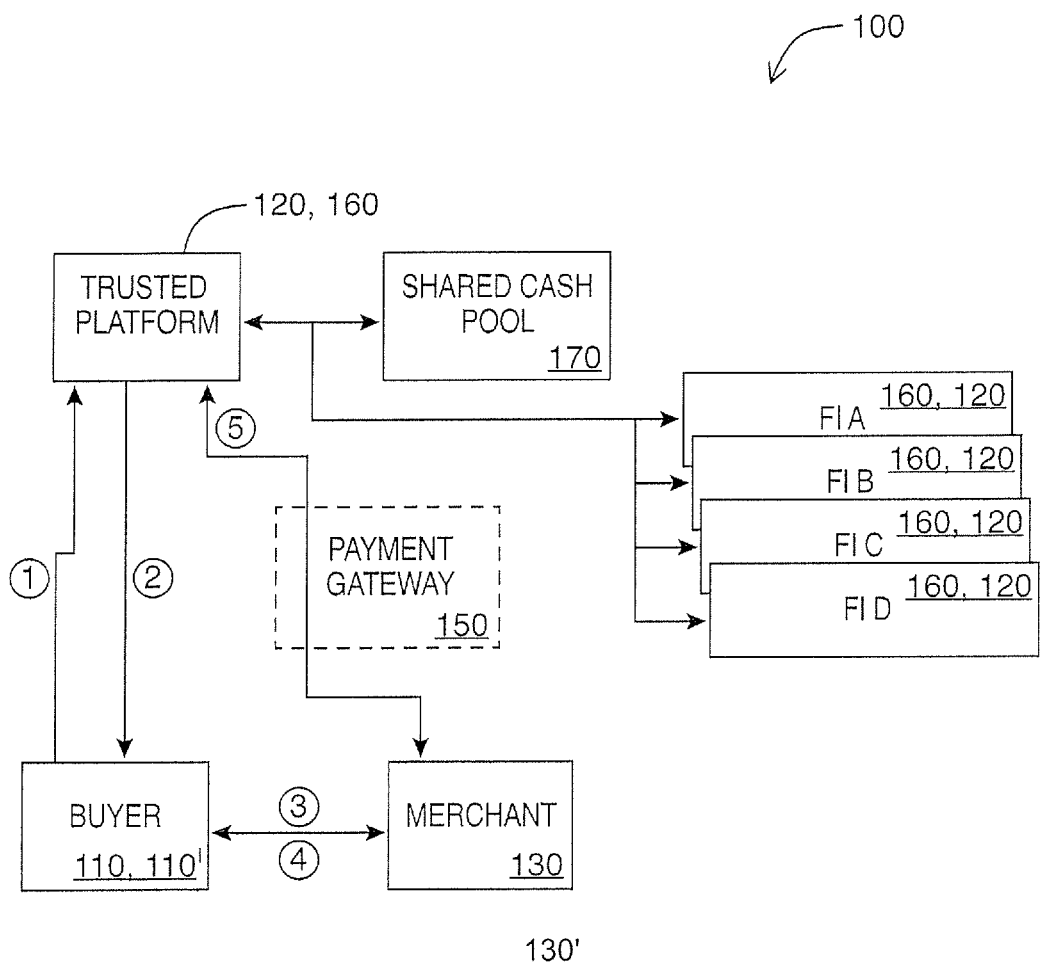
FIG. 2 shows another schematic representation of an example system suitable for use in processing data in accordance with aspects of the disclosure.

In FIG. 2, there is shown a schematic diagram of an embodiment of a system 100 in accordance with the invention. Among variations shown in FIG. 2 is a "stored cash" or "shared cash" pool 170, in the form of a secure data set 125 (see FIG. 1) stored in memory controlled by one or more trusted platforms 120. Such a secure data set 125 can represent a pool of monetary value, in the form of data representing any desired form of real or virtual currency(ies) or value(s), or indicia thereof, which can be contributed to, and drawn from, by, for example, a plurality of trusted FSPs 120, 160 such as shown in FIG. 1, for use in the secure and potentially very fast clearance of transactions conducted between parties 110, 130 holding accounts at the various trusted FSPs 120, 160. As those skilled in the relevant arts will appreciate, once they have been made familiar with this disclosure, FSPs 120, 160 can be, include, or otherwise be administered by or associated with any of a wide variety of entities, including banks and other financial institutions such as the Royal Bank of Canada ("RBC"), the Bank of Montreal ("BMO"), the Canadian Imperial Bank of Commerce ("CIBC") and others.

Figure 3:
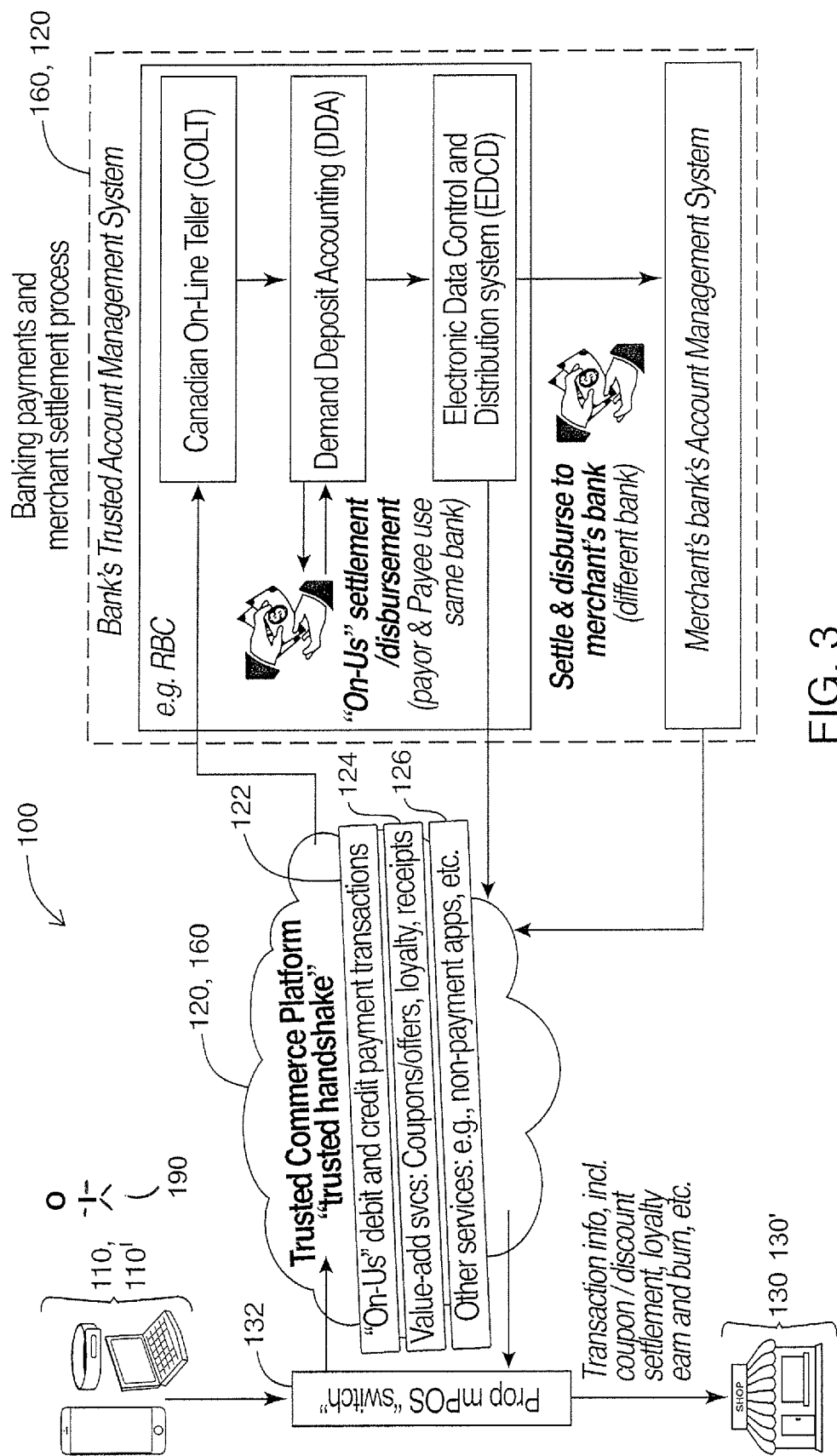
FIG. 3 shows another schematic representation of an example system suitable for use in processing data in accordance with aspects of the disclosure.
Figure 4:
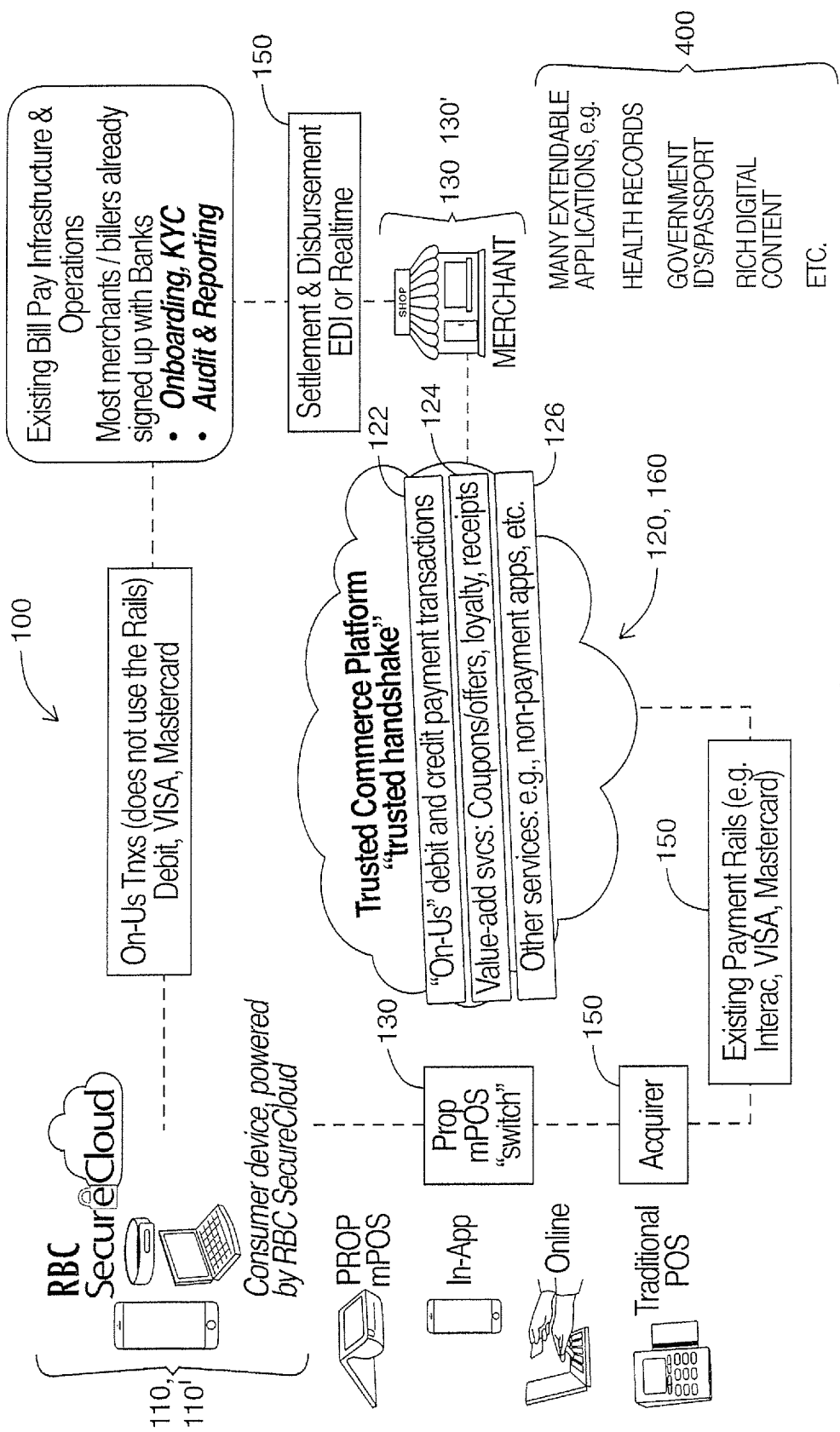
FIG. 4 shows another schematic representation of an example system suitable for use in processing data in accordance with aspects of the disclosure.

Referring now to FIGS. 3 and 4, there are shown schematic diagrams of further embodiments of a system 100 in accordance with the invention. Among variations shown in FIGS. 3 and 4 are several specific examples of services that can be provided with improved efficiency and effectiveness by placing a trusted platform 120, 160 between a merchant system 132, 130 and one or more FSP systems 160. These include, for example, expedited settlement and clearance of 'on-us', and/or other 'off the traditional payment system Rails' payments between parties (e.g., users 110' and merchants 130) who are both registered with the trusted platform, as shown at 122 and described herein, as an alternative or in addition to more conventional processing through fourth party systems 120. Note that, as shown at 302, if/when one or more of the parties 110, 130 to a transaction are not registered with the trusted platform 120, 'on-us' transactions can be completed by other FSP's 160 if, for example, both parties hold accounts with the FSP 160.

Another example, shown at 124 in FIGS. 3 and 4, of services that can be provided with improved efficiency by a trusted platform 120 of a system 100 are value-added services such as offering and/or redemption of coupons, loyalty points, discounts, and generation of data sets representing enhanced or other receipts pertaining to transactions processed by the trusted platform 120. For example, as previously described, such services may be provided by for example the use of additional and/or substitute protocols, such as loyalty or gift protocols, when interpreting and processing payments for transactions between users 110' and merchant systems 130.

As noted at 126, a trusted platform 120 can offer or perform any desired ancillary or other services, including for example services offered through non-payment related applications, etc. These can include, for example, links to other goods or services offered by the trusted platform 120, merchants 130, etc.

As previously noted, system(s) 100 in accordance with the invention are suitable for use in a number of applications in addition to, or as alternatives to, payment and other financial transactions. As noted at 400 in FIG. 4, such applications can include a wide variety of sensitive or otherwise desirably secure data processes, including for example maintenance, use, and analysis of electronic health records; government records such as identification records, including for example passports and other identifiers, tax records, criminal and other court records, police and intelligence data, etc.; and a wide variety of rich or otherwise valuable digital content.

Figure 5:
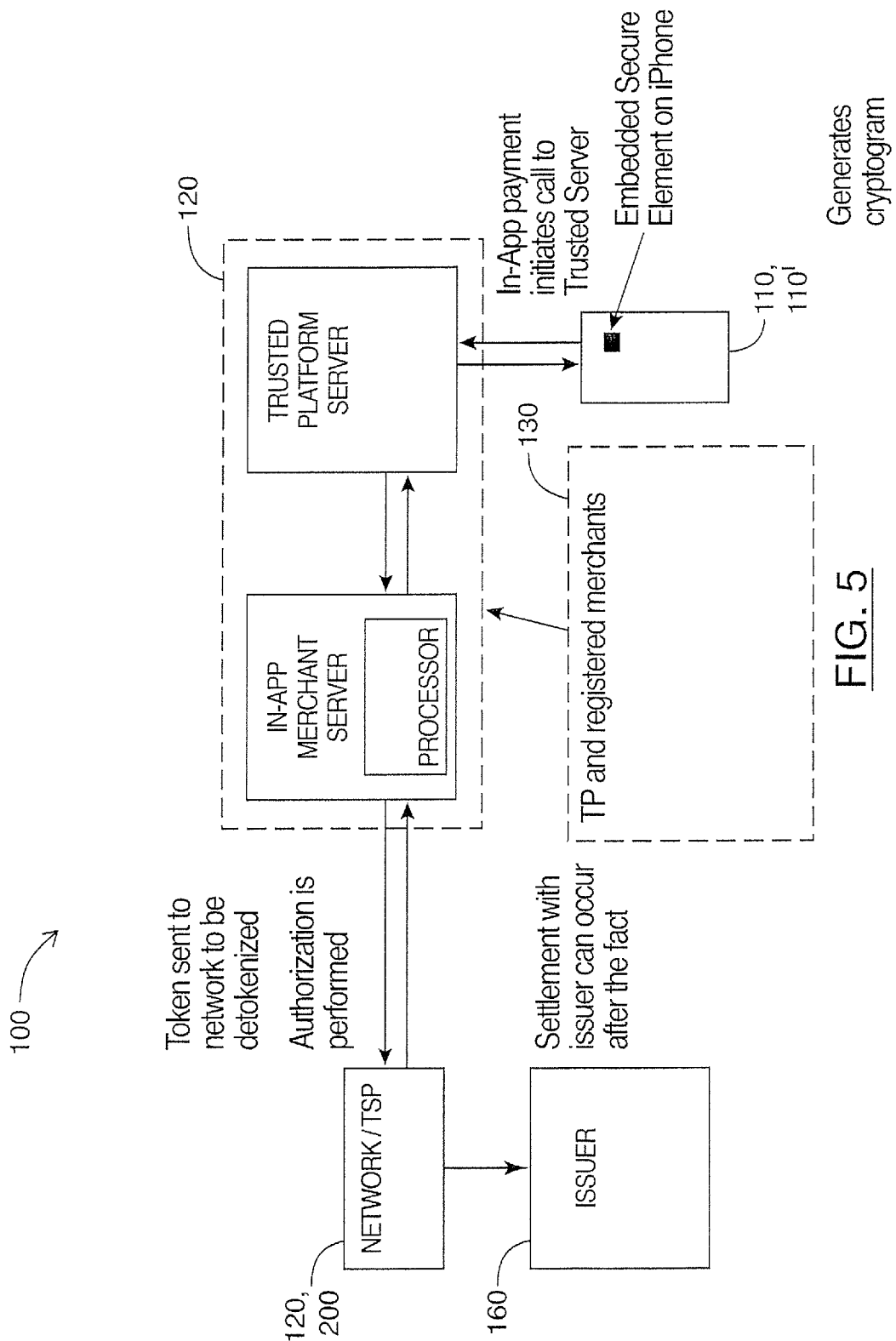
FIG. 5 shows another schematic representation of an example system suitable for use in processing data in accordance with aspects of the disclosure.

Now referring to FIG. 5, a further embodiment of a system 100 in accordance with the invention is shown. As previously noted, devices 110, 110' may comprise or consist of any device(s) or combination(s) of device(s) suitable for use in accomplishing the purposes disclosed herein. For example, a user device 110, 110' may comprise a user's desktop computer, which may in some cases lack hardware/communications resources typically provided by mobile devices such as smart phones, tablet or wearable devices, etc.

In such cases, when a user initiates a purchase or other transaction with a merchant system 130, as for example through the use of the PSTN/Internet and a desktop merchant application, a variety of data and/or other signals, including for example transaction confirmation signals, may be generated by any or all of systems 120, 160, 130, and passed to a user's registered device 110' for use by the device 110' in acquiring confirmation from the purchasing user, or a financially-responsible party such as an account holder. For example, when a purchase or other transaction request is generated by a registered desktop device 110', prior to completion of the transaction a trusted platform 120 may route to a trusted mobile device 110', such as a smart phone, associated with an account associated with the transaction, a request for confirmation by a user of the registered mobile device 110'. Such embodiments may significantly increase the security of transactions, and reduce fraud and other forms of abuse, mistake, etc. Moreover, the amount of information exchanged between servers can be reduced, and privacy increased, by elimination of FIs/FSPs 160 and fourth-party FSPs 150 from the transaction data stream. Card issuers, for example, need be informed only of the final values of transactions, and not further details.

Figure 6:
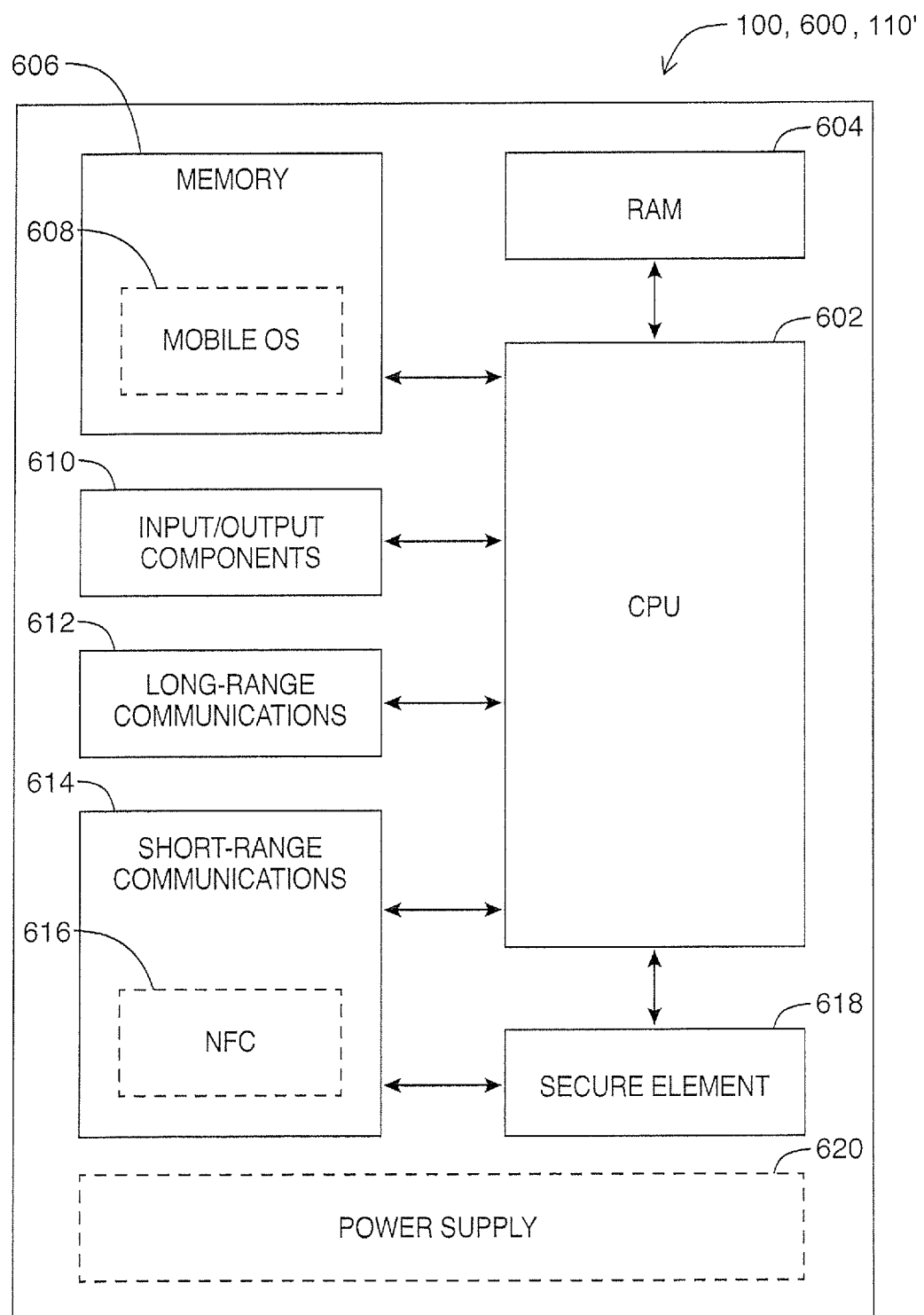
FIG. 6 shows a schematic representation of an example mobile device suitable for use in implementing various aspects and embodiments of the invention.

Referring now to FIG. 6, there is shown a schematic representation of an example mobile device 110, 600, which can be registered or otherwise established as a trusted device 110', in accordance with embodiments of the invention. As previously noted, a device 110, 600 may generally be any portable electronic device comprising an assembly of electronic, structural and/or electro-mechanical components within a suitable housing, and which provides a user with various voice and/or data functions including short and/or long-range network connectivity. As will be understood, terms such as "portable" or "mobile" may be used herein throughout to indicate that device 110, 600 may generally be transported between different physical locations by a user without resort to physical aids. In particular, mobile device 110, 600 may include devices that may be carried on a user's person or clothing, such as cellular or other radio telephones, personal data assistants (PDA), tablets, notepads, portable computers, smart watches or jewellery, and the like. However, various aspects and embodiments of the invention may be implemented using non-mobile communication devices such as laptop or personal computers.

Accordingly, in some embodiments, a mobile or other device 110, 600 may include one or more CPUs 602, random access memory (RAM) 604, and other physical memory 606, either or both of which may store non-transient (i.e., persistent) data and machine interpretable instruction sets. In general, CPU(s) 602 can be any microprocessor or other general or special purpose processing unit(s) configured to control the overall operation of mobile device 110, 600 and its various components, with which CPU 602 may be connected by a bus or other electronic link(s) or path(s) adapted for transferring data, power, and/or other signals on mobile device 110, 600. Read and write operations of CPU 602 may be facilitated by RAM 604 or some other integrated circuit or volatile memory storage associated with or integrated within CPU 602 or to which CPU 602 has access.

Memory(ies) 606 may include one or more persistent (i.e., non-transitory) memory stores, such as flash memory or read-only memory (ROM), which are either physically embedded within mobile device 110, 600 or which may alternatively be removably loaded or inserted into mobile device 110, 600 by a user, such as on a subscriber identity module (SIM) card or secure digital (SD) memory card. Memory 606 may be used to store any type of data and/or executable machine instruction files, such as but not limited to media files (music and photos), as well as software used to implement a mobile device operating system (OS) 608 and other programs or applications, as described herein. Memory(ies) 606 may also be used to store one or more files used by CPU 602 or mobile OS 608 to execute different functions or control different components on mobile device 110, 600, such as contact information, network preferences, application data, and other files.

In various embodiments, a mobile device 110, 600 may also be equipped with one or more components for a user to interact with mobile device 110, 600. Such components, which are generally denoted herein as 610, may provide both for the user to input data or commands into mobile device 110, 600, as well as to perceive data or information outputted by mobile device 110, 600. Without limitation, different possible input components 610 may include touch pads, dials, click wheels, touchscreens, keyboards, and other buttons, as well as cameras, microphones, and biometric sensors (e.g., fingerprint scanners). Example output components 610 may include speakers, screens and visual displays, rumble packs, and combinations thereof. Other I/O components 610 not specifically mentioned herein may also be included in different embodiments.

In some embodiments, as seen in FIG. 6, mobile device 110, 600 further includes one or more long-range network communications components 612 and/or one or more short-range network communications components 614 that provide mobile device 110, 600 with various different voice and data communication functions. As will be appreciated, the terms "long-range" and "short-range" may be used herein to denote relative distances and are not intended to denote any specific limitations or ranges. Thus, long-range communications components 612 and short-range communications components 614 allow mobile device 110, 600 to communicate with other proximately or remotely located targets, which can be other similarly or differently configured mobile devices, servers, systems, and other network-enabled devices.

For example, long-range communications component(s) 612 may be used by a mobile device 110, 600 to communicate with a suitable target over cellular or other distributed network using a suitable voice and/or data communications protocols, such as but not limited to Time Division Multiple Access (TDMA), Code Division Multiple Access (CDMA), Global System for Mobile Communication (GSM), Wireless Application Protocol (WAP), and others. Following such protocols, a mobile device 110, 600 may be able to send communications to arbitrarily remote devices of various types, including voice, data, and text-based messages without limitation. To enable long-range communications, various hardware and/or software components may be included in component 612, such as an antenna, transmitter, receiver, and digital signal processor. The specific configuration of long-range communications 612 may depend generally upon the communication protocol(s) that are implemented.

Short-range communications component(s) 614 may enable communication between mobile device 110, 600 and other relatively proximately located devices, servers, or systems. For example, short-range communications 614 may include one or more short-range transceivers, such as for connection to Wi-Fi (802.11 standard) or Bluetooth networks, as well as other modes of short-range communication, like RFID, infrared or optical. In some embodiments, short-range communications 614 may in particular include a near field communications (NFC) subsystem 616 that may be utilized to communicate with an NFC reader, among various different purposes or functions, so as to initiate contactless mobile payments with a merchant POS terminal as described further below.

In some embodiments, mobile device 110, 600 may further include one or more secure elements 618 configured as a tamper-resistant, limited-access storage environment for sensitive data and other information, such as payment credentials or cryptographic data and programming structures, as will be described further below. For example, secure element(s) 618 may include any or all of an integrated circuit (IC), an operating system (OS), and application(s) or program(s), including virtual wallet application(s) 112, 622, merchant application(s) 114, card emulation applications 628 and the like. Secure element(s) 618 may be either embedded (integrated) physically within mobile device 110, 600 or, alternatively, provided on a card such as a SIM or SD card that is insertable into mobile device 110, 600. As shown, both CPU 602 and NFC subsystem 616 may in some cases have access to the contents of secure element 616. Alternatively, access may be limited to only one or the other of CPU 602 and NFC subsystem 616 depending on the application or configuration of mobile device 110, 600.

Mobile device 110, 600 may further include one or more power supply(ies) 620 configured with any components or circuitry that are suitable for generating, receiving or transmitting power to CPU 602 and other components of mobile device 110, 600. For example, a power supply 620 may include circuitry for processing power received from an external power source, such as an electrical utility or grid, when mobile device 110, 600 is plugged into or otherwise connected to such external power source. In some cases, power supply 620 may further include one or more batteries, such as nickel metal hydride, nickel cadmium, and lithium-ion batteries, which may provide a source of power when mobile device 110, 600 is not able to connect to an external power source. Other power generating or processing circuitry, such as solar panels or inductive coils, may also be included so that power supply 620 may deliver energy to different components within mobile device 110, 600. It should be noted that individual connections between power supply 620 and other components within mobile device 110, 600 are not shown in FIG. 6 and instead power supply 620 is indicated for convenience only as an isolated element.

As previously mentioned, in many embodiments request communication device(s) 110, 110' are not "mobile" device(s). Thus, for example, a user device 110, 110' may have a size, shape and/or weight that make it difficult, inconvenient, or not practical for user to transport over more than trivial distances without some physical assistance or assistance. In particular, a non-mobile user device 110, 110' may be one that a user cannot practically carry on their person or clothing. Examples of a non-mobile device 110, 110' include a user's desktop computer and other computing devices.

A non-mobile device 110, 110' according to the described embodiments may or may not differ, in terms of communications ability, secure memory, etc., from mobile device 600 shown in FIG. 6. For example, a non-mobile device 110, 110' may (or may not) lack one or more of the components shown in FIG. 6 or, in some cases, may include additional or differently configured components. In some cases, a non-mobile device 110, 110' may lack a secure element 618 because such device 110, 110' is not configured to receive a SIM or SD card. In some cases, at least one of long-range communications 612 and short-range communications 614 may differ. For example, instead of long-range communications 612 that is configured for wireless communication over distance, a user device 110, 110' may include a modem or other network component for connecting to a distributed network, such as the Internet, in place of a cellular antenna. In some cases, short-range communications 614 may not include an NFC receiver 616, but may include WI-FI and/or Bluetooth antennae or others. Embodiments of the systems and processes described herein may utilize either a mobile device 600 or a non-mobile device without limitation.

Figure 7:
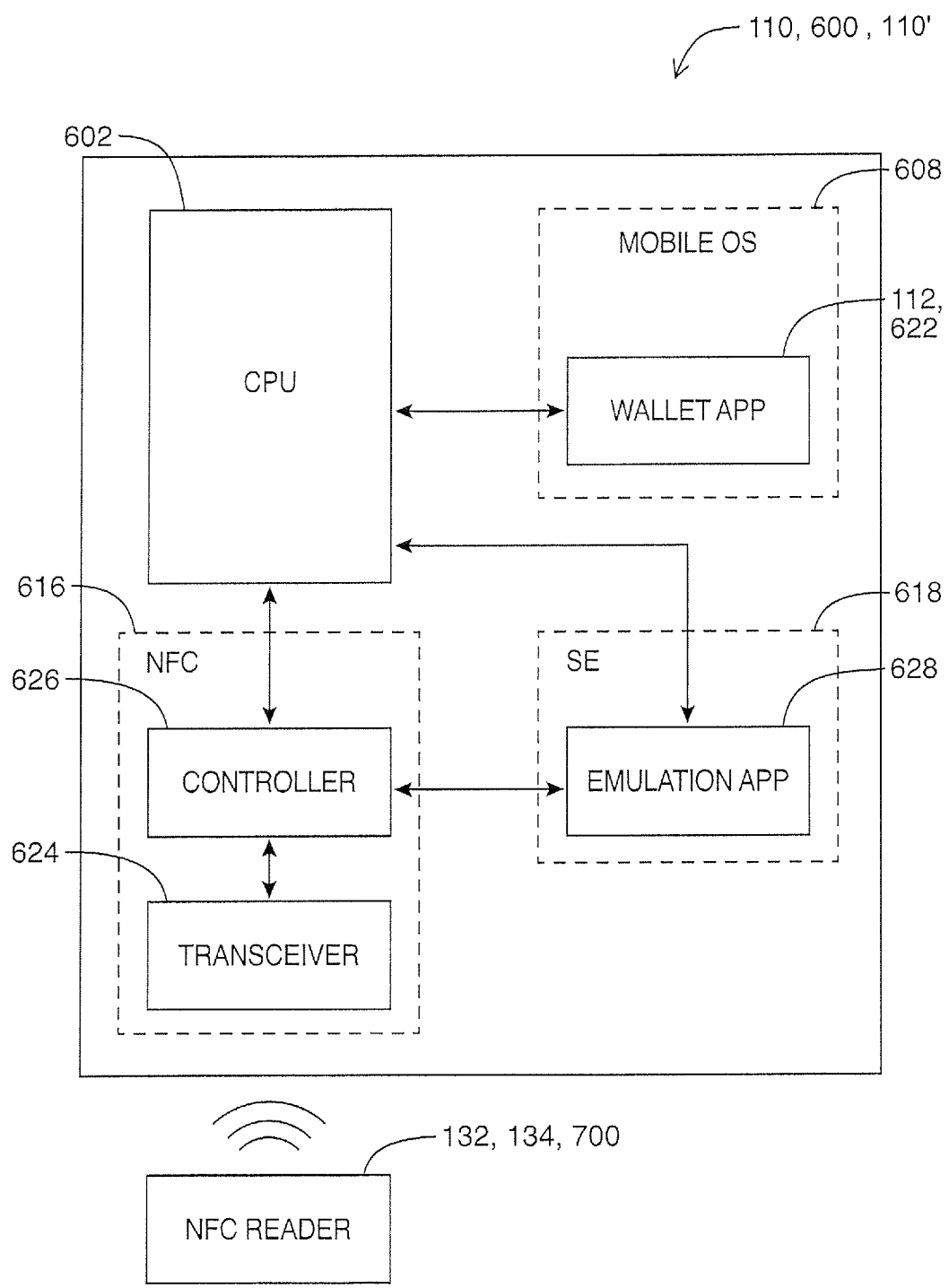
FIG. 7 shows a different schematic representation of a mobile device such as that shown in FIG. 6.

Referring now to FIG. 7, mobile device 110, 600 may according to various embodiments be utilized to initiate contactless signal exchanges representing proximity-based payment transactions to a merchant POS terminal, in some cases in conjunction with a trusted platform 120, as described herein. Such contactless payments may utilize payment credentials stored within a secure element 618 or, alternatively, using payment tokens stored within a wallet application 112, 622 configured as an HCE environment. In further embodiments, payment tokens may be stored in a secure cloud that is accessible by a mobile device 110, 600.

Accordingly, in some embodiments, an NFC subsystem 616 may include any suitable proximity-based communication component(s) or combination of components that enables contactless proximity-based communication with a corresponding NFC reader 132, 134, 700 or other similarly enabled target device. For example, NFC subsystem 616 may include an antenna or transceiver 624 and a controller 626 that are configured to operate on the globally available, unlicensed radio frequency ISM band of 13.56 MHz (as specified in a relevant standard such as ISO/IEC 14443 and ISO/IEC 18092). In some cases, NFC subsystem 616 may alternatively operate according to other communication technologies or standards.

Prior to initiation of a contactless payment, a user may provision mobile device 110, 600 with one or more payment credentials or sets of payment credentials, which may be stored in a secure element 618 and/or elsewhere in mobile device 110, 600. For example, in some cases, a user may directly enter payment credentials into a wallet application 112, 622 for storage in secure element 618. When stored in secure element 618, it may be possible for such payment credentials to be entered and stored directly without tokenization.

Alternatively, mobile device 110, 600 may be provisioned by an issuing bank or other entity, such as a trusted platform, with tokenized payment credentials corresponding to an authorized method of payment. For example, a wallet application 112, 622 or some other program or application, including those not located on mobile device 110, 600 may be used to request payment tokens from the user's issuing bank or some other entity. Such payment tokens, which may be multi or single-use or subject to other restrictions or limitations on use, once received at mobile device 110, 600 may be stored within wallet application 112, 622 or somewhere else on mobile device 110, 600. In some cases, payment tokens may be stored in a secure element 616 and accessible to a wallet application through CPU 602.

To initiate a contactless payment, mobile device 110, 110', 600 may be brought within range of an NFC reader 132, 134, 700 that is acting as or forms part of a merchant POS terminal or system 130. When within range, NFC reader 132, 134, 200 may transmit a signal to mobile device 110, 600, which is received in NFC transceiver 624, requesting initiation of a transaction and supply of payment credentials. Depending on the configuration and type of protocol being implemented on mobile device 110, 600, NFC controller 626 may respond and process the contactless transaction in different ways.

For example, in some embodiments, mobile device 110, 110' 600 may be configured to act in a card emulation (CE) mode whereby mobile device 110, 600 emulates a contactless payment card through storage of payment credentials within a secure element 617. In this mode of processing, NFC controller 626 may route the transaction request received by NFC transceiver 624 to secure element 618 in which the user's payment credentials can be stored in an emulation application 628. Retrieved payment credentials may then be routed by NFC controller 626 back to NFC transceiver 624 for transmission to NFC reader 132, 134, 700. The transaction may then be processed through a backend or payment network associated with the merchant POS terminal.

Alternatively, mobile device 110, 600 may be configured for HCE through the provision of payment tokens, as described herein, which may be stored within wallet application 112, 622 instead of a secure element 618. Thus, in this mode of processing, NFC controller 626 may route the transaction request received by NFC transceiver 624 to CPU 602 and not secure element 618 so as to retrieve payment credentials from within wallet application 112, 622. Retrieved payment credentials may then be returned by CPU 602 to NFC controller 626 and routed back to NFC transceiver 624 for transmission to NFC reader 132, 134, 700. The transaction may again be processed through a backend or payment network associated with the merchant POS terminal.

Figure 8:
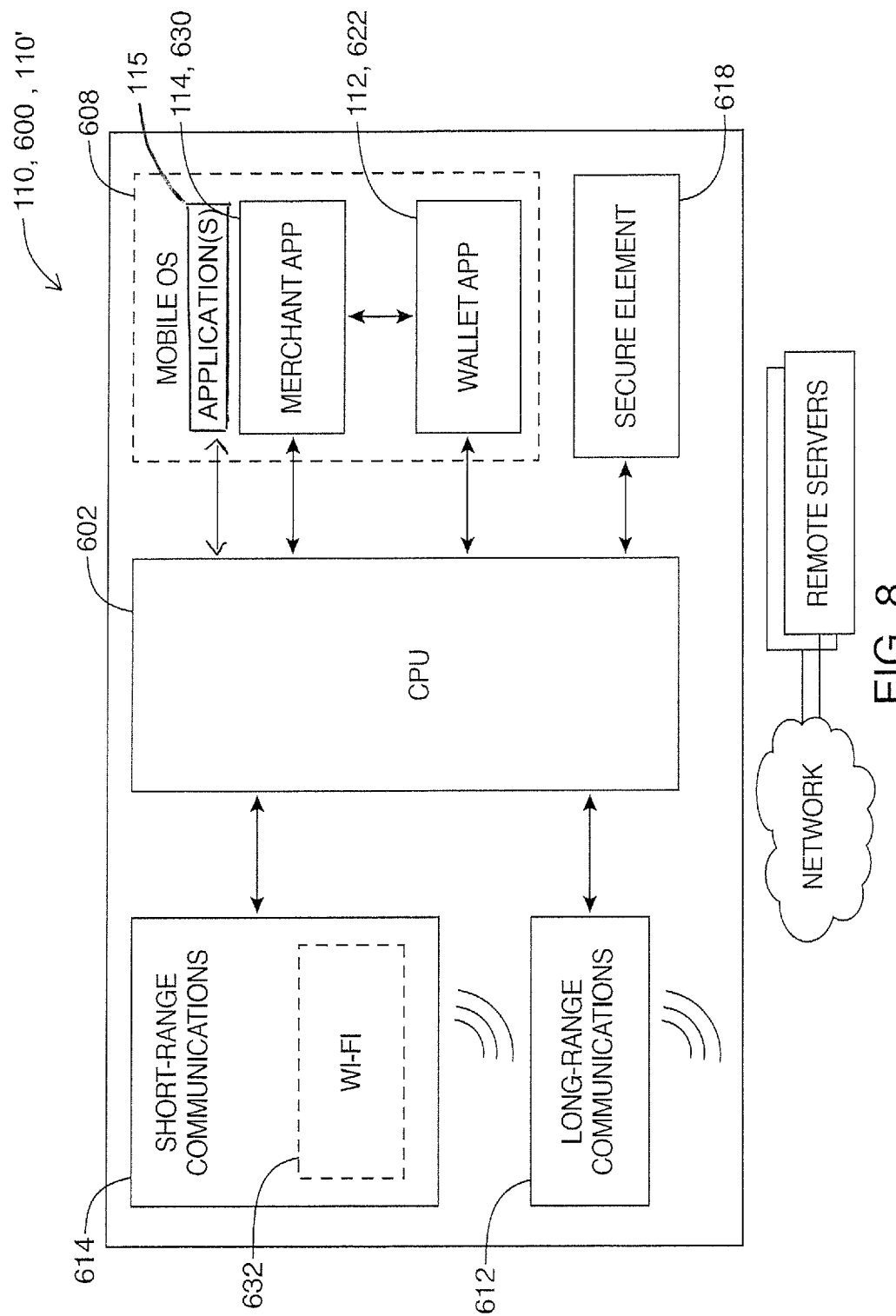
FIG. 8 shows a different schematic representation of a mobile device such as that shown in FIG. 6.

Referring now to FIG. 8, a mobile or other device 110, 110' 600 may in accordance with embodiments of the invention also be configured to initiate mobile payments directly from within an application or program associated with a merchant or, as described further below, from some other non-dedicated application(s) or program(s), such as one or more web browsers or merchant applications 114. Thus, unlike contactless payments that are completed using NFC communications between mobile device 110, 600 and a merchant POS terminal, such electronic payments do not require physical proximity to a merchant POS terminal and may be initiated from within a merchant application anywhere that a mobile, desktop, or other device 110, 600 has network connectivity.

Accordingly, one or more different merchant applications 114, 630 or other programs may be installed by a user of a device 110, 110', 600 into mobile or other OS 608. Only one such merchant application 114, 630 is shown in FIG. 8 for convenience, but any number may be installed in different embodiments according to the user's preferences. Among other possible functions, merchant application 114, 630 may allow for the user to purchase a product or service that the merchant displays or advertises to the user from within merchant application 114, 630. Different possible merchant applications 114, 630 can include those which are dedicated to a merchant's goods and/or services, as well as third party applications, such as auction sites, which offer a merchant's goods and/or services indirectly to customers.

In some embodiments, as described further below, merchant application 114, 630 may be configured so that payment credentials or other information stored within one or more wallet applications 112, 622 may be pulled by merchant application 114, 630 without having to open or launch any corresponding wallet application 112, 622. For example, when a payment transaction is initiated within a merchant application 114, 630, a user may be presented with a screen or prompt providing the user with a choice which payment credential stored in any of one or more wallet applications 112, 622 to pull for use in executing the transaction. Alternatively, merchant application 114, 630 may automatically pull a default or pre-selected payment credential from wallet application 112, 622 without prompting the user.

Such polling of devices and pulling of HCE and other payment credentials can be of significant advantage. For example, such processes can greatly increase the number of payment options open to purchasers and other uses 190 at the time of completing transactions, and therefore increase transaction opportunities for merchants and FIs/FSPs. In order to facilitate polling of devices 110, and optionally FIs/FSPs 120, 160, and pulling of payment credentials, some or all of merchant application(s) 114, 130, 630, wallet application(s) 112, 622, and FI/FSP systems 120, 150, 160 may be configured to process payment and transaction data according to common standards, including for example common communications and data record generation and processing protocols. Such protocols can, for example, be used to facilitate implementation of inter-application data exchange through the use of common or universal APIs 116 in accordance with the invention, as shown for example in FIG. 12 and discussed further below. The use of such universal APIs can be a significant advantage: by working, for example, in accordance with common or universal token and/or HCE credential protocol(s), universal APIs 116 can offer purchasers such as users 190 a wide range of payment options at the time of executing transactions. Thus, such APIs 116 can in many cases be referred to as payment options APIs. Suitable implementations of such aspects and embodiments of the invention are discussed further below.

Prior to or during initiation of a transaction, merchant application 114, 630 and/or one or more wallet applications 112, 622 may communicate with one or more remote servers 800, such as one or more servers 800 associated with a central certification authority or trusted platform, over a network 850 (via either or both of communications components 632, 612), such as a cellular network or the Internet, or combinations of different network types. For example, merchant application 114, 630 may be configured to pull information or data from a merchant server related to the goods and/or services that are being offered for sale, such as price and availability. Additionally, as explained further below, merchant application 114, 630 as well as wallet application 112, 622 may also be in communication with remote server(s) 800 in order to obtain authorization, such as in the form of a certificate or other cryptographic data, for a pending or future transaction initiated by the user on mobile device 110, 600.

Thus, in some embodiments, mobile OS 608 may be coupled to one or both of long-range communications 612 and short-range communications 614 so as to provide wallet application(s) 112, 622 and/or merchant application(s) 114, 630 or other application(s) 115 with network connectivity. Long-range communications 612 may provide connectivity to a cellular data network such as through implementation of a WAP communication protocol. Alternatively, network connectivity may be provided through a WI-FI antenna 632 by which mobile device 110, 600 is able to connect to wireless networks and hotspots. Other communication protocols, such as Bluetooth, may also be used by wallet application 112, 622 and merchant application 114, 630 to provide connectivity to network 350.

As further shown for example in FIG. 8, in some embodiments, mobile OS 608 may further incorporate or otherwise support one or more non-merchant applications or programs 115, such as games, general purpose web browsers, readers, and the like from which it may be possible to initiate electronic transactions. Such non-merchant applications may be coupled to one or more mobile wallet applications 112, 622 in order to retrieve payment tokens or other credentials that may be stored therein and, via CPU 602, to a network communication component such as short-range communications 614 or long-range communication 612 or to any other network component, such as a modem installed in a non-mobile user device 110, 110'.

To initiate an electronic transaction, a user may navigate to a web page or website using, e.g., any available I/O devices as described herein. After the user 190 has generated a suitably-configured transaction request data set (or 'requested transaction data set'), comprising for example data representing one or more items the user wishes to purchase, and perhaps a full or partial description thereof, along with item, subtotal, and/or total purchase prices, by for example selecting the items for addition to the merchant application's virtual shopping cart, and has initiated a payment (e.g., 'checkout') process, merchant application 115 may display an option to the user to pay for the transaction using a wallet application 112, 612 installed in mobile OS 608. Alternatively, the payment tokens selected for use in the transaction may be located in or other memory or locations on mobile device 110, 110', 600 or, in some cases, in virtual wallet(s) 112 or other memory(ies) or application(s) in a secure cloud resource. When the user selects to pay by wallet application 112, 612, the browser may interface with such application 112, 612 so as to obtain a suitable payment token depending on the selected form of payment. The obtained payment token may be transmitted over short-range communications 614 or long-range communication 612 for processing by a merchant backend. Alternatively, a user may securely log in to a bank account from within an application or program on user device 110, 110' using some form of identification information and, once authenticated, the user's bank may transmit electronic payment tokens to the merchant/acquirer for processing of the transaction. Processing of the electronic payment through a payment network or other entities may then proceed as described herein.

Thus, for example, in various aspects and embodiments the invention provides systems, processes, and persistently stored, machine-accessible and machine-readable programming structures that enable one or more request devices 110, such as smart phones, tablet computers, wearable devices, or other mobile devices, to be registered with a trusted platform server 120 by means of suitably-configured signal exchanges over a communications network 200, and, as a result of such registration, to be provided with a secure data set, such as a certificate or token data set, to be stored in volatile or non-volatile memory of the device 110 and thereby cause the device 110 to be authorized by the trusted platform server 120, in processing later purchases or transactions, as a trusted device 110'. For example, a certificate data set can comprise any data associated uniquely with any one or more of the device 110' and/or a specific payment account associated with such device. Such certification/identification data can include, for example, names, 'secret' personal information, serial numbers, random or pseudo-random codes, account numbers, etc.

In various aspects and embodiments the invention further provides systems, processes, and persistently stored, machine-accessible and machine-readable programming structures that enable one or more merchant devices 132, 134, 136, 130, including for example POS and back-end processing systems, to be registered with the same and/or other trusted platform server(s) 120 by means of suitably-configured signal exchanges over a communications network 200, and, as a result of such registration, to be provided with secure data set(s), such as certificate or token data set(s), to be stored in volatile or non-volatile memory of the device(s) 132, 134, 136, 130 thereby cause the merchant devices to be recognized by the trusted platform server 120, in processing later purchases or transactions, as trusted device(s) 130'. For example, such certificate data sets can comprise any data associated uniquely with any one or more of the device(s) 132, 134, 136, 130 and/or a specific payment account(s) associated with such device(s). Such certification/identification data can include, for example, names, 'secret' personal information, serial numbers, random or pseudo-random codes, account numbers, etc.

Copies of such certificate data sets may be provided to the device(s) 132, 134, 136, 130 and stored in secure memory associated with the trusted platform 120, in association with further identifiers associated with the device(s) 132, 134,

136, 130, one or more merchants or other entities associated with the device(s) 132, 134, 136, 130, and/or one or more accounts associated with such entities. As will be understood by those skilled in the relevant arts, such data processing devices as spreadsheets, relational databases, look-up tables, and other tabulations may be used for such purpose.

Once received and stored in device 110, all such certificates or tokens are usable by the device(s) 110, merchant device(s) 132, 134, 136, 130, and trusted platform(s) 120 for rapidly and securely identifying the device(s) 110 as "trusted", for example for transmission to and interpretation by the trusted platform 120, of data sets configured for use in authorization and/or verification of data processes such as purchases or other financial transactions with third parties such as one or more merchant systems 130. For example, a payment token data set may be received by a trusted platform 110 from a trusted device 110', 130', the token comprising a certification data set which may be looked up in a database 125, along with associated user and/or account information, for use in processing payments and other transactions.

In such aspects and embodiments the invention further provides use of a trusted device 110' to negotiate and complete one or more cin-app' payments or other data processing transactions through a direct Internet connection such as a merchant, game, or other application ('app') provided by a merchant/provider 130 or some other entity, including general purpose web browsers and the like, using suitably configured hypertext links, provided to a user display screen or other I/O component 610 (see, e.g., FIG. 6) of the trusted device 110', and transfer of touchscreen, keyboard/keypad and/or other user-generated inputs, signal transmitters and receivers, etc.

Thus, for example, in various aspects and embodiments the invention provides systems, processes, and persistently stored, machine-accessible and machine-readable programming structures represent machine-executable instructions that enable a trusted platform 120 to register one or more trusted request or user devices 110' and one or more trusted merchant systems 130', and thereby process purchases and/or other transactions through direct communications with (a) the request devices 110' and (b) the merchant system(s) 130', without need for communication between the trusted device(s) 110' and merchant system(s) 130' of sensitive account information, such as accounts to be used as the source of payment funds, purchaser identities, etc. In such embodiments payments associated with the transaction may be processed by the trusted platform in such manner that the transaction is conditionally or finally closed. For example, where both a transaction system 120 and a trusted request device 110' are associated with accounts administered by the trusted platform 120, the transaction may be closed immediately and finally. Where either or both of trusted devices 110', 130' are not associated with such accounts, the trusted platform 120 may work offline to complete final confirmation and clearance of the transactions, either by offsetting a day's or other accumulation of such transactions against one another, and settling balances with fourth-party platforms 160, or by simply working with one or more fourth-party platforms 160 to balance payments at end of day or other accounting period.

As further examples, in various aspects and embodiments, systems, processes, and persistently stored, machine-accessible and machine-readable programming structures in accordance with the disclosure can enable one or more trusted request or user devices 110' and merchant devices 132, 134, 136, 130, 130' to negotiate a transaction and build a transaction execution data set comprising the data representing the merchant's digital certificate, and optionally further data identifying a transaction, including for example a digital certificate or other identifier associated with a purchaser, one or more account(s) to be applied toward satisfaction of the transaction(s), and/or purchase or other amount(s) associated with the transaction(s). Such transaction data sets can be routed to a trusted platform 120 either directly, using 'off the conventional rails' routing, or through a more conventional payment system via one or more fourth-party transaction processor(s) 150, such as other banks, credit card processors, etc.

In examples in which such transaction data set(s) are routed to a trusted platform 120 authorized to settle or otherwise adjudicate a transaction, the trusted platform can settle with the merchant system 130, 130' by routing back to the merchant system 130 payment adequate to complete the transaction, using funds associated directly with the trusted platform itself (e.g., a bank's own accounts), rather than from account(s) controlled by the purchaser, leaving final settlement between the trusted platform 120 and account(s) designated by application(s) associated with the trusted device 110' for a later time, such as end of the day or other transaction period. As will be appreciated by those skilled in the relevant arts, such later transactions to settle accounts between the trusted platform 120 and accounts associated with the trusted device 110' can be settled using transaction data sets adapted for internal communications among the trusted platform's own network, according to suitable encryption and other security means, which may be different from, faster, and/or more efficient than security means suitable for use across public networks.

Moreover, such transactions may be completed, whether routed directly between trusted devices 110', trusted merchants 130', and trusted platforms 120, or via public or other existing or less-trusted payment networks, according to any desired payment protocol(s), such as VISA, MasterCard, etc. As a particular example, a payment transaction routed through a more conventional (less trusted) payment network may be formatted as an interac payment, and processed according to interac protocols.

In examples in which transactions are initially settled between a merchant system 130, 130' and a trusted platform 120, and settled later between the trusted platform 120 and accounts designated by applications associated with an authorized trusted device 110', user(s) associated with the trusted device 110' can be given an absolute, timed, or relative period in which to make a final designation of which account or accounts are to be used to settle the transaction. For example, such a user may be provided one or two hours, until a specified time of day, the end of a day or transaction reporting period, or the end of the month, etc., in which to make a final designation of payment account(s). Affording such users time in which to change or affirm which account(s) are to be used can provide time for user(s) to ensure that charges will clear designated accounts, decide whether to apply awards or loyalty points to a transaction, or otherwise determine the numbers of accounts to be used and the amount to be drawn from each. Such ability can provide considerable flexibility, convenience, and other advantages to users and trusted platforms alike.

Among the many advantages offered by trusted platforms, trusted devices, and other systems, devices, and processes in accordance with the invention is the ability they provide to adapt to developing technologies. For example, one or more trusted devices, including for example one or more mPOSs, may participate in, or otherwise be associated with, various forms of public ledgers, such as blockchains. For example, in some embodiments one or more mPOSs or other trusted devices 110' may be established as a node in a blockchain ledger system. In such an implementation, each trusted device 110', including any trusted mPOSs 134, may route transaction data sets securely from merchant system(s) 130 to FSP systems 160, 120 while complying with applicable blockchain/public ledger protocols.

As will be appreciated by those skilled in the relevant arts, a block chain is a distributed and generally encrypted or otherwise secure data store that acts as a virtual public ledger of transactions, and is particularly useful in implementing cryptocurrencies such as bitcoin. In such ledger schemes a plurality of devices are implemented as node, each node controlling or otherwise having access to a distinct, complete or partial stored copy of the ledger; the ledger comprises data sets representing legal or otherwise recognized tender for transactions. As a transaction progresses, each involved network node can validate the transaction, or a portion of it, and generate data representing suitable ledger annotations, enter the annotations in the node's portion or copy of the ledger, and push or make available updated ledger annotations to other nodes.

Processing of Payments

Figure 9:
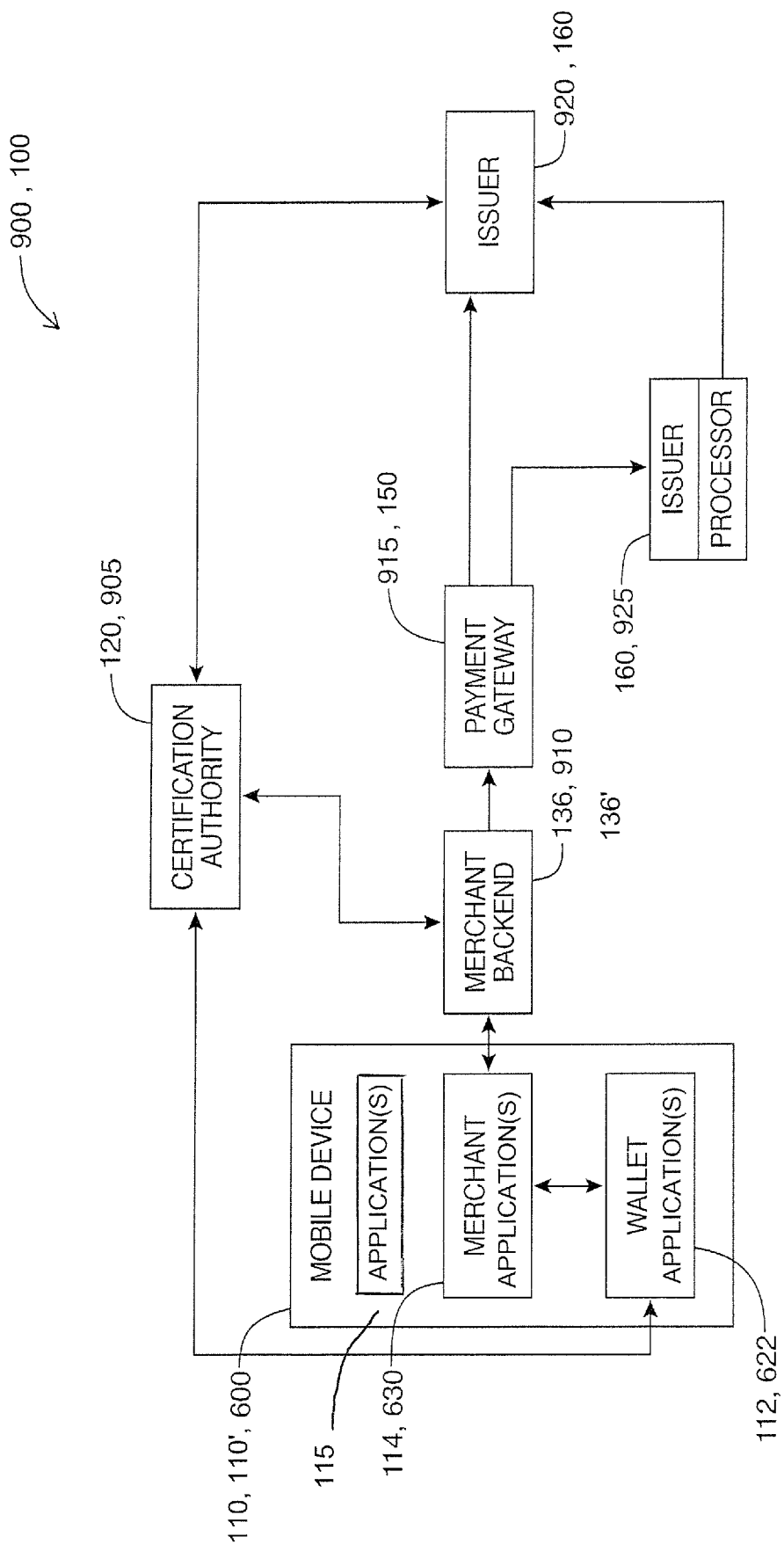
FIG. 9 shows a schematic representation of an example system for processing mobile payments in accordance with various aspects and embodiments of the invention.

Referring now to FIG. 9, there is shown an example system 100, 900 for processing mobile or other payments in accordance with embodiments of the invention. System 900 may include at least a user device 110, 600, such as is shown in FIGS. 6-8, a trusted platform or certification authority 120, 905, a merchant backend 136, 910, and a payment gateway 915, in various different embodiments. As described herein, system 900 may provide a networked environment in which a trusted or not-trusted device 110, 110', 600 may be used to initiate CNP transactions with one or more trusted or not-trusted merchant systems 130, 130' in connection with goods and/or services. Such CNP transactions may be available to the user of device 110, 110,' 600 as an alternative, or in addition to, contactless transactions initiated by a merchant POS terminal (such as NFC reader 132, 134, 700 in FIG. 7). While reference may be made predominantly to a mobile device 110, 110' 600, it is to be understood that in alternative embodiments, a non-mobile device 110, 110', 600 may also be used in all transactions and other processes, as described herein, unless clearly inconsistent in the circumstances.

Accordingly, in some embodiments, one or more virtual wallet applications 112, 622 may be installed on mobile or other device 110, 110', 600 and provisioned with data representing at least one payment credential. As described herein, such payment credential(s) may be issued by different entities, including banks, credit card companies, and other FIs or FSPs, and may generally include HCE tokens of different kinds, such as single-use or multiple-use tokens. Virtual wallet application(s) 112, 622 may be provisioned with HCE token(s) for only a single authorized method of payment or, alternatively, multiple authorized payment methods depending on user preference or other factors. In some cases, HCE token(s) may be provisioned into other memory or storage components on a user device 110, 10', 600. In some cases, payment tokens may be stored instead in a secure cloud that is accessible by a device 110, 110', 600.

Additionally, one or more merchant applications 114, 630 or other games, general purpose browsers, etc. 115, may be installed on mobile or other device 110, 600. The type and functionality of such merchant application(s) 114, 630 may vary, but generally may include at least the ability for a user of mobile device 110, 600 to initiate a transaction for the purchase of some good and/or service offered for sale through merchant application 114, 630. While FIG. 9 only depicts a single merchant application 114, 630 on mobile device 110, 600, the quantity and type is generally not limited and may vary in different embodiments.

In some embodiments, a merchant application 114, 630 may be registered with a certification authority 120, 905 or trusted platform so that, for example, the merchant associated with the merchant application 114, 630 will itself be authenticated and/or authorized to complete CNP transactions with the user's payment credentials stored in wallet application 114, 630 or elsewhere. For example, such a merchant may communicate ahead of time with certification authority 120, 905 through a merchant backend 136, 910 to request that certification authority 120, 905 issue the merchant a certificate that may be used later to via any or all of merchant devices 132, 134, 136, 130, 130' to authenticate transactions on device(s) 110, 110', 600. Such a certificate may, for example, be represented by any type of secure data set suitable for the purposes disclosed herein, including for example a code or token uniquely identifying or otherwise representing the certification status. Once issued, such a merchant certificate may be stored in merchant backend 136, 910 or some other networked resource that is accessible by merchant application 114, 630.

Certification authority 120, 905 may in some cases be only one of multiple certification entities by which a merchant system 130' is certified, each such certification authority 120, 905 associated specifically with one or more different merchant applications 114, 630, or variations and/or groupings thereof. Alternatively, in some cases, a certification authority 120, 905 may be a single, central registration or certification authority that is common to all merchant applications 114, 630 within a system 100, 900 so that, among other advantages, certificates issued to merchant application(s) 114, 630 may follow a common or standard format or protocol, which may facilitates execution and processing of electronic payments across a variety of industries, platforms, etc. For example, a central certification authority 120, 905 common to all merchant applications 114, 630 may be established or operated by one or more FIs or FSPs, such as banks, acting in cooperation or association and having agreed upon standard practices and formats for processing mobile and/or other transactions. However, a central certification authority 120, 905 may also be established and operated by independent third-party entities as well.

In some cases, a user device 110, 600 and/or wallet application 112, 622 on a device 110, 600 may also be registered with the same or another certification authority 120, 905. Thus, wallet application 112, 622 and/or device 110, 600 may become a trusted device 110'. For example, wallet application 112, 622 may be configured for communication with certification authority 120, 905 to request a certificate or other cryptographic credentials that are specific to user device 110, 600 as opposed to merchant application 114, 630. When the user does later initiate a mobile or e-commerce transaction within merchant application 114, 630, such device-specific certificate may be used in addition to any other certificate or cryptographic process to authenticate the source of the transaction. Registration of any or all of users, devices 110, 600, and/or wallet applications 112, 622, as well as merchant systems or applications 114, 630 with a single central certification authority 120, 905 can provide a number of advantages in security and efficiency of transaction processing: such arrangements can significantly reduce the number of network communications required between authorities 120, 905, merchant systems 136, 910, issuers 920, and acquirers 925, and thereby reduce or eliminate communications risks and delays.

To initiate a transaction, a user may execute a merchant application 114, 630 on a device 110, 600 and select an item (good or service) to be purchased. For example, upon accessing a merchant application 114, 630, the user can use any suitably-configured keyboards, keypads, pointers, touch screen devices, and/or other input/output device(s) 610 in conjunction with suitably-configured user interface display screens to designate such goods or services. As part of a checkout sequence, merchant application 114, 630 may then transmit (directly of via any other suitable components, such as mPOS or POS device(s) 132, 134) a request to merchant backend 136, 910 for provision of the certificate issued to the merchant by certification authority 120, 905. After the request has been fulfilled, merchant application 114, 630 may then use the received merchant's certificate to query wallet application 114, 630 for permission to access payment credentials, such as HCE tokens. In some cases, merchant application 114, 630 may query wallet application 112, 622 automatically following receipt of the merchant's certificate from merchant backend 136, 910. Alternatively, merchant application 114, 630 may display a prompt to the user asking for express authorization to query wallet application 112, 622.

Alternatively, a user may initiate a transaction from within any other application or program 115, other than a merchant application 114, 630, which is installed on a device 110, 110', 600 by selecting an item (good or service) to be purchased. As part of a checkout sequence, for example, a user can use any suitably-configured I/O devices 610, in conjunction with suitably-configured user interface I/O display screens, to select a wallet application 114, 630 for payment. This selection may be in response to presentation of multiple different payment options, including those which do not use a wallet application 114, 630.

Wallet application 112, 622 may be configured, upon receipt of the query from merchant application 114, 630, or some other application or program 114, 115, to verify the source of or otherwise authenticate a merchant's certificate included in the query. For example, wallet application 112, 622 may be provisioned with a private key and/or other cryptographic data that may be used to ensure that the merchant's certificate is valid. If a wallet application 112, 622 is not able to verify the merchant's certificate, the query sent by merchant application 114, 630 can be denied; optionally the wallet application 112, 622 can generate a request targeted to either or both of the user of the device 110, 110', 600 and merchant 136, 136', 910 to retry or override the denial of authorization. If the wallet application is able to verify the certificate, the wallet application 112, 622 may respond with an indication or signal that merchant application 114, 630 is authorized to access payment credential(s) stored therein.

Upon a successful query of wallet application 112, 622, merchant application 114, 630 may pull a wallet interface authorization from wallet application 112, 622 that effectively gives merchant application 114, 630 access to and control over at least part of the payment credentials and other data stored in wallet application 112, 622. Thus, merchant application 114, 630 can be enabled to handle or manipulate the user's payment credentials in the same manner that would be possible from within wallet application 112, 622.

For example, depending on the number and/or type of HCE tokens or other payment credentials that have been provisioned, merchant application 114, 630 may either automatically select one payment credential for use in the initiated transaction or may instead prompt the user from within merchant application 114, 630 for selection of a payment method. Automatic selection may occur, for example, where HCE token(s) for only one payment type have been provisioned or where HCE token(s) for multiple different payment methods have been provisioned, but the user has specified in wallet application 112, 622 that one of the available payment methods is to be used as a default. If, on the other hand, no default has been specified, as noted, merchant application 114, 630 may prompt the user for selection of a payment method, using I/O components of the device 110, 110', 600 as previously mentioned.

Whether through prompting or automatic selection, merchant application 114, 630 may pull a payment credential from wallet application 112, 622 representing the payment method to be used in the transaction. Merchant application 114, 630 may then transmit signals representing the HCE token or other payment credential to merchant backend 136, 136', 910 along with other information (date, merchant identification, amount, etc.) needed or otherwise used to complete the transaction. In some cases, the payment information sent to the merchant backend 136, 136', 910 may be encrypted so that even the merchant may not be able to view any of the user's sensitive information. Encryption of payment information may be performed by merchant application 114, 630 or by some other application or program on device 110, 110', 600 in different embodiments. Merchant backend 136, 136', 910 may then forward the HCE token or payment credential received from mobile device 110, 110', 600 to payment gateway 150, 915 along with any other transaction information to be processed.

In some embodiments, a transaction may be initiated from device 110, 110', 600 even though there are no payment tokens stored thereon and instead stored in a secure cloud. For example, a user may be navigating an application or program, such as a general purpose web browser, and decide to initiate a payment or checkout sequence. In such case, the user may be presented with a secure login to the user's bank or trusted platform 120, 160, 905 and prompted to enter authenticating information, such as a password or biometric. If the user is able to successfully authenticate, then the bank or trusted platform 120, 160, 905 may cause a payment token to be transmitted to a merchant backend 136, 136', 910 for use in processing the transaction.

In some embodiments, rather than a merchant certificate being used to query a mobile or other wallet application 112, 622 to retrieve payment tokens, such merchant certificate may be used only to digitally sign payment token(s) that have been retrieved from a wallet application 112, 622 or some other memory on, or otherwise accessible by, a device 110, 110', 600 or from a secure cloud. Thus, in such cases, a user may be operating within a merchant application 114, 630 or some other application or program 115, such as a web browser, and may initiate an electronic transaction. In that case, the application or program currently being accessed by a user may directly access payment tokens(s) for transfer to a merchant backend 136, 136', 910 as part of a payment message. In some cases, as described herein, payment token(s) may also be provided to a merchant backend 136, 136', 910 directly from a bank or trusted platform 120, 905 following identity verification of a user or user's mobile device 110, 600.

Payment gateway 150, 915 may generally be or include any FSP or application service provider that authorizes credit card and other transactions on behalf of e-businesses, online retailers, or other traditional brick and mortar retailers. Thus, payment gateway 150, 915 may be some entity that processes all mobile and/or other transactions on behalf of a given merchant or group of merchants, including mobile transactions that are initiated from within merchant application 114, 630. Each merchant or merchant application 114, 630 may therefore be associated with one or more different payment gateways 150, 915, although only one of each are illustrated for convenience. In addition to facilitating the processing of mobile or other transactions, payment gateway 150, 915 may also perform services, such as encryption or further encryption of sensitive information, fraud detection, and others.

As shown in FIG. 9, system 100, 900 may in some embodiments be configured so that payment gateway 150, 915 may process mobile transactions differently, depending on the payment method selected for the transaction and, in some cases, depending on whether a trusted platform 120, 905 has authorized the transaction. For example, payment gateway 150, 915 may be configured to detect the selected payment method based on the HCE token or payment credential that has been received and then route the transaction accordingly to one or more further downstream entities. To ensure that HCE tokens or other payment credentials are identifiable, in some cases, the configuration of payment gateway 150, 915 and/or such HCE tokens or other payments may be undertaken jointly or in conjunction with a central certification authority 120, 905, which has been delegated authority to authenticate transactions. In this manner, payment gateway 150, 915 may thereby be capable of detecting a wide range of different tokens regardless of which user or merchant application 130 has initiated the transaction.

For example, in some cases, payment gateway 150, 915 may be configured to detect that the received HCE token represents or otherwise indicates an Interac™ (debit) transaction, in which case payment gateway 150, 915 may route the transaction directly to an issuer 160, 920 associated with the selected payment method, e.g., a bank controlling a demand or deposit account held by the user. Such issuer 160, 920 may then be able to settle the transaction by debiting the correct amount from the account specified in the token. Such transactions may in fact be Interac™ transactions or, as described further below, may be some other type of transaction that has been encoded to appear like an Interac™ transaction so that it will be processed directly by an issuer bank as opposed to some other intermediary or fourth party processor, such as an acquirer bank.

Payment gateway 150, 915 may also detect that the received HCE token represents a credit card transaction, in which case payment gateway 150, 915 may then query to determine how the transaction will be settled. Some issuers 160, 920 may consent to have transactions routed directly from payment gateway 150, 915 for settlement. Alternatively, some mobile or other transactions representing credit card payments may be routed first by payment gateway 150, 915 to an acquirer 150, 925 or the acquirer's processor and thereafter to issuer 920 for settlement.

Accordingly, in some embodiments, the payment token transmitted to merchant backend 136, 136', 910 may be signed using the merchant's certificate, which has been issued and provided to the merchant by certification authority 120, 905 or some other trusted platform. When the payment message is forwarded through the payment gateway 150, 915, in some cases it will be detected as an Interac™ transaction because it has been configured, either by the device 110, 110', 600 or the merchant backend 136, 136', 910, to take on this appearance. Thus, instead of being forwarded to an acquirer 150, 925 or their processor, which might otherwise have been the decision of payment gateway 150, 915, the payment message may instead be relayed directly to an issuer 160, 920. The payment message may then be verified and/or decrypted before payment to the merchant is processed. The issuer bank 160, 920 may in some cases arrange for payment directly from the method of payment indicated in the message. Optionally, however, in some cases, the issuer bank 160, 920 may pay the merchant from the bank's funds, and then settle with the user of the mobile device 110, 110', 600 by any of the means described herein.

In some embodiments, when a payment token transmitted to a merchant backend 136, 136', 910 is 'signed' or otherwise authenticated using the merchant's certificate, payment gateway 150, 915 may be by-passed altogether and instead merchant backend 136, 136', 910 may communicate directly with issuer 160, 920 to process transactions. In such cases, issuer 160, 920 may settlement with the merchant using a payment type and/or funds specified in the payment message. Alternatively, as described herein, issuer 160, 920 may in some cases settle first with the merchant 136, 136' using funds supplied by the issuer and thereafter with the user according to an agreed upon method of settlement.

Figure 10:
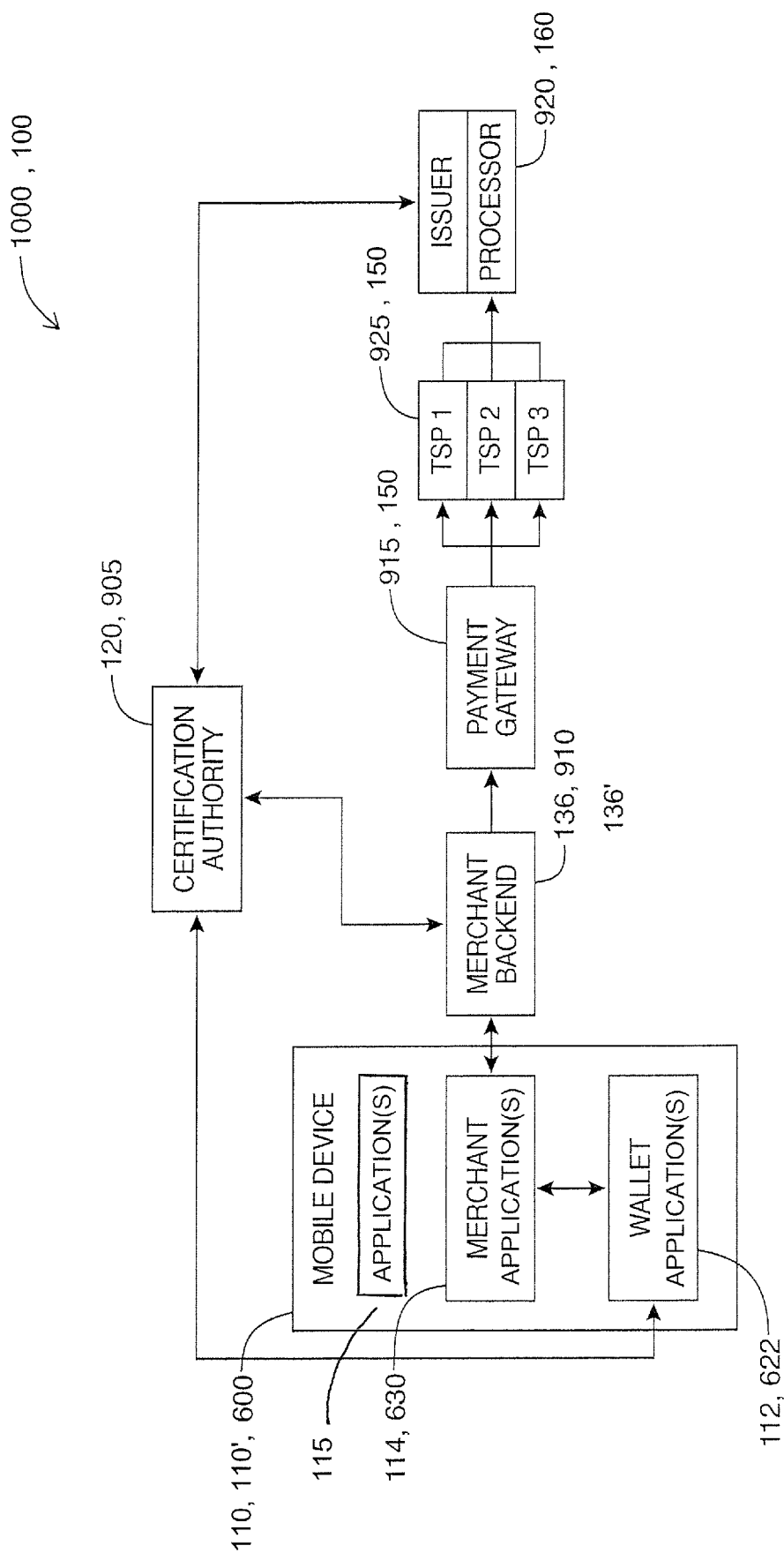
FIG. 10 shows a schematic representation of another example system for processing mobile payments in accordance with various aspects and embodiments of the invention.

Referring now to FIG. 10, there is shown an example system 100, 1000 for processing mobile payments in accordance with embodiments of the invention. Similar to system 900 shown in FIG. 9, system 1000 may in various different embodiments include at least a mobile device 110, 110', 600, certification authority 120, 905, and merchant backend 136, 136', 910 as described herein. For convenience and ease of illustration, therefore, description of these elements may be somewhat abbreviated, except for certain differences that may be specifically highlighted.

While in system 900 payment credentials may be standardized across different payment methods (debit, credit) and/or scheme, system 1000 may be configured to process mobile and other transactions in which payment tokens have not been standardized. Thus, for example, mobile transactions may still be initiated by, for example, merchant application 114, 630 pulling a wallet interface from wallet application 114, 630 for selection of a particular payment method, or a user initiating a transaction from within a web browser or other application on mobile device 110, 110', 600. However, tokens stored in wallet application 114, 630 or elsewhere in memory may have been provisioned by multiple different token service providers (TSP) as opposed to a single authority, such as a central certification authority 120, 905.

Accordingly, system 1000 may further include one or more token service providers 925, 160 interposed between payment gateway 915, 150 and issuer 160, 920. When transactions are received from merchant backend 136, 136', 910, payment gateway 150, 915 may determine which TSP 150, 925 issued the received token and then route the transaction accordingly. For example, each TSP 150, 925 may operate in accordance with a different credit card scheme (Visa™, Mastercard™), as well as other payment methods, such as Interac™ (debit) transactions. Such TSP(s) 150, 925 may then authenticate and route the transaction to issuer 920, 160.

Figure 11:
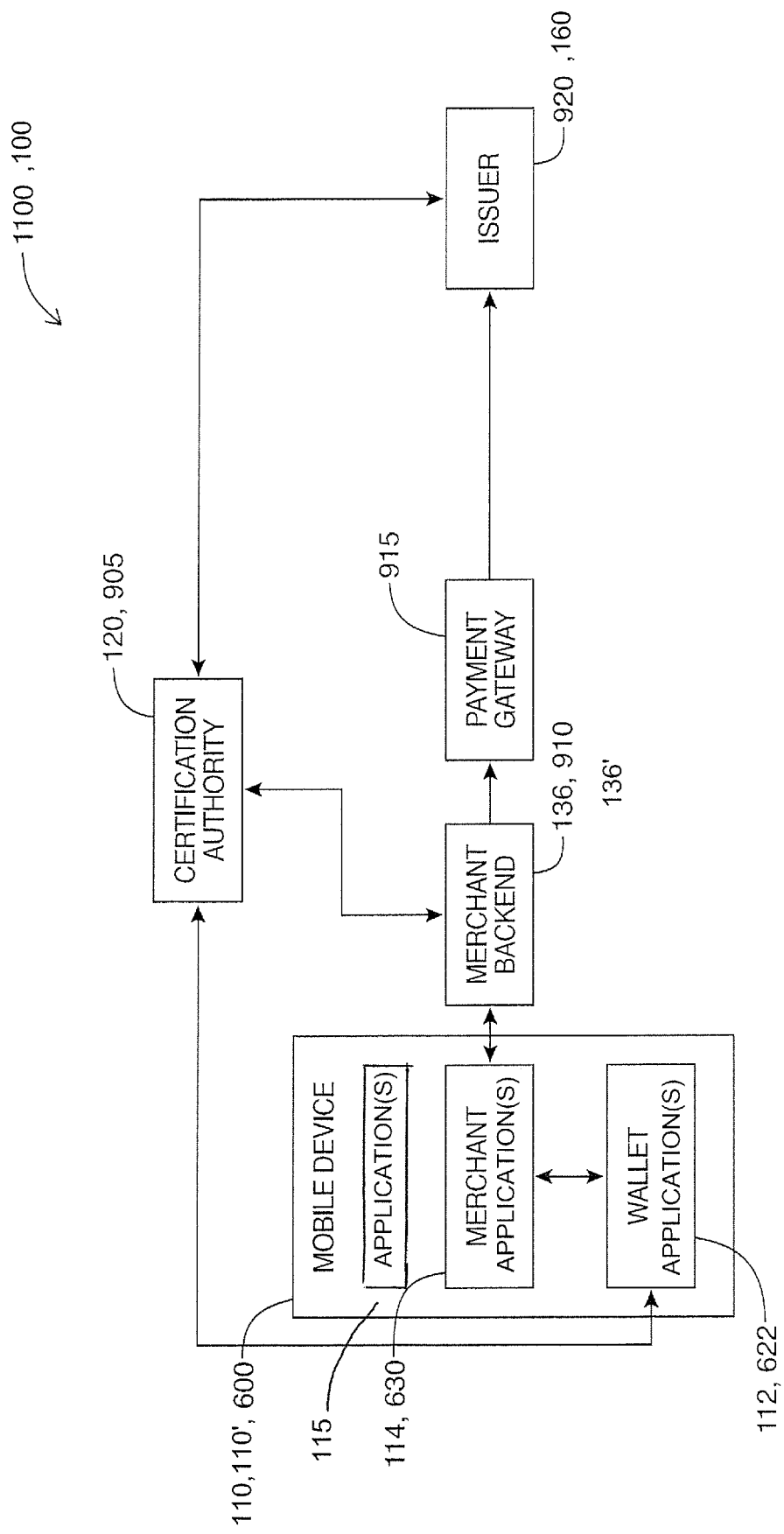
FIG. 11 shows a schematic representation of yet another example system for processing mobile payments in accordance with various aspects and embodiments of the invention.

Referring now to FIG. 11, there is shown an example system 100, 1100 for processing mobile and other payments in accordance with embodiments of the invention. Similar to system 900 shown in FIG. 9, system 1100 may in various different embodiments include at least a mobile or other device 110, 110', 600, certification authority 120, 905, and merchant backend 136, 136', 910 as described herein. For convenience and ease of illustration, therefore, description of these elements may be somewhat abbreviated, except for certain differences that may be specifically highlighted.

As previously noted, in addition to credit and debit transactions, the invention enables the tokenization of a wide range of alternative payment methods. For example, an issuer 120, 160, 920 (such as a bank or other financial institution) may extend a line of credit or other valuable asset to a customer. Ordinarily it would not be possible for the customer to make payments with such asset(s). However, in accordance with the invention, the issuer 160, 920 may provision a mobile or other device 100, 110', 600 with a token representing the customer's line of credit or other asset, or one or more values associated therewith. Such token(s) may, any desired numbers and/or varieties of forms, be stored in one or more wallet applications 112, 622 for later usage in mobile payments. The mobile device 110, 600 on which such payment tokens are stored may be a trusted device 110' in some cases.

Accordingly, when a transaction is initiated, the token pulled by merchant application 114, 630 may in some cases represent a line of credit with issuer 920. When the transaction is received from merchant backend 136, 136', 910, payment gateway 915 may then detect that the received token represents a line of credit or other asset, as a result of the trusted mobile device 110, 600 or merchant backend 136, 136' 910 encoding the payment message to be detected as such, and then route the transaction directly to issuer 920 associated with the token. Issuer 920 may then settle the transaction by deducting the appropriate amount from the customer's available credit.

Thus, among other improvements enabled by this disclosure, are mobile and other devices, each comprising one or more display screens, one or more user input devices, and one or more short-range and/or long-range network communication systems; one or more data processors; and one or more memory devices; the memory device(s) comprising persistent, stored data representing at least: (a) one or more secure payment tokens, each payment token comprising data associated with an authorized payment amount and a financial service provider by which the authorized payment amount was authorized. The memory devices further comprise memory comprising persistent, stored data representing one or more sets of machine-interpretable or otherwise executable instructions, and the data processor(s) are configured, upon execution of the one or more sets of stored machine-interpretable instructions, to initiate payment or other transactions from within one or more applications installed on the mobile communication device; to receive, from the at least one user input device, data representing a user selection of a payment option displayed on the display screen and, in response, access the persistent memory device and pull a selected payment token into the application; and to route the selected payment token from within the application to a transaction processing system, using the network communication system, for use in processing the initiated transaction.

The invention further provides such devices, wherein the payment option is displayed from within the applications, including for example applications provided by merchant transaction processing systems, and the applications are adapted to facilitate communications between the mobile communication device and the merchant processing system.

The invention further provides corresponding processes; persistently-stored, machine-executable instruction sets; and systems 100, 900, 1000 adapted for the use of such devices.

Figure 12:
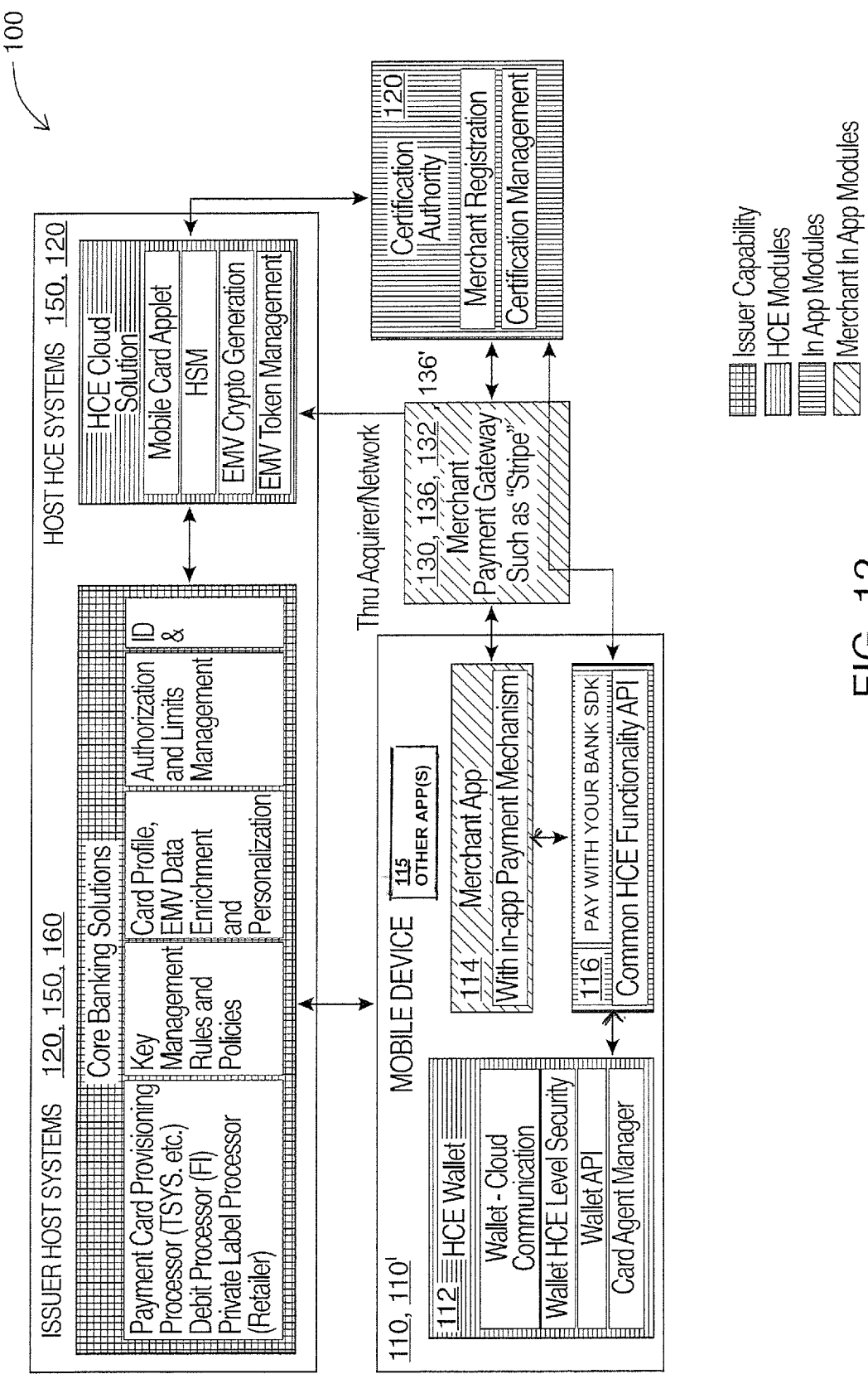
FIG. 12 shows a schematic representation of yet another example system for processing mobile payments in accordance with various aspects and embodiments of the invention.

Referring now to FIG. 12, as noted above, HCE tokens and other payment or transaction credentials stored in a virtual wallet 112 of a device 110, 110' may be made accessible to other applications 114, 115 installed on otherwise accessible by the device, including application(s) 114 provided by or otherwise associated with one or more merchants, in various ways. For example, a merchant application 114 may be authorized or otherwise enabled to access information from within a wallet application 112 of a trusted device 110' through implementation of a pull architecture, which may be facilitated by providing on the trusted device 110' a system level application programming interface (API) 116 that is common to or otherwise accessible by both the wallet and merchant application. Such an API can, for example, be provided in the form of a separate payment options application API 116 ("Pay with your bank SDK"), as shown in FIG. 12; alternatively, such an API 116 may itself serve as a common, or universal wallet 112, by polling applications 112, 114, and servers 120, 160 etc. for payment resources available to a verified, authorized user 190 of a device 110, and presenting them in a suitably-configured GUI on an output device 610. Such features may offer significant advantages to users 190, merchants 130, and FIs/FSPs 120, 160, among others. For example, because tokens and/or other payment credentials already stored in such a mobile wallet 112 can, in such implementations, be pulled by a merchant application 114, the user may be relieved of any necessity to input any credit card or other sensitive information, such as confidential identifiers, directly into the merchant application. An example of implementation and use of such one embodiment is provided below, in connection with process 1300 of FIG. 13. It will be noted that, among other advantages, the use of distinct secure payment option API(s) 116 can provide user(s) of device(s) 110, 110' with greatly enhanced and extremely flexible control over a wide variety and combination of payment options and preferences.

As noted above, for example, polling of any or all of devices 110, including installed applications 112, 114; FIs/FSPs 120, 160; merchant devices and systems 132, 134, 136, 136'; and optionally other resources, and pulling of payment credentials, may be accomplished by configuring such devices to generate, store, and otherwise process data representing payment tokens, HCE credentials, and other transaction-related information in accordance with common standards, including for example common communications and data record generation and processing protocols. Generally speaking, the exact format of such protocols is of secondary importance: more importantly, relevant data such as payment and/or deposit account numbers (or other identifiers), authorized and/or requested transaction values, and identifiers related to account holders, authorized account users, account administrators, and payors and payees can be embedded within transaction data records in any suitable and agreed format.

Using such suitably-adapted token and/or credential formats, payment option or universal wallet APIs 112, 116 can be configured to talk to any, some, or all of, each other merchant systems and/or devices 130, 132, 134, 136, 136', and/or FI/FSP systems 120, 160.

In implementing such payment option or universal wallet APIs 116, trusted architectures such as those shown and described in connection with FIGS. 1-5, 9-12, and 15A—15B can be extremely beneficial. For example, the use of certification/registration processes as described herein can greatly facilitate acceptance, security, and efficiency of the adoption of common or universal protocols, as described herein.

Figure 13:
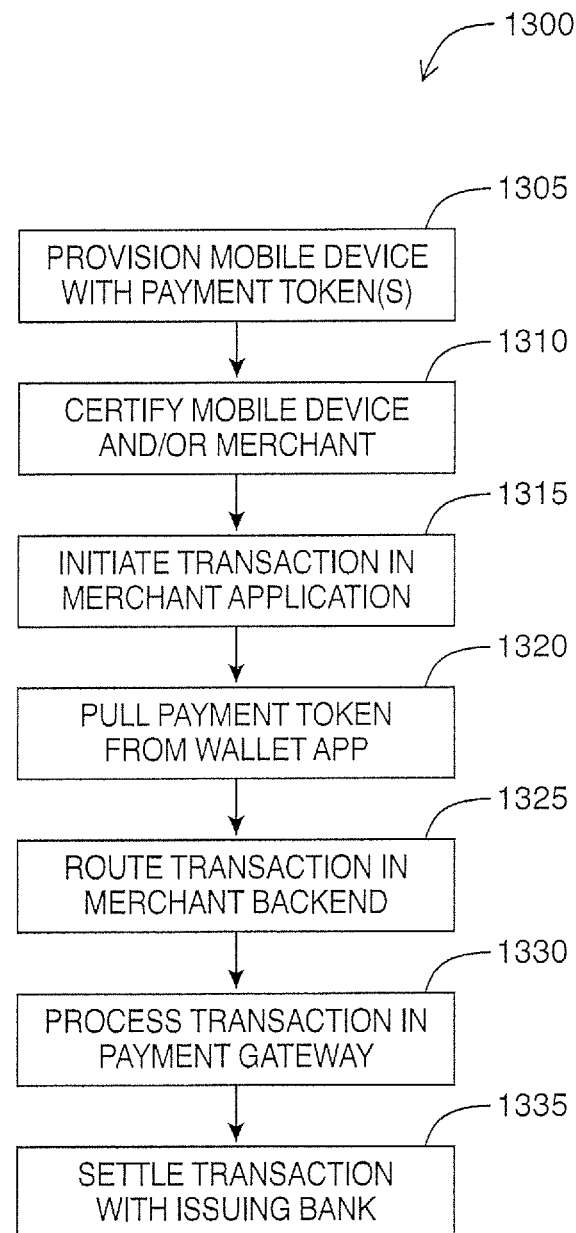
FIG. 13 shows a flow chart depicting a method of processing mobile payments in accordance with various aspects and embodiments of the invention.

Referring now to FIG. 13, there is illustrated a method 1300 of processing mobile payments, or other transactions, in accordance with various aspects and embodiments of the invention. Methods 1300 may be performed by or in association with any or all of systems 100 (FIGS. 1-5, 12), 900 (FIG. 9), 1000 (FIG. 10), and/or 1100 (FIG. 11), and may generally allow a user of a request communication device 110, 110' to initiate and complete mobile transactions from within an application or program associated with a merchant which has been installed on the mobile device. While, in the embodiment shown in FIG. 13, method 1300 of is depicted as a sequence of discrete events or actions, it will be appreciated by those skilled in the relevant arts that such representation is for clarity and convenience only, and that alternative embodiments may be possible as well. For example, in variant embodiments, it may be possible to re-arrange the order of actions depicted, include further actions, omit certain depicted actions, and/or combine one or more actions together, and so on. The particular sequence depicted is only an example of the possibilities.

Accordingly, in some cases, a method 1300 may begin with provisioning 1305 a mobile, desktop, or other user device 110, 110' with one or more HCE tokens or other payment credentials representing any one or more of a wide variety of authorized payment options for a user of the device 110, 110'. The HCE tokens or payment credentials may be provisioned by different entities 120, 160, including token service providers 160, 920 that may be bound to one or more specific payment methods or schemes, but in some cases also by a central certification authority 120, 905 that provisions standard token(s) across multiple different payments and/or schemes. In some further cases, payment tokens may be provisioned to a secure cloud accessible to a mobile or desktop device 110, 110' instead of to a user's device itself.

So that mobile and/or other transactions involving provisioned HCE tokens or other payment credentials may be authenticated, one or both of a merchant and a merchant application may be certified 1310 by, for example, a central certification authority or trusted platform 120, 905. For example, a merchant and/or one or more associated merchant systems 130, 910 may be certified 1310 by registering a merchant application or program 114, 630 with the certification authority 120, 905 as one in which mobile or other types of payments may be authorized. The certification authority or trusted platform 120, 905 as part of the process may provide an associated merchant system 130', 910 with a certificate for use in processing mobile payments through the merchant's application, in the form of a merchant certification data set comprising any suitable identifiers and/or security codes, etc.

Optionally, in some cases, a user may also certify 1310 a mobile or other device 110 with a certification authority or trusted platform 120, 905. For example, the certification authority 120, 905 may register some unique identifying information about the user device 110, 110', such as a serial number, network address, or random or otherwise arbitrary identifier. Then, all mobile transactions involving an HCE token or payment credential that has been provisioned to such a registered device 110' may also be processed as authentic if such transactions have originated from a device 110' matching or otherwise suitably associated with the registered identifying information.

In order to initiate a payment or other transaction, a user may launch a merchant application or program 114, 630. For example, a user of a mobile device 110, 110' can approach a merchant POS 132, 134 with one or more goods or services the user wishes to purchase, present the items for scanning by the merchant, and thereby automatically or semi-automatically cause initiation of a merchant application 114, 630 residing on the mobile device; or the user of a desktop device 110, 110' can use a general purpose browser to navigate to a merchant web site, and select one or more items or services for placement in a virtual shopping cart, using known techniques, and when ready initiate a 'check out' procedure or other payment process. As part of a programmed payment or checkout sequence, the merchant application 114, 630 may request provision of the merchant's certificate from a networked location in an associated backend system 136, 910. Once received, the merchant application may use the received certificate to query a wallet application 112, 622 installed on the user's mobile or desktop device 110, 110'. When queried, the wallet application may verify the authenticity of the merchant's certificate using a private key or other cryptographic information and respond according to the outcome of the verification. Alternatively, the merchant application or program 114, 630 may query a user payment option application 116 or request a token directly from the wallet application 112, 622 for provision of the certificate information to the merchant system 630.

It will be immediately understood by those skilled in the relevant arts that methods or processes provided for implementation through the use of devices 110, 110' to access merchant applications 114, 630 and/or merchant systems 130, including for example the use of such systems and applications to identify user default choices as described herein, may comprise any of a very wide variety of suitable programming devices, mechanisms, or approaches. For example, a user of a mobile device 110, 110' may use a suitably-configured web browser on his/her mobile device to navigate to a merchant system 130, 132, etc., similar to the manner in which he/she might do so on a desktop device; and cookies and other automatic or semi-automatic devices may be employed for the designation of default options and selections, in the manner described. As a further particular example, a browser implemented on a mobile device 110, 110' may be configured, as for example through the use of a plug-in application or other suitably-configured code, to communicate with a mobile wallet 112, 622 through a merchant API 114, 630 in order to pull identifiers and/other payment data and credentials from the wallet for use by or with merchant systems 130, 132, 136, etc. Such implementations may be of particular advantage, in that, for example, not all merchants may elect to provide proprietary or other apps 114 for use on mobile devices, and the use of such general-purpose browsers, cookies, etc., may provide them with significant opportunities for effective and efficient implementation of such aspects of the invention.

All devices, mechanisms, approaches, procedures, and methods of accessing such applications and systems are considered to fall within the scope of corresponding aspects of the invention.

Conditioned upon verification of the merchant's certificate data, the user's wallet 112, 622 and/or payment options API 116 may allow the merchant application to pull 1320 a wallet interface from the wallet application 112, 622 into the merchant application 114, 630. As shown for example in FIG. 14A, the wallet interface 112, 116 may include a set of program instructions that, upon such verification (or at any other suitable point in the transaction process) wholly or partially causes the user device 110, 110' to generate and display, a graphical user interface (GUI) or other visual display 1402 of the user's stored payment credentials allowing for the user to make a selection of which stored payment token and/or which of a plurality of payment options to use in processing the initiated transaction.

For example, selection by a user of a device 110' at a POS 132, 134 or within a web browser of a desktop system 110 of an interactive GUI device "check out" or "ready to pay" displayed on a device screen 610 can cause the device 110' to generate and display a GUI comprising items 1404, 1406 representing payment options available to the user of the device 110'. In the example shown in FIG. 14A, for example, the user has been presented with a GUI 1402 offering a choice of two payment options: a merchant-controlled "checkout" option 1404, and a wallet or trusted platform-controlled process "pay with your bank" option 1406.

Figure 14A:
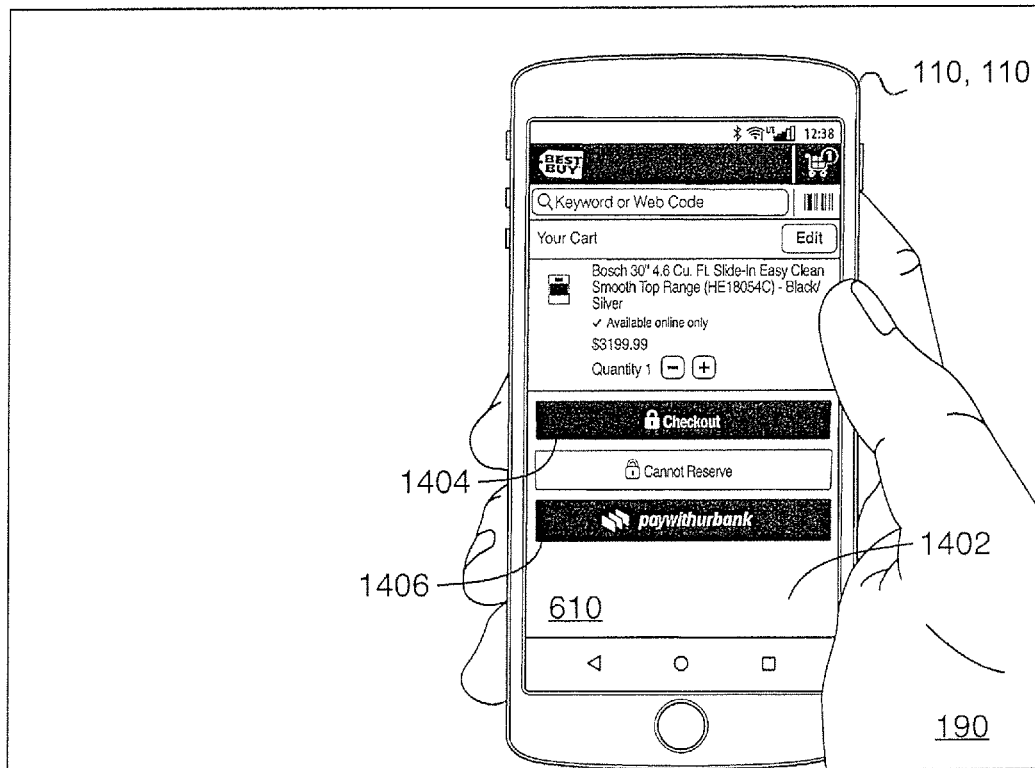
FIGS. 14A-14F show embodiments of graphical user interfaces adapted for use in implementing various aspects and embodiments of the invention.

Selection by the user of an interactive GUI "checkout" element 1404 of FIG. 14A can cause the device 110' to initiate a process controlled by the merchant application 114, 630 to enable the user to complete the transaction by using payment processes authorized or otherwise controlled by the merchant backend system 136, 910 to generate a transaction authorization request data set. Such processes can, for example, be enabled wholly or partially through the use of 4th-party payment processor(s) 150, as shown for example in FIG. 1. Such processes can, for example, proceed in accordance with known and widely commercialized electronic checkout procedures. Transaction authorization request data sets generated through the use of such processes can comprise any information required or otherwise desired by one or more FIs/FSPs 120, 160 whose approval is required in order for the transaction to be completed, including for example a total purchase amount, identifier(s) associated with account(s) to be used as payment resources, and/or merchant or other accounts designated for receipt of the payment(s), along with any routing, confirmation, and/or security data or devices, as generally described herein.

For example, selection by the user of a GUI element 1406 'pay with your bank' can cause the device wallet 112, 630 and/or payment options API 116 to continue or initiate a payment process controlled by any or all of the wallet 114, 630, API 116, and/or TP 120, 905. For example, selection of an item 1406 using a touchscreen device 610 can cause generation and display (e.g., using data provided by a payment options API 116) of a GUI 1407 showing one or more options 1486 available to the user 190 as resources for completing payment in accordance with data and/or instructions provided in the wallet 112, 622, and pulled by payment options API 116, as shown for example in FIG. 14B and FIG. 14E. In the example shown in FIG. 14B, a user 190 of a mobile device 110' has been provided with a GUI 1407 showing, at 1471, portions of a corresponding requested transaction data set, in the form of a list comprising information identifying at least one item to be purchased (a Bosch 30" smooth top range), along with a price associated with the item. The user has also been provided with an icon 1408 representing a first payment option, in the form of a transaction payment source identified as a credit account "RBC VISA AVION: administered by a trusted FI 120, 160.

Figure 14B:
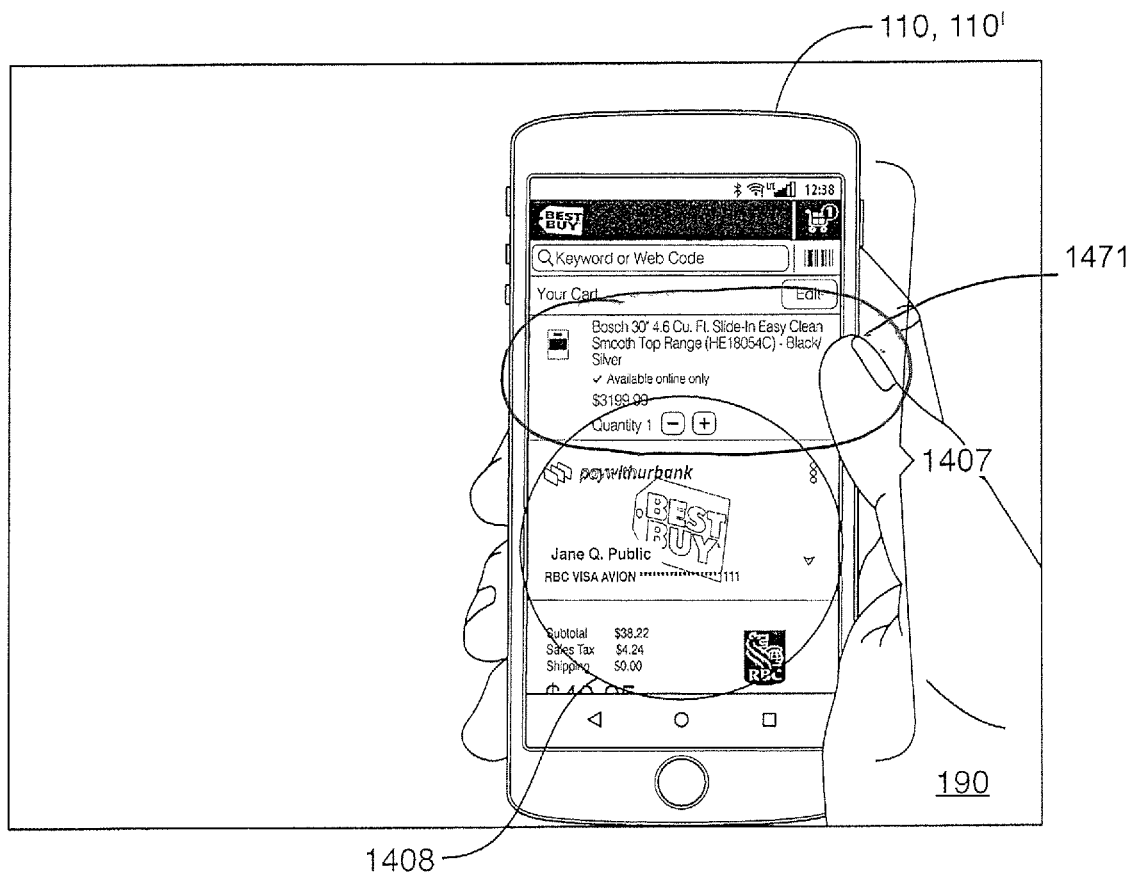
Figure 14C:
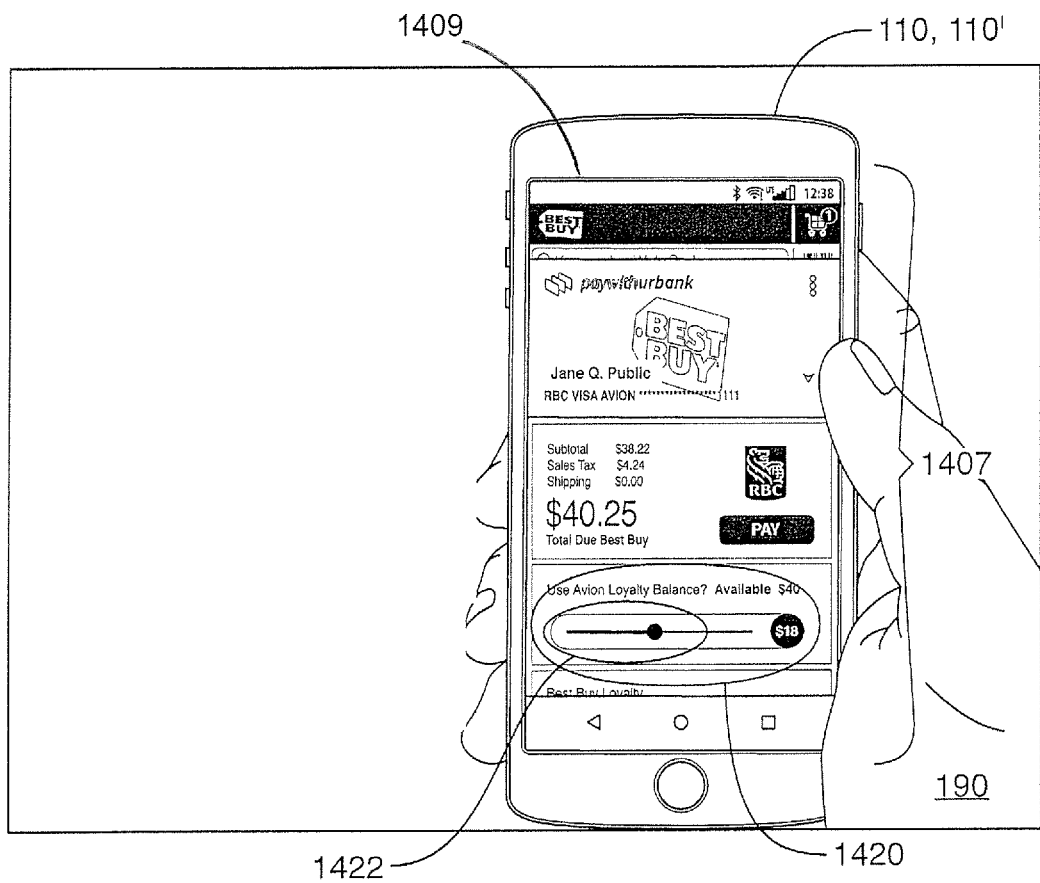
Figure 14D:
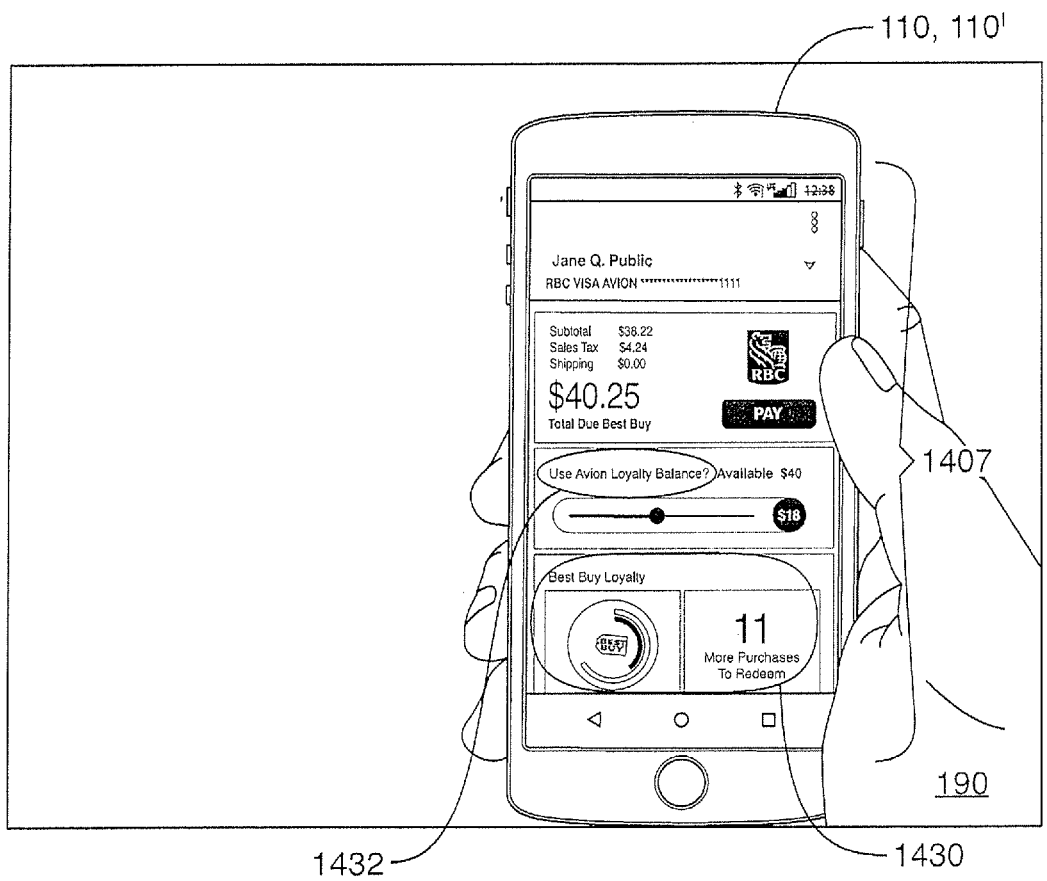

As shown in FIGS. 14C and 14D, the GUI 1407 provided in FIG. 14B can be provided in the form of an interactive "overlay" screen 1409, either by causing the display to generate a new GUI 1407 and overwrite the previous screen completely, or for example by using 'fade' or 'grey-out' imaging techniques to allow the user 190 to interact with the payment options 116 and/or wallet 114 without otherwise terminating or interrupting a checkout session or process being executed by the merchant system 130, including the merchant's default checkout processes governed by the GUI 1402 shown in FIG. 14A. This can, for example, enable the user to scroll the GUI 1407 so as to view further payment options available through the wallet 114, options application 116, and or an associated FI 120, 160; and optionally to control payment using a combination of accounts or fund sources.

For example, a universal wallet or payment options API 116 can poll the device 110, 110' for a full or partial list of all wallets 112, payment tokens, and/or other sets of payment credentials stored on the device, and present them via such a GUI for user viewing and selection. Such lists may wholly or partially populated by defaults, set by the user, merchant, or an FSP associated with the device 110, 110', or any payment token(s) and or transaction credential(s) associated with the device. For example, a list of all cards, accounts, or other value sources accessible by the device for application to the transaction may be displayed, along with full or partial information identifying information, including branded logos, for viewing and selection by the user. For example, a list of card or account details, with all, some, or most of the card number, account holder's name, and/or address omitted, may be presented, so that a user 190 is enabled to select a desired payment source without publicly disclosing sensitive information.

Among the many advantageous features provided by such aspects and embodiments of the invention are elegant, user-controllable mechanisms allowing the user to pay for a transaction using one or more of multiple payment accounts and or other value sources, and optionally to control what portion(s) of such combination(s) are to be used in doing so. For example, as shown in FIG. 14C, a user 190 has scrolled, through the use of a touchscreen, pointing device, and/or other I/O components 610, to view a portion of the GUI 1407 showing that a total purchase amount of $40.25 is due, and enabling the user to use an "Avion Loyalty Balance" item 1420 to pay a desired amount of the purchase using loyalty points or dollars; the remainder being paid using another account such as the "RBC VISA AVION" account. In the example shown, the user is presented with an interactive device 1420 in the form of a touchscreen-enabled slider 1422 that may be used by the user to increase or decrease the amount of the total $40.25 to be paid using the loyalty account. In the example shown, the user has adjusted the slider 1422 so that it will cause, if the item "pay" is selected, the total amount $40.25 to be paid using points valued at $18 from the Avion Loyalty Balance, and the balance ($22.25) to be applied against the RBC VISA AVION credit account or other designated funding source.

The invention enables a wide variety of variations in combined-payment-source transactions. For example, in-app processes controlled by merchant or other applications 114, 115 can provide a user 190 with an interface screen 1407 showing information concerning the amount(s) of cash, rewards, or other values the user may have available for a transaction, for example how many loyalty points the user has available to be applied toward a requested transaction. The user 190 can, for example by using a visual slider or other interface 1420, designate the number of available points to redeem for application to the proposed transaction. Optionally, once the user has completed the transaction through the application 114, 115, the application can charge another designated user account the full amount of the transaction, without applying any discounts for points used.

The app 114, 115 can also notifies a designated wallet 112 associated with the transaction to redeem the selected number of points and apply a credit to the user's selected payment card for the dollar amount of the number of points redeemed.

Moreover, by polling a device 110, 110' and/or one or more FIs/FSPs 160 for all wallet, account, token, and/or HCE credential data authorized for use by a user 190, wallet applications 114, 116 in accordance with the invention can enable a user to select any debit, credit, or points accounts the user may have available for use in transactions generally, and not simply, for example, loyalty programs associated with a particular merchant or forms of payment otherwise preferred by the merchant.

POS transactions can also be improved through application of payment processes enabled by the invention, including those with enable drawing on multiple user accounts, particularly when whole or partial payment using loyalty or rewards points is desired. A user 190 of a device 110, 110' wishing to pay in such fashion can load a wallet application associated with an FI/FSP 120, 160 associated with both a funds account and a loyalty or rewards account, select an HCE-compliant funds account to be used for payment, and a points slider 1420 or similar device be displayed automatically, if points are available and eligible for redemption in the transaction. Using the device 1420 the user 190 can select how many points to redeem, and/or which portion of the payment is to be satisfied through points redemption; and when the user taps the device on a POS terminal to pay or otherwise authorizes completion of the transaction, the wallet 112 can route to the merchant system 136, 136' a transaction payment data set comprising a data item representing the number of points to be revealed, in such fashion that the merchant system is neither informed of nor burdened with the fact that points are being used to pay some or all of the transaction price. provide access to additional information in a data field presented only to the user 190 regarding how many points to redeem. Such functionality, for example, is sometimes included as a part of standard payment protocols, including the EMV standard. When the transaction data set is routed to the routed to the FI associated with the cash and points payment accounts in the normal course, the hidden field can parsed. If it contains instructions to redeem points, the FI can apply the points in accordance with its internal accounting principles, without requiring the merchant system 136, 136' to process the payment on anything other than a cash basis. Using the device 110, 110's communications systems, the FI 120, 160 can confirm the transaction for the user 190 directly.

As shown in FIG. 14C, scrolling further along the interface screen 1407 can cause a GUI device 1430 to be displayed, indicating further information about the loyalty account referenced at 1432; in this case indicating a further number of purchases required before remaining points can be redeemed by the user for application to a transaction. As will be appreciated by those skilled in the relevant arts, the use of payment options APIs 116 across multiple FI platforms 120, 160 can enable a certification authority 120, 905 or other trusted platform to track multiple rewards programs, account balances associated with credit, debit, and other payment accounts, etc., and provide such information to a user 190 in a combined and organized display 1407.

Figure 14E:
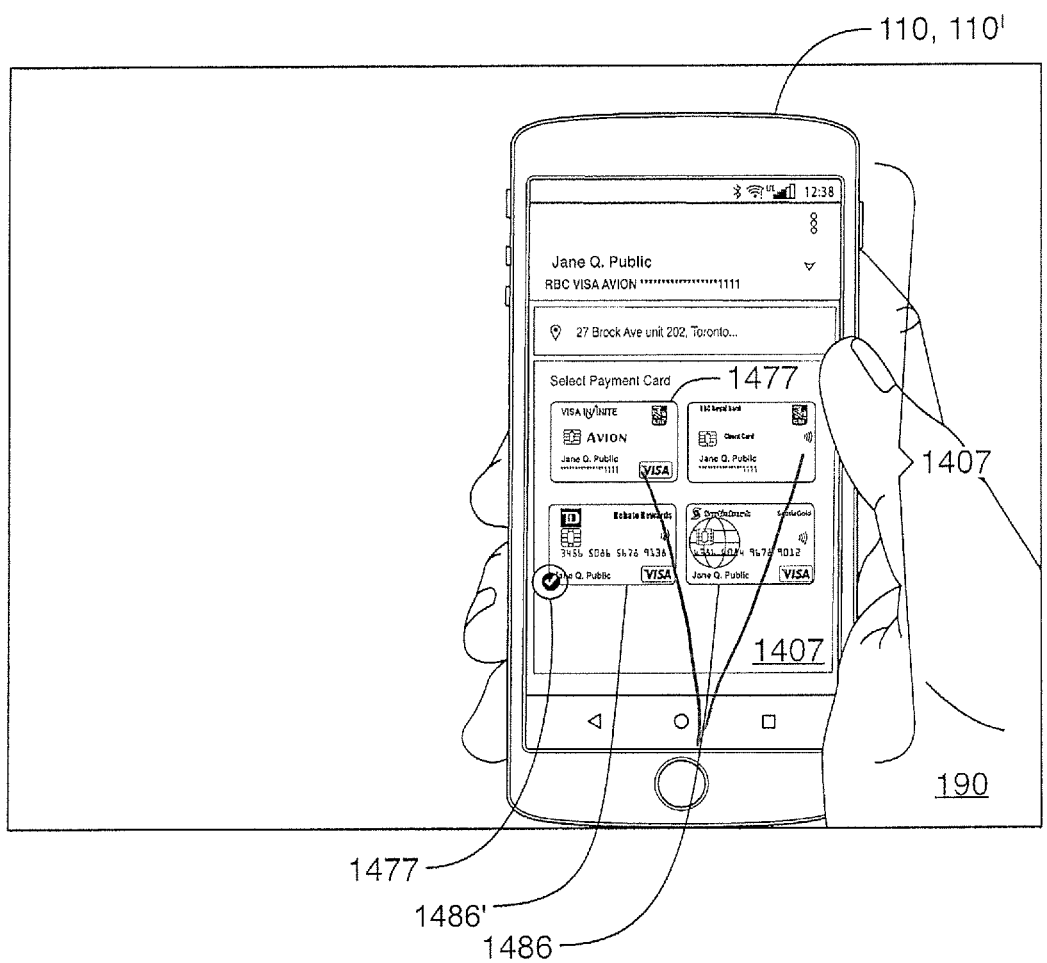
Figure 14F:
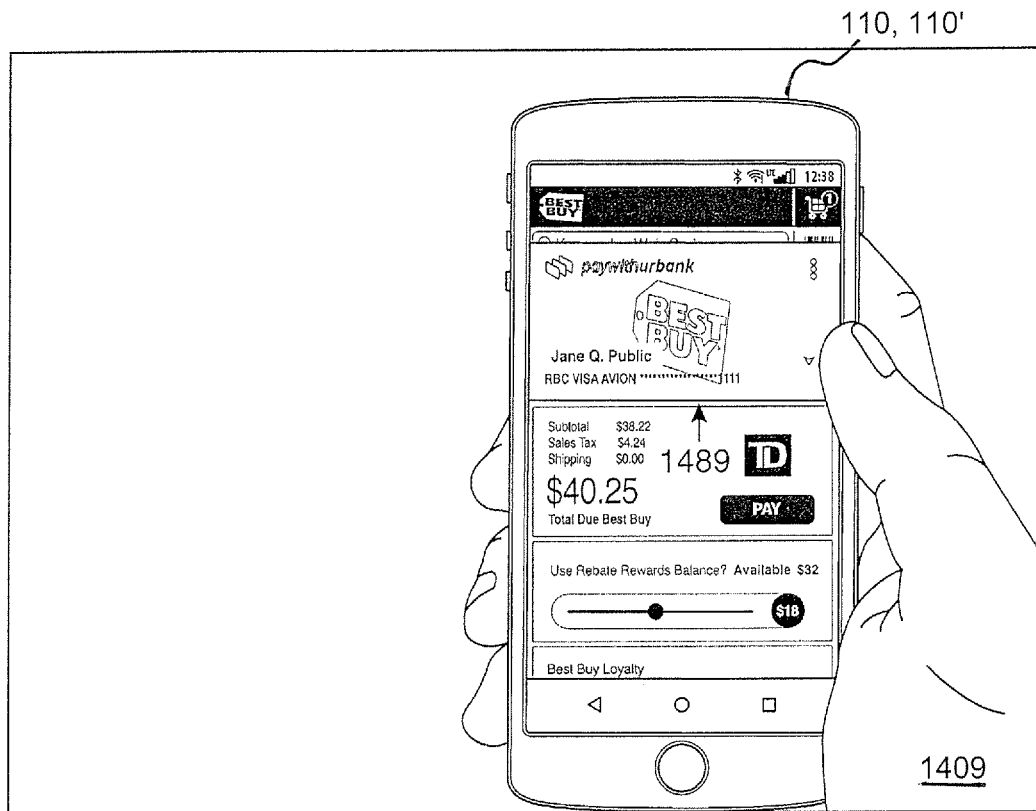

A further advantageous feature offered by the invention is the ability to allow a user 190 to select from an arbitrary number of accounts and/or types of accounts, regardless of whether such accounts are held or administered by a common entity, in designating which account(s) are to be used in completing a transaction. For example, a payment options API 116 or wallet 112 can be adapted to enable the user, by means such as a GUI 1407, to select among accounts controlled by the user but held or otherwise controlled by a variety of FIs 160. For example, as shown in FIGS. 12 and 14E, selection of a payment options item 1406 (FIG. 14A) can cause a payment options application 116 or first wallet 112 to poll one or more (second) wallet(s) 112 and/or certification authority(ies) 120 for information useful for identifying a plurality of payment options available to an authorized user 190, and cause a suitably-configured display 610 to present a GUI 1407 comprising one or more corresponding selectable GUI icon(s) 1486 on a GUI 1484. Selection of the item 1486', for example, can result in replacement of the option "RBC VISA AVION" shown in FIG. 14C by a payment option associated with a rebate account "TD REBATE REWARDS," as shown at 1489 in FIG. 14F. As will be appreciated by those skilled in the relevant arts, once they have been made familiar with this disclosure and advantages offered by the invention(s) disclosed herein, graphical items 1486, etc., can be provided in the form of thumbnails or other images bearing unique branding images, or other identifiers, associated with the corresponding accounts.

In various embodiments in which payment options APIs 116 and/or wallets 112 enable a user 190 to select from among multiple accounts or funding sources for the completion of transactions, a user 190 may be enabled to select one or more defaults or default combinations to be presented upon selection of a payment options item 1406. For example, as shown and previously described in connection with FIGS. 14A and 14B, selection of such an item 1406 when a default has been previously designated by either or both of the user 190 and/or an authorized FI 120, 160, can result in display of one or more overridable payment options, such as a preferred debit, credit, loyalty, gift, and/or rewards account(s). In such embodiments, previously-indicated default preferences can be designated by, for example, use of items 1477, as shown in FIG. 14E, by virtue of relative placement on the screen use of associated identifiers, including text, colors, shading, or other graphic devices, etc. In the example shown in FIG. 14E, selection of a payment options icon 1406 in FIG. 14A could result in display of an option to pay with an account "TD REBATE REWARDS VISA", rather than "RBC VISA AVION," as shown in FIG. 14A.

In embodiments of the invention adapted to enable the designation of default account selections, defaults can be identified using any one or more desired or otherwise suitable mechanisms. For example, a user 190 of a device 110, 110' can designate one or more defaults at the time of setting up either or both of a merchant shopping application 114 and Common HCE payment options SDK/API 116, (sometimes called a universal wallet application) an API 112, 116, or at any later time; and/or an associated FI 120, 160 can offer or require various default settings. Alternatively, defaults may be designated automatically, or semi-automatically, based on user actions and/or trends in user actions, during transactions, using, for example cookies generated during or otherwise provided in association with completed transactions.

In further variations of such and other embodiments, the invention offers new and advantageous ways of using tokens and other payment credentials, which may for example be designated by and/or otherwise associated with one or more specific users or devices, for a variety of purposes, including for example the designation of default payment sources and other selections to be used in processing transactions. For example, using data previously entered by, or otherwise related to, and useful in identifying or otherwise authenticating a specific user, a merchant app 114 can provide the same or other identifiers to a wallet app 112 in order to designate one or more default options to be presented to a user 190 of a device 110' during the processing of a transaction. For example, at the time of a transaction, a merchant app 114 can provide data representing a telephone number associated with an authorized user 190, or other information, to a wallet app 114 associated with a device 110' being used by such authorized user. For example, a merchant POS 132 or a merchant system 130 could provide to the wallet 112 a telephone number previously provided by the user 190, or obtained from other, previously provided data, to the wallet 112, for use by the wallet 112 in identifying an account to be used as a default in processing a transaction. In addition, in various embodiments such a user might be required to separately provide a username/password, PIN, and/or other identifier in order to complete the transaction.

A further variation of processes 1300, 1500, may be used with particular advantage in which a user 190 has a wallet application 112 associated with a plurality of FIs/FSPs 120, 160 installed on his/her device 110, 110' but relies primarily on one of the wallet applications 112 for purchase transactions. For use in completing POS purchases and other purchases, the preferred wallet application 112 can be configured to cause generation and display of a selectable GUI item 1406 "pay with your bank" that will allow the user to launch any other wallet 112 on the device having similar functionality on the device. For example, the user 190 is in a checkout line in a brick-and-mortar store, and invokes the preferred wallet application 112 because that's the user initially wishes to use, but then decides instead to pay using HCE credentials representing an account held with a different FI/FSP 120, 160. The user is enabled, for example, simply to tap a "button" 1406 from within the preferred wallet application 112, causing either or both of the preferred wallet application 112 and the SDK/API 116 to generate and display a GUI 1407 comprising a list of all of the FIs registered with a central authority 120. The user can select a GUI item 1486 associated with the desired FI, and provided a corresponding wallet application 112 is installed on the device 110, 110', that corresponding wallet application 112 is launched, the user can further select an individual account associated with that FI (e.g., choose between credit, deposit, and loyalty accounts), and tap the device 110', 100 to an NFC-enabled POS device 132, 134 POS to pay. A token or other suitable credentials data set stored in association with the selected wallet application 112 may be transmitted to the POS terminal directly, or it may be sent back (pulled) to the originally-preferred wallet application 112 through SDK/API 116 "Paywithurbank" communication standards, and the first FI wallet 112 can route a suitably-configured transaction payment data set to the POS terminal. A similar process can be applied in-app payments originated from a merchant or other application 114, 115, as well.

Figure 16:
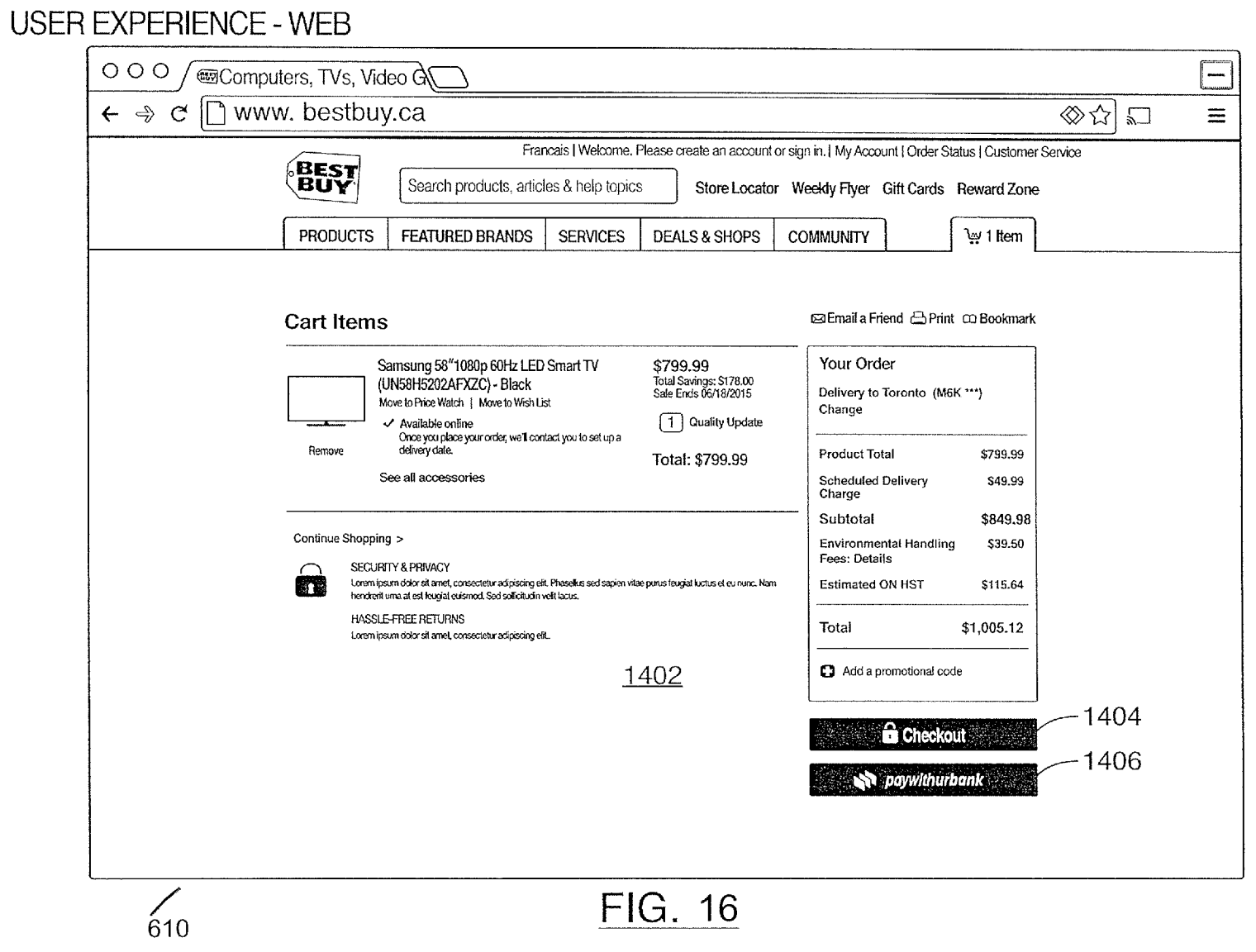

As previously noted, many aspects and embodiments of the invention can be implemented on desktop or other non-mobile or semi-mobile devices 110, as well as on smart phones, smart jewellery or other wearable devices, tablet computers, or other mobile devices 110. In such implementations web browsers can be used in conjunction with merchant systems 130, wallets 112, and payment options APIs 116, etc. to generate and display payment options GUIs 1407, 1402, as shown in FIG. 16. Such GUIs can be adapted to provide any or all of the functionalities described, for example, in connection with FIGS. 14A-F.

In other cases, such as where the wallet application 112 is only storing one payment credential or where a default payment method has been set, upon verification of the merchant certificate, the merchant application 114 may automatically pull 1320 such payment token from the wallet application. In some cases, however, the merchant's certificate may not be used to query a mobile wallet application as part of an authentication process to retrieve and/or obtain payment token(s), and the merchant or application may directly access a mobile wall application or other location where token(s) are stored.

Still referring to FIG. 13, following selection of one or more payment tokens and/or payment resource credentials designated by the user 190 for use in completing the mobile or other payment, the merchant application 114 may generate a transaction authorization request data set comprising, for example, a payment (secure) token reference in the form of data representing the designated token(s) (or a reference to an IP address at which the token may be located), and/or other payment source(s) (e.g., payment account identifiers), together with data identifying the merchant account designated for receipt of the payment, any routing or special instructions, etc.; and at 1325 may the transaction authorization request data set through a merchant backend to a payment gateway along with other transaction specific information. The payment gateway may process 1330 the transaction differently according to the different factors, such as the payment method represented by the included token, and whether or not the user's device and/or the merchant has been authenticated by a trusted platform. For example, debit transactions may be routed directly to an issuer and settled 1335 with the user's bank. Alternatively, some credit card transactions may be routed first to an acquirer before ultimately being settled 1335 with an issuer. In some cases, credit card transactions may instead be routed directly to an issuer to be settled 1335, for example, where such authorization has been granted by a trusted platform. This may, for example, be accomplished by either the trusted device 110' or the merchant causing a payment message that represents a credit card payment to appear as a payment message representing alternate form of payment, such as an Interac™ transaction, which is thereby routed directly to an issuer bank instead of to an intermediary or fourth party processor, such as an acquirer. Other options for processing and settlement of mobile or desktop transactions, including where a trusted merchant routes payments directly to an issuer bypassing a payment network altogether, are as described herein.

Figure 15A:
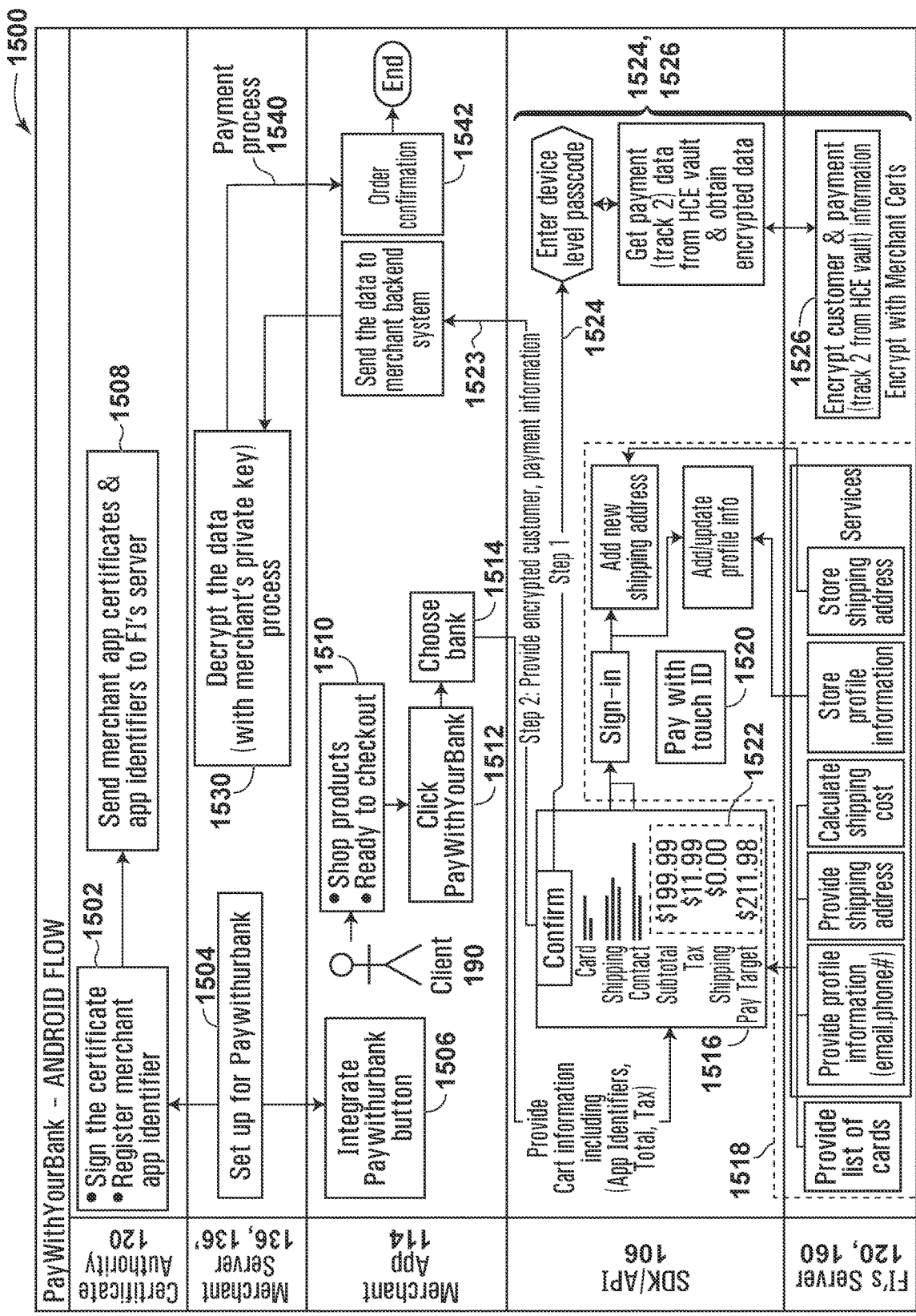
FIGS. 15A and 15B show schematic diagrams representing embodiments of systems and data flows within systems in accordance with the invention.

Another example of a payment process 1500 for enabling and otherwise implementing a payment transaction is shown in FIG. 15A. Like process 1300, process 1500 enables a purchaser 190 to select any one or more of a variety of payment options in completing a payment transaction.

Process 1500 can begin at 1502 with a merchant can register or certify a merchant system 136 with one or more FSPs 160 and/or trusted platforms 120, to create a trusted merchant system 136', as described herein. Registration of the merchant system 136' can include provision, by the certifying FSP 160, to the merchant system 136 of a certification data set comprising any useful or otherwise suitable identifiers, public/private or other securities, etc., for use by the merchant system 136' in authenticating it status as a registered, or trusted, merchant.

Having registered (i.e., certified) the merchant system 136', at 1504 the merchant can create or otherwise acquire one or more suitably-configured merchant shopping applications 114 and/or common HCE payment options SDKs/ APIs 116, configured to enable a user 190 of a device 110, 110' to be able to shop the merchant's website or brick and mortar premises and thereby generate transaction request authorization data sets as described herein. The merchant system 136' can further cause such merchant shopping application(s) 114 and/or common HCE functionality APIs 116 to be provisioned, at 1506 to one or more user request communication device(s) 110, 110' as described herein. In addition to enabling the user to shop the merchant's offerings and generate transaction authorization request data sets, the application 114 and/or SDK/API 116 can enable, among other things, a provisioned user device 110, 110' to generate and display an interactive 'paywithyourbank' graphical device 1406 in circumstances and conditions described herein. Merchant applications 114 are configured to operate in conjunction with universal wallet SDKs/APIs 116 and the merchant's POS, mPOS, and website systems 132, 134, 136, 136' to facilitate user shopping processes as described herein.

In many cases, processes 1502, 1504 will be completed in a manual or semi-automated fashion, by accessing a server 120, 160 associated with a bank or other FSP and entering suitable identifiers and data. In such cases a merchant system 136, 136' can be provided with public and/or private security keys to be used in generating and provisioning SDKs/APIs 116 to user devices 110, 110'.

As noted, at 1508, a registered/certified merchant system 136' can be provided, by the certification/registration platform 120, with certification data sets comprising suitably-adapted certification/registration identifiers, for provisioning to the merchant and to FIs and/or FSPs associated with the merchant, users 190 of the device(s) 110, 110', and/or trusted platform 120.

At 1510, a user 190 of a mobile or non-mobile request communication device 110, 110', using the merchant application 114, can shop the merchant website and/or brick and mortar store, using the provisioned merchant app(s) 114 to assemble a transaction authorization request data set comprising data representing one or more items and/or services to be purchased, leased, etc. When ready to check out (i.e., complete a transaction), the user 190, can initiate a checkout process by making appropriate inputs to the merchant app 114, thus causing the user to be presented by his/her device 110, 110' with a checkout GUI 1402 such as that shown at FIG. 14A, which may for example include all or portions of information represented by the transaction authorization request data set, such a list of item(s) to be purchased, price, tax, shipping/delivery information, etc., and one or more selectable or otherwise interactive items 1404, 1406.

At 1512, the user 190 can select a 'pay with your bank' item 1406, as described herein, and thereby invoke or initiate processing by the universal wallet API 116, in turn causing a default or otherwise selected designation as to one or more sources of payment funds or value to be applied toward payment ('payment resources'), as described herein. For each FI/FSP 120, 160 associated with a designated payment resource, the SDK/API 116 can cause at 1516 information pertaining to the proposed transaction, for example a purchase price, or portion thereof, to be satisfied from the designated payment resource(s) and optionally subtotal purchase prices, applicable taxes, shipping costs, and item identifiers, etc. (e.g., some or all of data included in the generated transaction request data set), to be forward to the corresponding FI or FSP 120, 160, as part of a transaction authorization data set. Alternatively, with respect to a transaction authorization request originating from a trusted request communication device 110', some or all data items used in generating a transaction authorization request data set may be provided by the FI or FSP 120, 160, using stored data associated with the user 190 and/or designated transaction fund account, as shown at 1518. As a further option, the user 190 and/or user device 110, 110' may be enabled to provide information to be stored in a user profile associated with the user for future use, and/or update specific data items. As shown at 1520, such automated data population and/or profile update processes can be protected by user login, using password/PIN entry, device tapping, biometric processes, etc., as described herein.

At 1512 also, the FI 120, 160 can share some or all of the 'shopping cart' (i.e., transaction authorization request data set) information received, generated, and/or updated at 1516 with the corresponding merchant, for verification processes, etc.

At 1524, the SDK/API 116 can cause the transaction authorization request data set, corresponding to the whole or partial purchase amount of the transaction price to be satisfied using the designated funds to be forwarded in a secure manner to the FI/FSP 120, 160 responsible for the payment resource account(s). Conditioned upon verification by the responsible FI/FSP 120, 160, that sufficient funds or credit, etc., are available in the designated payment account(s); the FI/FSP can generate a (secure) transaction authorization data set to be returned to the SDK/API 116. Such transaction authorization data set, which is preferably secure, can comprise any data acceptable to merchant 136, 136, and/or t the FI(s)/FSP(s) responsible for administration of the merchant's receipt accounts, for confirming that payment is authorized. Such information can, for example, include any or all of secure payment token(s), secure payment token reference(s), intra-FI payment confirmation(s) (for 'on us' transactions), or settlement confirmation as instructions.

Thus, at 1526 a verified transaction payment data set, including for example an authorized payment amount and optionally identifiers associated with the registered merchant 136, 136' can be generated, and at 1528, the verified transaction data set generated at 1524 can be returned to the device 110, 110', by means of the SDK/API 116, and forwarded by the SDK/API 116 to the merchant application 114, and thence, at 1530, to the merchant system 136, 136', for decryption and/or other processing at 1540, including application toward the transaction; and at 1542 the merchant system 136, 136' can return an order confirmation data set to the merchant app 114, for presentation to the user via an output display device 610, storage on the device, or other processing.

In some embodiments of processes 1500, at 1512-1514 the user 190 can be presented by the merchant app 114 with a variety of payment options, as shown in FIG. 14E and described above.

In the same and other embodiments, as shown in FIGS. 14C and 14D, and described both above and below, the user 190 can be presented with interactive GUIs 1407 which enable the user to designate, select, and control payments using multiple payment sources.

Figure 15B:
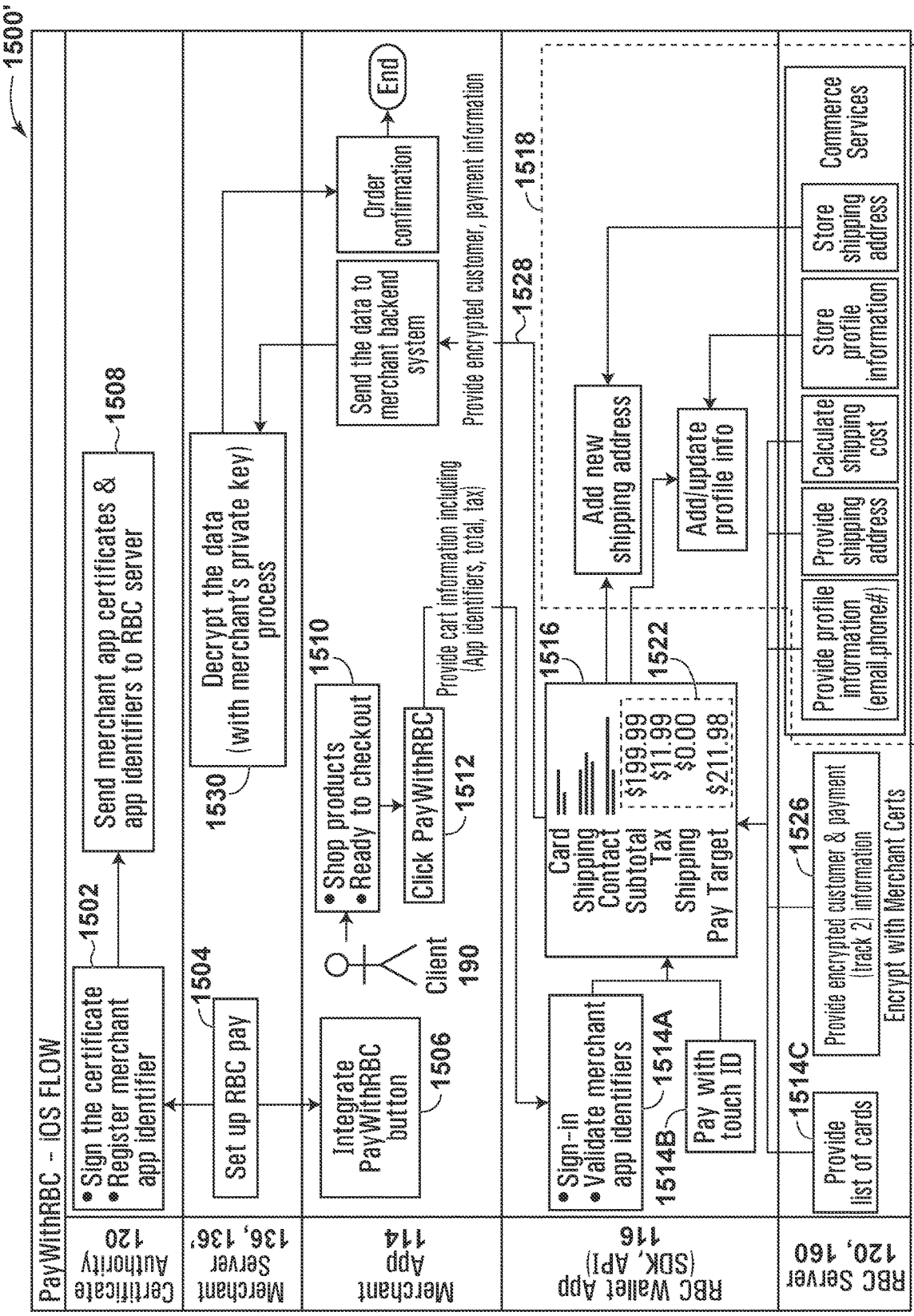

A variation 1500' of process 1500 shown in FIG. 15A is shown in FIG. 15B. In the embodiment shown in FIG. 15B, process 1500, 1500' proceeds in a fashion generally similar to that of FIG. 15A, except that the process 1514 comprising steps 1514A and 1514B of generating and displaying a GUI 1407 showing a plurality of payment options 1486 available to the user is executed by the SDK/API 116, rather than the merchant app 114. As further shown 1514C in FIG. 15A, data representing a plurality of available payment options can be stored securely by a trusted server 120, 160, and provided to the device 110, 110' via the SDK/API 116.

Among the many benefits and/or advantages that may be conferred by methods 1300, as described herein, is that a user of a mobile device may initiate transactions directly from within a merchant application without having to enter or re-enter sensitive personal information for each transaction initiated. Rather the merchant application may through the use of certificates and program interfaces pull payment credentials from a wallet application. Moreover, because the merchant application pulls HCE tokens provisioned to the mobile wallet instead of actual account numbers or other sensitive information, the mobile transaction may be processed without sharing such sensitive information with either the merchant or other potentially insecure entities within a payment network. Other approaches to mobile payments may not share these and other features of the described embodiments.

Thus, as shown for example in FIGS. 17A-17C in various aspects and embodiments the invention provides systems 100 configured to process HCE compliant payment tokens and credentials.

In the embodiment shown FIG. 17A, processes implemented by a payment options application 116A, configured to cooperate with a merchant application 114 on a user device (i.e., a transaction request communication device) 110, 110', are shown. The device 110, 110' comprises at least one output display device 610; at least one user input device 610; at least one network communication system 612, 614, 616; at least one data processor 602; and at least one persistent memory device 604, 608, 618. The at least one persistent memory device 604, 608, 618 comprises stored data representing at least: at least one secure payment token, the at least one secure payment token comprising data associated with an authorized payment amount and a financial service provider 120, 160 by which the authorized payment amount was authorized; and one or more sets of machine-interpretable instructions. The at least one data processor 602 is adapted, by execution of the one or more stored sets of machine-interpretable instructions, to, in response to a first set of signals generated by the at least one user input device 610, initiate processing by (i.e., to invoke) a merchant transaction application 114 associated with a merchant 136, 136' and comprising one or more sets of machine-interpretable instructions stored in the at least one persistent memory device 604, 608, 618 of the transaction request communication device 110, 110'; in accordance with said machine interpretable instructions comprised by said merchant transaction application 114 and at least a second set of signals generated by the at least one user input device 610, generate a requested transaction data set, the requested transaction data set comprising at least an identifier associated with the merchant 136 and a transaction amount payable to the merchant; and cause the at least one output display screen 610 to display a human-interpretable user interface 1407 adapted to solicit a user selection of a merchant checkout process and a virtual wallet application payment process; the virtual wallet application process associated with a virtual wallet application 112, the virtual wallet application comprising one or more sets of machine-interpretable instructions and the at least one secure payment token; in response to a third signal set received from the at least one user input device 610, the second signal set representing a user selection of the virtual wallet application payment process, cause the merchant transaction application 114 to poll the corresponding virtual wallet application and acquire payment credentials associated with the at least one secure payment token and generate a transaction authorization request data set, the transaction authorization request data set comprising at least the payment credentials, the identifier associated with the merchant, and the transaction amount payable to the merchant; and, using the at least one network communication system 612, 614, 616 route the transaction authorization request data set to a server 120, 160 associated with a source of payment resources associated with the payment credentials.

In the embodiment shown FIG. 17B, processes implemented by a virtual wallet 112, 116B associated with a first FI/FSP 120, 160, configured to cooperate with a virtual wallet application 112 associated with a second FI/FSP 120, 160, not commonly controlled or otherwise by, or associated with, a second FI/FSP 120 on a user device (i.e., a transaction request communication device) 110, 110', are shown. The device 110, 110' comprises at least one user input and/or output device 610; at least one network communication system 612, 614, 616; at least one data processor 602; and at least one persistent memory device 604, 608, 618. The at least one persistent memory device 604, 608, 618 comprises stored data representing at least: a plurality of secure payment token references, each secure payment token reference comprising data representing an identifier associated with one of a plurality of sources of transaction payment resources; and one or more sets of machine-interpretable instructions. The at least one data processor 602 is adapted, by execution of the one or more stored sets of machine-interpretable instructions, to: initiate execution of operations by (i.e., 'invoke'), in response to a first set of signals generated by the at least one user input device 610, a payment transaction process, the payment transaction process generating a requested transaction data set, the requested transaction data set comprising at least an identifier associated with a merchant and a transaction amount payable to the merchant; in response to a second set of signals generated by the at least one user input device 610, initiate a first wallet application 112, 116B, the first wallet application 112, 116B comprising at least a first one of the plurality of secure payment token references and stored machine-interpretable instructions configured to: cause the at least one output display screen 610 to display a human-interpretable user interface 1407 adapted to solicit a user selection of one a plurality of sources of payment resources to be applied toward satisfaction of a requested transaction, at least one of the sources of payment resources associated with the source of payment resources identified by the first one of the plurality of secure payment tokens, and at least a second of the sources of payment resources not associated with the source of payment resources identified by the first one of the plurality of secure payment tokens; receive from the at least one user input device 610 signals representing a user selection of one of the plurality of sources of payment resources to be applied toward satisfaction of a related transaction; and if the user selection of one of the plurality of sources of payment resources corresponds to the source of payment resources identified by the first one of the plurality of secure payment tokens, generate a transaction authorization request data set comprising at least the first one of the plurality of secure payment token references, and, using the at least one network communication system, route the transaction authorization request data set to a server 120, 160 associated with the source of payment resources identified by the first one of the plurality of secure payment tokens. The networked request communication device 110, 110' may further be configured, if the user selection of one of the plurality of sources of payment resources does not correspond to the source of payment resources identified by the first one of the plurality of secure payment tokens, to initiate a second wallet application 112, the second wallet application 112 comprising at least a second one of the plurality of secure payment token references and stored machine-interpretable instructions configured to cause the same or another data processor 602 to generate a transaction authorization request data set comprising at least the second one of the plurality of secure payment token references, and, using the least one network communication system, route a transaction authorization request data set generated by either first or the second wallet application to a transaction processing system associated with the merchant.

In the embodiment shown FIG. 17C, processes implemented by a universal (or "common") virtual wallet 112, 116C of a networked request communication device 110, 110' configured to cooperate with virtual wallet applications 112 and/or FI/FSP server(s) 120, 160 associated with plurality of un-a FIs/FSPs 120, 160, are shown. The device 110, 110' comprises at least one user input and/or output device 610; at least one network communication system 612, 614, 616; at least one data processor 602; and at least one persistent memory device 604, 608, 618. The at least one persistent memory device 604, 608, 618 comprises stored data representing at least: a plurality of secure payment token references, each secure payment token reference comprising data representing an identifier associated with one of a plurality of sources 120, 160 of transaction payment resources and a security key uniquely associated with said source of transaction payment resources; and one or more sets of machine-interpretable instructions. The at least one data processor 602 is adapted, by execution of the one or more stored sets of machine-interpretable instructions, to: initiate execution by, or "invoke", in response to a first set of signals generated by the at least one user input device 610, a payment transaction process, the payment transaction process generating a requested transaction data set, the requested transaction data set comprising at least an identifier associated with a merchant 136, 136' and a transaction amount payable to the merchant; in response to a second set of signals generated by the at least one user input device 610, initiate a universal (or "common") wallet application 112, 116C, the universal wallet application 116C comprising stored machine-interpretable instructions configured to generate transaction authorization request data sets, each transaction authorization request data set comprising at least a secure payment token reference, and at least one transaction payment amount; and in response to a third set of signals generated by the at least one user input device 610, the third set of signals representing at least a user selection identifying one of the plurality of sources of transaction payment resources, generate a transaction authorization request data set, the generated transaction authorization request data set comprising at least a secure payment token reference associated with the selected source of transaction payment resources and the transaction amount payable to the merchant 136; and using the at least one network communication system 610, 612, 614, 616, route the generated transaction authorization data set to a server associated 120, 160 with the identified source of payment resources.

In some embodiments in accordance with FIG. 17C, generation and routing of the transaction authorization request data set is conditioned upon receipt by the at least one data processor of a fourth set of signals generated by the at least one user input device, the fourth set of signals comprising at least a secure identifier associated with an authorized user of the device.

In some embodiments in accordance with FIG. 17C, the data processor 602 is adapted, by execution of the same or other stored sets of machine-interpretable instructions, to: using the same or another network communication system 610, 612, 614, 616, receive, from the same or another server 120 associated with the identified source of payment resources, a secure transaction authorization data set; and using the same or another of the at least one communication system 610, 612, 614, 616, route the secure transaction authorization data set to a transaction processing system 136, 136' associated with the merchant.

Payment resources processed by any of the embodiments of FIGS. 17A-17C, like those processed by other embodiments described herein, may include resources either or both of any form of real or virtual currency, or redeemable loyalty or rewards points.

Further advantages offered by such aspects and embodiments of the invention include the ability of issuing FIs/FSPs, merchants, etc., to offer users 190 simplified access to payment options, and unified 'customer experiences' across a variety of platforms, including mobile and desktop devices, etc., and during purchase and other transactions across a broad range of contexts, as defined by merchants, FIs, FSPs, etc. In some embodiments, the user 190 of a device 110, 110' may customize all or part of the experience in accordance with her/his preferences. As previously noted, customer experiences can be extended across traditional boundaries such as payment method(s) preferred by merchants, FIs, FSPs, and others.

The above description is intended to provide a thorough description of various aspects and example embodiments of one or more inventions. Accordingly, various aspects and/or components of such invention(s) have been described throughout at multiple different levels of abstraction. In some instances, embodiments may have been described on both a specific and a relatively general or generic level, for example, where an aspect or component of the embodiment is susceptible to variation in a manner that is not inconsistent with the specific structure(s) and/or operation(s) set forth. In these instances, the specific embodiments set forth herein may not be the only ones contemplated and instead may only be exemplary of a more general or generic configuration. The scope of the invention(s) described herein is therefore defined solely by the language of the claims appended hereto, giving due consideration to applicable doctrines for construing their meaning.

The invention claimed is:

1. A computer-implemented method comprising:
receiving a first set of signals from a merchant application on a user device, the first set of signals including data representing a merchant certificate used as part of a query of a plurality of secure payment tokens in at least one persistent memory of the user device, each secure payment token comprising data representing an identifier associated with one of a plurality of sources of transaction payment resources and a security key uniquely associated with said source of transaction payment resources;
initiating on the user device, in response to the first set of signals, a payment transaction process, the payment transaction process generating, at the user device, a requested transaction data set, the requested transaction data set comprising at least an identifier associated with a merchant and a transaction amount payable to the merchant;

verifying, at the user device, a merchant certificate associated with the merchant identifier;

selecting, from the plurality of secure payment tokens stored in the at least one persistent memory, at least one secure payment token associated with the merchant;

generating, at a universal wallet application on the user device, transaction authorization request data sets, each transaction authorization request data set comprising at least one of the selected at least one secure payment token, and at least one transaction payment amount;

receiving, at a user input interface of the user device, a user selection identifying one of the plurality of sources of transaction payment resources;

generating a transaction authorization request data set on the user device, the generated transaction authorization request data set comprising at least one of:
 the selected at least one secure payment token associated with the selected source of transaction payment resources, or
 the transaction amount payable to the merchant;

sending, using at least one network communication interface at the user device, the generated transaction authorization request data set to a merchant backend server to be routed to a server associated with the identified source of payment resources; and receiving confirmation that the transaction was completed.

2. The computer-implemented method of claim 1, wherein generation and routing of the transaction authorization request data set is conditioned upon receipt by the at least one data processor of a fourth set of signals generated by the at least one user input interface, the fourth set of signals comprising at least a secure identifier associated with an authorized user of the device.

3. The computer-implemented method of claim 1, comprising:
 receiving, from the same or another server associated with the identified source of payment resources, a secure transaction authorization request data set; and
 routing the secure transaction authorization request data set to a transaction processing system associated with the merchant.

4. The computer-implemented method of claim 1, wherein at least a portion of the transaction payment resources represent currency.

5. The computer-implemented method of claim 1, wherein at least a portion of the transaction payment resources represent non-currency redeemable points.

6. A computer-implemented method comprising:
 initiating at a user device, in response to a first set of signals generated by at least one user input interface, a payment transaction process, the payment transaction process generating, at the user device, a requested transaction data set, the requested transaction data set comprising at least an identifier associated with a merchant and a transaction amount payable to the merchant;
 verifying, at the user device, a merchant certificate associated with the merchant identifier;
 selecting, from a plurality of secure payment tokens stored in at least one persistent memory, at least one secure payment token associated with the merchant, each secure payment token comprising data representing an identifier associated with one of a plurality of sources of transaction payment resources; and initiating a first wallet application on the user device;

displaying, at an output display, a human-interpretable user interface adapted to solicit a user selection of one of:
 a plurality of sources of payment resources to be applied toward satisfaction of a requested transaction,
 at least one of the sources of payment resources associated with the source of payment resources identified by the first one of the plurality of secure payment tokens, or
 at least a second of the sources of payment resources not associated with the source of payment resources identified by the first one of the plurality of secure payment tokens;

receiving, at a user input interface, a user selection of one of the plurality of sources of payment resources to be applied toward satisfaction of a related transaction;

when the user selection of one of the plurality of sources of payment resources corresponds to the source of payment resources identified by the first one of the plurality of secure payment tokens:
 generating, at the user device, a transaction authorization request data set comprising at least the first one of the plurality of secure payment tokens, and
 sending the transaction authorization request data set to a merchant backend server to be routed to a server associated with the source of payment resources identified by the first one of the plurality of secure payment tokens; and receiving confirmation that the transaction was completed.

7. The computer-implemented method of claim 6, comprising:
 when the user selection of one of the plurality of sources of payment resources does not correspond to the source of payment resources identified by the first one of the plurality of secure payment tokens:
 initiating a second wallet application on the user device; and
 generating a transaction authorization request data set comprising at least the second one of the plurality of secure payment tokens.

8. The computer-implemented method of claim 7, comprising:
 routing, using at least one network communication interface, a transaction authorization request data set generated by either the first or the second wallet application to a transaction processing system associated with the merchant.

9. The computer-implemented method of claim 6, wherein at least a portion of the transaction payment resources represent currency.

10. The computer-implemented method of claim 6, wherein at least a portion of the transaction payment resources represent non-currency redeemable points.

11. A computer-implemented method comprising:
 initiating, at the user device, a merchant transaction application associated with a merchant;
 verifying, at the user device, a merchant certificate associated with the merchant;
 selecting, from a plurality of secure payment tokens stored in the at least one persistent memory, at least one secure payment token associated with the merchant, the at least one secure payment token comprising data associated with an authorized payment amount and a financial service provider by which the authorized payment amount was authorized;

generating, at the user device, a requested transaction data set, the requested transaction data set comprising at least an identifier associated with the merchant and a transaction amount payable to the merchant; and displaying, at an output display, a human-interpretable user interface adapted to solicit a user selection of a merchant checkout process and a virtual wallet application payment process, the virtual wallet application process associated with a virtual wallet application;

receiving, at a user input device, a user selection of the virtual wallet application payment process;

polling, at the merchant transaction application, a corresponding virtual wallet application;

acquiring, at the merchant transaction application, payment credentials associated with at least one secure payment token, the at least one secure payment token comprising data associated with an authorized payment amount and a financial service provider by which the authorized payment amount was authorized; and generating, at the user device, a transaction authorization request data set, the transaction authorization request data set comprising at least the payment credentials, the identifier associated with the merchant, and the transaction amount payable to the merchant;

sending the transaction authorization request data set to a merchant backend server to be routed to a server associated with the source of payment resources associated with the payment credentials; and receiving confirmation that the transaction was completed.

12. The computer-implemented method of claim 11, wherein at least a portion of the transaction payment resources represent currency.

13. The computer-implemented method of claim 11, wherein at least a portion of the transaction payment resources represent non-currency redeemable points.

14. A computer-implemented method comprising:

initiating, at a user input interface of a user device, a merchant transaction application associated with a merchant;

verifying, at the user device, a merchant certificate associated with the merchant;

selecting, from at least one secure payment token stored in the at least one persistent memory, at least one secure payment token associated with the merchant, the at least one secure payment token comprising data associated with an authorized payment amount and a financial service provider by which the authorized payment amount was authorized;

generating, at the user device, a requested transaction data set, the requested transaction data set comprising at least an identifier associated with the merchant and a transaction amount payable to the merchant;

displaying, at an output display, a human-interpretable user interface adapted to solicit a user selection of a merchant checkout process and a virtual wallet application payment process, the virtual wallet application process associated with a virtual wallet application;

receiving, at the user input interface, a user selection of the virtual wallet application payment process;

polling, at a merchant transaction application, a corresponding virtual wallet application;

acquiring, at the merchant transaction application, payment credentials associated with the at least one secure payment token;

generating, at the user device, a transaction authorization request data set, the transaction authorization request data set comprising at least the payment credentials, the identifier associated with the merchant, and the transaction amount payable to the merchant;

sending the transaction authorization request data set to a merchant backend server to be routed to a server associated with the source of payment funds associated with the payment credentials; and receiving confirmation that the transaction was completed.

15. The computer-implemented method of claim 14, wherein the user device, the server associated with a source of payment funds associated with the payment credentials and the merchant have mutually accepted a trusted network communication protocol.

* * * * *